United States Patent
De Juan, Jr. et al.

(10) Patent No.: US 9,740,025 B2
(45) Date of Patent: Aug. 22, 2017

(54) EYE COVERING AND REFRACTIVE CORRECTION METHODS AND APPARATUS HAVING IMPROVED TEAR FLOW, COMFORT, AND/OR APPLICABILITY

(71) Applicant: NexisVision, Inc., Menlo Park, CA (US)

(72) Inventors: Eugene De Juan, Jr., San Francisco, CA (US); Cary J. Reich, Los Gatos, CA (US); Yair Alster, Palo Alto, CA (US); Matt Clarke, Mountain View, CA (US); Kuangmon Ashley Tuan, Mountain View, CA (US); Brian Levy, New York, NY (US)

(73) Assignee: NexisVision, Inc., Menlo Park, CA (US)

(*) Notice: Subject to any disclaimer, the term of this patent is extended or adjusted under 35 U.S.C. 154(b) by 0 days.

(21) Appl. No.: 14/468,075

(22) Filed: Aug. 25, 2014

(65) Prior Publication Data

US 2014/0362338 A1 Dec. 11, 2014

Related U.S. Application Data

(62) Division of application No. 13/456,168, filed on Apr. 25, 2012, now Pat. No. 8,864,306.
(Continued)

(51) Int. Cl.
*G02C 7/04* (2006.01)
*G02C 7/02* (2006.01)

(52) U.S. Cl.
CPC .......... *G02C 7/049* (2013.01); *G02C 7/022* (2013.01); *G02C 7/024* (2013.01); *G02C 7/04* (2013.01); *G02C 7/047* (2013.01)

(58) Field of Classification Search
CPC .......... G02C 7/04; G02C 7/049; G02C 7/022; G02C 7/047
(Continued)

(56) References Cited

U.S. PATENT DOCUMENTS 2,641,161 A 6/1953 Silverstein
3,246,941 A 4/1966 Moss
(Continued)

FOREIGN PATENT DOCUMENTS

CA 993401 A1 7/1976
CA 2174967 C 5/1995
(Continued)

OTHER PUBLICATIONS

International Search Report and Written Opinion of the International Searching Authority for PCT Application No. PCT/US2010/053975, mailed on Feb. 11, 2011, 30 pages.
(Continued)

*Primary Examiner* — William R Alexander

(57) ABSTRACT

An eye covering such as a contact lens may comprise one or more structures to pump tear liquid under the covering such that the covering can remain in the eye and correct vision for an extended amount of time. In many embodiments, the covering comprises a material having fenestrations to draw tear liquid under the covering and an outer portion shaped to contact the conjunctiva over the sclera, such that when the eye closes pressure of one or more eyelids urges tear liquid through one or more fenestrations and under the outer portion shaped to contact the conjunctiva. When the eye blinks, the pressure of the one or more eyelids can urge the covering toward the cornea such that tear liquid can pass through the fenestrations.

43 Claims, 32 Drawing Sheets

Related U.S. Application Data

(60) Provisional application No. 61/636,404, filed on Apr. 20, 2012, provisional application No. 61/507,971, filed on Jul. 14, 2011, provisional application No. 61/480,222, filed on Apr. 28, 2011.

(58) Field of Classification Search
USPC ............ 351/159.01, 159.02, 159.04, 159.68
See application file for complete search history.

(56) References Cited

U.S. PATENT DOCUMENTS

| | | |
|---|---|---|
| 3,488,111 A | 1/1970 | Isen |
| 3,489,491 A | 1/1970 | Creighton |
| 3,495,899 A | 2/1970 | Biri |
| 3,594,074 A | 7/1971 | Rosen |
| 3,619,044 A | 11/1971 | Kamath |
| 3,688,386 A | 9/1972 | Pereira |
| 3,833,786 A | 9/1974 | Brucker |
| 3,915,609 A | 10/1975 | Robinson |
| 3,944,347 A | 3/1976 | Barkdoll et al. |
| 3,973,837 A | 8/1976 | Page |
| 3,973,838 A | 8/1976 | Page |
| 4,037,866 A | 7/1977 | Price |
| 4,053,442 A | 10/1977 | Jungr et al. |
| 4,068,933 A * | 1/1978 | Seiderman ............... G02C 7/04 264/1.1 |
| 4,071,272 A | 1/1978 | Drdlik |
| 4,121,885 A | 10/1978 | Erickson et al. |
| 4,166,255 A | 8/1979 | Graham |
| 4,171,878 A | 10/1979 | Kivaev et al. |
| 4,194,815 A | 3/1980 | Trombley |
| 4,200,320 A | 4/1980 | Durham |
| 4,208,362 A | 6/1980 | Deichert et al. |
| 4,211,476 A * | 7/1980 | Brummel ............... G02C 7/048 351/159.04 |
| 4,268,133 A | 5/1981 | Fischer et al. |
| 4,312,575 A | 1/1982 | Peyman et al. |
| 4,381,007 A | 4/1983 | Doss |
| 4,487,905 A | 12/1984 | Mitchell |
| 4,621,912 A | 11/1986 | Meyer |
| 4,640,594 A | 2/1987 | Berger |
| 4,666,249 A | 5/1987 | Bauman et al. |
| 4,666,267 A | 5/1987 | Wichterle |
| 4,701,288 A | 10/1987 | Cook et al. |
| 4,772,283 A | 9/1988 | White |
| 4,806,382 A | 2/1989 | Goldberg et al. |
| 4,810,082 A | 3/1989 | Abel, Jr. |
| 4,886,350 A | 12/1989 | Wichterle |
| 4,890,911 A | 1/1990 | Sulc et al. |
| 4,909,896 A | 3/1990 | Ikushima et al. |
| 4,940,751 A | 7/1990 | Frances et al. |
| 4,943,150 A | 7/1990 | Diechert et al. |
| 4,952,045 A | 8/1990 | Stoyan |
| 4,978,481 A | 12/1990 | Janssen et al. |
| 4,981,841 A | 1/1991 | Gibson |
| 4,997,583 A | 3/1991 | Itzhak |
| 5,008,289 A | 4/1991 | Bernstein |
| 5,073,021 A | 12/1991 | Marron |
| 5,104,213 A | 4/1992 | Wolfson |
| 5,143,660 A | 9/1992 | Hamilton et al. |
| 5,152,786 A | 10/1992 | Hanna |
| 5,166,710 A | 11/1992 | Hofer et al. |
| 5,178,879 A | 1/1993 | Adekunle et al. |
| 5,191,365 A | 3/1993 | Stoyan |
| 5,213,720 A | 5/1993 | Civerchia |
| 5,236,236 A | 8/1993 | Girimont |
| 5,245,367 A | 9/1993 | Miller et al. |
| 5,246,259 A | 9/1993 | Hellenkamp et al. |
| 5,293,186 A | 3/1994 | Seden et al. |
| 5,346,491 A | 9/1994 | Oertli |
| 5,347,326 A | 9/1994 | Volk |
| 5,349,395 A | 9/1994 | Stoyan |
| 5,397,848 A | 3/1995 | Yang et al. |
| 5,428,412 A | 6/1995 | Stoyan |
| 5,433,714 A | 7/1995 | Bloomberg |
| 5,433,898 A | 7/1995 | Thakrar et al. |
| 5,434,630 A | 7/1995 | Bransome |
| 5,472,436 A * | 12/1995 | Fremstad ............ A61K 9/0051 424/427 |
| 5,496,084 A | 3/1996 | Miralles Medan |
| 5,517,260 A | 5/1996 | Glady et al. |
| 5,538,301 A | 7/1996 | Yavitz et al. |
| 5,570,144 A | 10/1996 | Lofgren-Nisser |
| 5,578,332 A | 11/1996 | Hamilton et al. |
| 5,598,233 A | 1/1997 | Haralambopoulos et al. |
| 5,612,432 A | 3/1997 | Taniguchi et al. |
| 5,628,794 A | 5/1997 | Lindstrom |
| 5,632,773 A | 5/1997 | Graham et al. |
| 5,649,922 A | 7/1997 | Yavitz |
| 5,662,706 A | 9/1997 | Legerton et al. |
| 5,671,038 A | 9/1997 | Porat |
| 5,712,721 A | 1/1998 | Large |
| 5,732,990 A | 3/1998 | Yavitz et al. |
| 5,757,458 A | 5/1998 | Miller et al. |
| 5,760,100 A | 6/1998 | Nicolson et al. |
| 5,760,870 A | 6/1998 | Payor et al. |
| 5,804,263 A | 9/1998 | Goldberg et al. |
| 5,820,624 A | 10/1998 | Yavitz |
| 5,854,291 A | 12/1998 | Laughlin et al. |
| 5,869,533 A | 2/1999 | Holt |
| 5,885,597 A | 3/1999 | Botknecht et al. |
| 5,905,561 A | 5/1999 | Lee et al. |
| 5,910,512 A | 6/1999 | Conant |
| 5,923,397 A | 7/1999 | Bonafini, Jr. |
| 5,929,968 A * | 7/1999 | Cotie ..................... G02C 7/04 351/159.02 |
| 5,953,098 A | 9/1999 | Lieberman et al. |
| 5,957,921 A | 9/1999 | Mirhashemi et al. |
| 5,962,532 A | 10/1999 | Campbell et al. |
| 5,971,541 A | 10/1999 | Danker et al. |
| 5,980,040 A | 11/1999 | Xu et al. |
| 5,986,001 A | 11/1999 | Ingenito et al. |
| 6,010,219 A | 1/2000 | Stoyan |
| 6,030,974 A | 2/2000 | Schwartz et al. |
| 6,036,314 A * | 3/2000 | Wolfson .................. G02C 7/04 351/159.02 |
| 6,036,688 A | 3/2000 | Edwards |
| 6,048,855 A | 4/2000 | De Lacharriere et al. |
| 6,075,066 A | 6/2000 | Matsuda et al. |
| 6,092,898 A | 7/2000 | De Juan, Jr. |
| 6,099,121 A | 8/2000 | Chapman et al. |
| 6,217,171 B1 | 4/2001 | Auten et al. |
| 6,244,709 B1 | 6/2001 | Vayntraub et al. |
| 6,248,788 B1 | 6/2001 | Robbins et al. |
| 6,325,509 B1 | 12/2001 | Hodur et al. |
| 6,340,229 B1 | 1/2002 | Lieberman et al. |
| 6,361,169 B1 | 3/2002 | Tung |
| 6,364,482 B1 | 4/2002 | Roffman et al. |
| 6,406,145 B1 | 6/2002 | Jubin |
| 6,474,814 B1 | 11/2002 | Griffin |
| 6,520,637 B2 | 2/2003 | Hodur et al. |
| 6,541,028 B1 | 4/2003 | Kuri-Harcuch et al. |
| 6,551,307 B2 | 4/2003 | Peyman |
| 6,579,918 B1 | 6/2003 | Auten et al. |
| 6,593,370 B2 | 7/2003 | Tamura et al. |
| 6,652,095 B2 | 11/2003 | Tung |
| 6,659,607 B2 | 12/2003 | Miyamura et al. |
| 6,726,322 B2 | 4/2004 | Andino et al. |
| 6,726,684 B1 | 4/2004 | Woloszko et al. |
| 6,779,888 B2 | 8/2004 | Marmo |
| 6,843,563 B2 | 1/2005 | Richardson |
| 6,849,671 B2 | 2/2005 | Steffen et al. |
| 6,880,558 B2 | 4/2005 | Perez |
| 6,951,894 B1 | 10/2005 | Nicolson et al. |
| 7,018,039 B2 | 3/2006 | Legerton et al. |
| 7,025,455 B2 | 4/2006 | Roffman |
| 7,080,905 B2 | 7/2006 | Marmo et al. |
| 7,097,301 B2 | 8/2006 | Legerton et al. |
| 7,104,648 B2 | 9/2006 | Dahi et al. |
| 7,150,529 B2 | 12/2006 | Legerton et al. |
| 7,163,292 B2 | 1/2007 | Dahi et al. |
| 7,193,124 B2 | 3/2007 | Coffee |
| 7,216,974 B2 | 5/2007 | Meyers et al. |

(56) References Cited

U.S. PATENT DOCUMENTS

| | | | |
|---|---|---|---|
| 7,249,849 B2 | 7/2007 | Marmo et al. | |
| 7,270,412 B2 | 9/2007 | Legerton et al. | |
| 7,322,694 B2 | 1/2008 | Dahi et al. | |
| 7,329,001 B2 | 2/2008 | Benrashid et al. | |
| 7,338,160 B2 | 3/2008 | Lieberman et al. | |
| 7,360,890 B2 | 4/2008 | Back | |
| 7,377,637 B2 | 5/2008 | Legerton et al. | |
| 7,401,922 B2 | 7/2008 | Legerton | |
| 7,404,638 B2 | 7/2008 | Miller et al. | |
| 7,461,937 B2 | 12/2008 | Steffen et al. | |
| 7,491,350 B2 | 2/2009 | Silvestrini | |
| 7,530,689 B2 | 5/2009 | Berke | |
| 7,537,339 B2 | 5/2009 | Legerton et al. | |
| 7,543,936 B2 | 6/2009 | Legerton et al. | |
| 7,559,649 B2 | 7/2009 | Cotie et al. | |
| 7,585,074 B2 | 9/2009 | Dahi et al. | |
| 7,594,725 B2 | 9/2009 | Legerton et al. | |
| 7,628,810 B2 | 12/2009 | Christie et al. | |
| 7,682,020 B2 | 3/2010 | Berke | |
| 7,695,135 B1* | 4/2010 | Rosenthal | G02C 7/04 351/159.02 |
| 7,699,465 B2 | 4/2010 | Dootjes et al. | |
| 7,717,555 B2 | 5/2010 | Legerton et al. | |
| 7,735,997 B2 | 6/2010 | Muckenhirn | |
| 7,748,844 B2 | 7/2010 | Lai | |
| 7,762,668 B2 | 7/2010 | Dai et al. | |
| 7,828,432 B2 | 11/2010 | Meyers et al. | |
| 7,859,769 B2 | 12/2010 | Zalevsky | |
| 7,976,577 B2 | 7/2011 | Silvestrini | |
| 7,984,988 B2 | 7/2011 | Berke | |
| 8,137,344 B2 | 3/2012 | Jia et al. | |
| 8,201,941 B2 | 6/2012 | Choo et al. | |
| 8,459,793 B2 | 6/2013 | De Juan, Jr. et al. | |
| 8,485,662 B2 | 7/2013 | Collins et al. | |
| 8,591,025 B1 | 11/2013 | De Juan, Jr. et al. | |
| 8,678,584 B2 | 3/2014 | De Juan, Jr. et al. | |
| 9,107,773 B2 | 8/2015 | De Juan, Jr. et al. | |
| 9,395,558 B2 | 7/2016 | De Juan, Jr. et al. | |
| 2002/0095199 A1 | 7/2002 | West, Jr. et al. | |
| 2002/0164484 A1 | 11/2002 | Jiang et al. | |
| 2004/0015163 A1 | 1/2004 | Buysse et al. | |
| 2004/0088050 A1 | 5/2004 | Norrby et al. | |
| 2004/0141150 A1 | 7/2004 | Roffman et al. | |
| 2004/0170666 A1 | 9/2004 | Keates et al. | |
| 2004/0184158 A1 | 9/2004 | Shadduck | |
| 2004/0212779 A1 | 10/2004 | Dahi et al. | |
| 2005/0033420 A1 | 2/2005 | Christie et al. | |
| 2005/0107775 A1 | 5/2005 | Huang et al. | |
| 2005/0213030 A1 | 9/2005 | Meyers | |
| 2005/0259221 A1 | 11/2005 | Marmo | |
| 2005/0288196 A1 | 12/2005 | Horn | |
| 2006/0077581 A1 | 4/2006 | Schwiegerling | |
| 2006/0083773 A1 | 4/2006 | Myung | |
| 2006/0100617 A1 | 5/2006 | Boukhny | |
| 2006/0132707 A1 | 6/2006 | Tung | |
| 2006/0152673 A1 | 7/2006 | Cotie et al. | |
| 2006/0197909 A1 | 9/2006 | Legerton | |
| 2006/0197910 A1 | 9/2006 | Legerton | |
| 2006/0238712 A1 | 10/2006 | Dahi | |
| 2006/0241751 A1 | 10/2006 | Marmo | |
| 2006/0250576 A1 | 11/2006 | Legerton | |
| 2006/0256283 A1 | 11/2006 | Legerton et al. | |
| 2006/0256284 A1 | 11/2006 | Dahi | |
| 2006/0285072 A1 | 12/2006 | Dahi | |
| 2006/0290882 A1 | 12/2006 | Meyers et al. | |
| 2007/0013869 A1 | 1/2007 | Dahi | |
| 2007/0014760 A1 | 1/2007 | Peyman | |
| 2007/0037898 A1 | 2/2007 | Phelan et al. | |
| 2007/0046894 A1 | 3/2007 | Muckenhirn | |
| 2007/0106394 A1 | 5/2007 | Chen | |
| 2007/0129720 A1 | 6/2007 | Demarais et al. | |
| 2007/0132948 A1* | 6/2007 | Evans | G02C 7/043 351/159.14 |
| 2007/0135915 A1 | 6/2007 | Klima | |
| 2007/0182920 A1 | 8/2007 | Back et al. | |
| 2007/0232755 A1 | 10/2007 | Matsushita et al. | |
| 2007/0242216 A1* | 10/2007 | Dootjes | G02C 7/04 351/159.73 |
| 2007/0244559 A1 | 10/2007 | Shiuey | |
| 2007/0273834 A1 | 11/2007 | Legerton | |
| 2008/0039832 A1 | 2/2008 | Palanker et al. | |
| 2008/0074611 A1 | 3/2008 | Meyers et al. | |
| 2008/0100796 A1 | 5/2008 | Pruitt et al. | |
| 2008/0243156 A1 | 10/2008 | John | |
| 2008/0287915 A1 | 11/2008 | Rosenthal et al. | |
| 2008/0291391 A1* | 11/2008 | Meyers | G02C 7/04 351/159.34 |
| 2009/0033864 A1 | 2/2009 | Shone et al. | |
| 2009/0237612 A1 | 9/2009 | Cotie et al. | |
| 2009/0244477 A1 | 10/2009 | Pugh et al. | |
| 2009/0303434 A1* | 12/2009 | Tung | G02C 7/047 351/159.06 |
| 2009/0303442 A1 | 12/2009 | Choo et al. | |
| 2010/0036488 A1* | 2/2010 | de Juan, Jr. | A61F 2/14 623/5.16 |
| 2010/0060849 A1 | 3/2010 | Hibino | |
| 2010/0128224 A1 | 5/2010 | Legerton | |
| 2010/0157250 A1 | 6/2010 | Berke | |
| 2010/0208196 A1 | 8/2010 | Benrashid et al. | |
| 2010/0271589 A1 | 10/2010 | Legerton et al. | |
| 2011/0034854 A1 | 2/2011 | Neuberger et al. | |
| 2011/0071631 A1* | 3/2011 | Rosenthal | A61K 31/135 623/6.62 |
| 2011/0208300 A1 | 8/2011 | De Juan, Jr. et al. | |
| 2012/0105804 A1 | 5/2012 | Legerton | |
| 2012/0113386 A1 | 5/2012 | Back | |
| 2012/0169994 A1 | 7/2012 | Matsushita et al. | |
| 2012/0310133 A1 | 12/2012 | De Juan, Jr. et al. | |
| 2012/0327362 A1 | 12/2012 | Doraiswamy et al. | |
| 2013/0201442 A1 | 8/2013 | Back | |
| 2013/0201443 A1 | 8/2013 | Back et al. | |
| 2013/0201454 A1 | 8/2013 | Back | |
| 2013/0208236 A1 | 8/2013 | McCabe et al. | |
| 2013/0208237 A1 | 8/2013 | Hawke et al. | |
| 2013/0222761 A1 | 8/2013 | Hansen et al. | |
| 2013/0242255 A1 | 9/2013 | Caldarise et al. | |
| 2013/0258276 A1 | 10/2013 | Hansen et al. | |
| 2013/0278890 A1 | 10/2013 | De Juan, Jr. et al. | |
| 2013/0293832 A1 | 11/2013 | De Juan, Jr. et al. | |
| 2014/0028979 A1 | 1/2014 | De Juan, Jr. et al. | |
| 2014/0069438 A1 | 3/2014 | De Juan, Jr. et al. | |
| 2014/0069439 A1 | 3/2014 | De Juan, Jr. et al. | |
| 2014/0155800 A1 | 6/2014 | De Juan, Jr. et al. | |
| 2014/0251347 A1 | 9/2014 | De Juan, Jr. et al. | |
| 2015/0055081 A1 | 2/2015 | De Juan, Jr. et al. | |
| 2015/0077701 A1 | 3/2015 | De Juan, Jr. et al. | |
| 2016/0067109 A1 | 3/2016 | de Juan et al. | |
| 2016/0170233 A1 | 6/2016 | De Juan et al. | |
| 2016/0223835 A1 | 8/2016 | de Juan et al. | |

FOREIGN PATENT DOCUMENTS

| | | | |
|---|---|---|---|
| DE | 3143839 A1 | 5/1983 | |
| EP | 42679 A2 | 12/1981 | |
| EP | 0434205 A2 | 6/1991 | |
| EP | 0574352 A1 | 12/1993 | |
| EP | 0378512 A3 | 2/1995 | |
| EP | 0378512 B1 | 2/1995 | |
| EP | 638416 A1 | 11/1995 | |
| EP | 0985157 B1 | 12/1998 | |
| EP | 1664907 A1 | 6/2006 | |
| GB | 2107895 A | 5/1983 | |
| JP | 55-101125 | 7/1980 | |
| JP | 57-27456 | 6/1982 | |
| JP | 57-27457 | 6/1982 | |
| JP | 2661909 B2 | 10/1997 | |
| JP | 11-151263 | 6/1999 | |
| JP | 11-249048 | 9/1999 | |
| JP | 2004-504105 | 2/2004 | |
| WO | 90/14083 A1 | 11/1990 | |
| WO | 92/07617 A1 | 5/1992 | |
| WO | 93/07840 A1 | 4/1993 | |
| WO | 94/05225 A1 | 3/1994 | |

(56) References Cited

FOREIGN PATENT DOCUMENTS

| | | |
|---|---|---|
| WO | 95/13764 A1 | 5/1995 |
| WO | 95/15134 A1 | 6/1995 |
| WO | 96/27816 A1 | 9/1996 |
| WO | 97/19381 A1 | 5/1997 |
| WO | 98/03267 A1 | 1/1998 |
| WO | 98/54603 A1 | 12/1998 |
| WO | 99/30560 A1 | 6/1999 |
| WO | 99/43354 A2 | 9/1999 |
| WO | 99/43354 A3 | 9/1999 |
| WO | 99/46631 A1 | 9/1999 |
| WO | 00/09042 A1 | 2/2000 |
| WO | 01/68082 A1 | 9/2001 |
| WO | 02/06883 A2 | 1/2002 |
| WO | 02/098008 A1 | 9/2002 |
| WO | 03/097759 A1 | 11/2003 |
| WO | 2004/068196 A1 | 8/2004 |
| WO | 2004/097502 A1 | 11/2004 |
| WO | 2004/109368 A2 | 12/2004 |
| WO | 2005/079290 A2 | 9/2005 |
| WO | 2005/116729 A2 | 12/2005 |
| WO | 2006/026666 A2 | 3/2006 |
| WO | 2006/026666 A3 | 3/2006 |
| WO | 2006/121591 A1 | 11/2006 |
| WO | 2006/134649 A1 | 12/2006 |
| WO | 2007/002231 A1 | 1/2007 |
| WO | 02/10841 A1 | 2/2007 |
| WO | 2007/044513 A1 | 4/2007 |
| WO | 2007/053297 A2 | 5/2007 |
| WO | 2007/053297 A3 | 5/2007 |
| WO | 2009/065061 A1 | 5/2009 |
| WO | 2009/073213 A1 | 6/2009 |
| WO | 2006/113149 A2 | 10/2009 |
| WO | 2006/113149 A3 | 10/2009 |
| WO | 2009/145842 A2 | 12/2009 |
| WO | 2010/051172 A1 | 5/2010 |
| WO | 2010/144317 A1 | 12/2010 |
| WO | 2011/050327 A1 | 4/2011 |
| WO | 2011/050365 A1 | 4/2011 |
| WO | 2012/061160 A1 | 5/2012 |
| WO | 2012/149056 A1 | 11/2012 |
| WO | 2013/184239 A2 | 12/2013 |

OTHER PUBLICATIONS

International Preliminary Report on Patentability for PCT Application No. PCT/US2010/053975, dated Apr. 24, 2012, 20 pages.
International Search Report and Written Opinion of the International Searching Authority for PCT Application No. PCT/US2010/053854, mailed on Mar. 1, 2011, 18 pages.
International Preliminary Report on Patentability for PCT Application No. PCT/US2010/053854, dated Apr. 24, 2012, 13 pages.
International Search Report and Written Opinion of the International Searching Authority for PCT Application No. PCT/US2009/002166, mailed on Nov. 19, 2009, 13 pages.
International Preliminary Report on Patentability for PCT Application No. PCT/US2009/002166, dated Oct. 5, 2010, 5 pages.
International Search Report for PCT/US2011/57755, mailed on Feb. 7, 2012, 3 pages.
International Search Report and Written Opinion of the International Searching Authority for PCT Application No. PCT/US2012/035050, mailed on Oct. 3, 2012, 12 pages.
Bissen-Miyajima et al., "Role of the endothelial pump in flap adhesion after laser in situ keratomileusis," J Cataract Refract Surg. Sep. 2004; 30(9): pp. 1989-1992.
Bausch & Lomb Boston® Materials & Solutions Product Guide, 2009, 38 pages total.
SynergEyes, Inc., SynergEyes® A Practitioner Training, retrieved from the Internet: <http://www.fitsynergeyes.com/syn_a/synergeyesA_presentation.pdf>, Aug. 2008, 52 pages.
SynergEyes, Inc., "SynergEyes® A," [package insert, P/N 70008 Rev. I], Published Oct. 13, 2008, 12 pages.
Synerg Eyes®, Inc., Product Overview of CLEARKONE® and SYNERGEYES® PS retrieved from the Internet http://www.synergeyes.com/index.html on May 29, 2012, 5 pages.
Notice of Allowance mailed on Aug. 1, 2013, for U.S. Appl. No. 13/715,917, 12 pages.
International Search Report and Written Opinion for PCT/US2013/059244, mailed on Nov. 26, 2013, 7 pages.
International Preliminary Report for EP 98936282.7, mailed on Mar. 26, 2004, 54 pages.
International Search Report and Written Opinion for PCT/US2013/037219, mailed on Jul. 22, 2013, 20 pages.
International Search Report and Written Opinion for PCT/US2013/059244, mailed on Nov. 18, 2013, 7 pages.
Alio, et al. "Contact Lens Fitting to Correct Irregular Astigmatic After Corneal Refractive Surgery", Journal of Cataract & Refractive Surgery, 2002, vol. 28, No. 10, p. 1750-1757.
Notice of Allowance for U.S. Appl. No. 13/894,176, mailed on Feb. 26, 2014, 10 pages.
Non-Final Office Action for U.S. Appl. No. 13/894,176, mailed on Aug. 5, 2013, 13 pages.
Non-final Office Action for U.S. Appl. No. 13/456,168, mailed on Sep. 12, 2013, 17 pages.
Notice of Allowance for U.S. Appl. No. 13/715,917, mailed on Aug. 1, 2013, 12 pages.
Notice of Allowance for U.S. Appl. No. 13/615,111, mailed on Apr. 23, 2013, 10 pages.
English translation of Japanese Office Action for Japanese Application No. 2011-502997, mailed on Jun. 14, 2013, 7 pages.
EP Office Action for Application No. 10825787.4, mailed on Aug. 12, 2014, 5 pages.
Final Office Action for U.S. Appl. No. 13/503,842, mailed on Aug. 13, 2014, 21 pages.
Final Office Action for U.S. Appl. No. 13/555,056, mailed on Sep. 5, 2014, 23 pages.
Notice of Allowance for U.S. Appl. No. 13/456,168, mailed on May 30, 2014, 11 pages.
Non-Final Office Action for U.S. Appl. No. 13/503,841, mailed on Jun. 27, 2014, 22 pages.
Non-Final Office Action for U.S. Appl. No. 13/503,842, mailed on Apr. 3, 2014, 29 pages.
EP Search Report for Application No. 10825787.4, mailed on Jun. 18, 2013, 13 pages.
Schimmelpfenning et al., "A technique for controlled sensory denervation of the rabbit cornea", Database accession No. NLM7129102, Graefe's Archive for Clinical and Experimental Opthalmology, vol. 218, No. 6, 1982, p. 287-293. (Abstract only).
International Search Report and Written Opinion for PCT/US2014/044136, mailed on Jan. 16, 2015, 21 pages.
International Search Report and Written Opinion for PCT/US2014/064391, mailed on Jan. 26, 2015, 10 pages.
Non-Final Office Action for U.S. Appl. No. 13/885,135, mailed on Nov. 18, 2014, 20 pages.
Final Office Action for U.S. Appl. No. 13/503,841, mailed on Nov. 26, 2014, 6 pages.
Non-Final Office Action for U.S. Appl. No. 14/286,605, mailed on Dec. 18, 2014, 17 pages.
International Search Report and Written Opinion for PCT/US2014/065543, mailed on Feb. 25, 2015, 18 pages.
International Search Report and Written Opinion for PCT/US2015/013006, mailed on Apr. 2, 2015, 17 pages.
U.S. Appl. No. 12/384,659, Non-Final Office Action mailed Jan. 21, 2016.
U.S. Appl. No. 13/503,841, Non-Final Office Action mailed Nov. 16, 2015.
U.S. Appl. No. 13/503,842, Non-Final Office Action mailed Nov. 25, 2015.
U.S. Appl. No. 14/539,698, Notice of Allowance mailed Jan. 21, 2016.
U.S. Appl. No. 14/793,965, Non-Final Office Action mailed Dec. 31, 2015.
U.S. Appl. No. 13/865,780, Notice of Allowance mailed Mar. 28, 2016.

(56) References Cited

OTHER PUBLICATIONS

U.S. Appl. No. 13/885,135, Notice of Allowance mailed Mar. 16, 2016.
U.S. Appl. No. 14/061,311, Non-Final Office Action mailed Apr. 21, 2016.
U.S. Appl. No. 14/532,707, Non-Final Office Action mailed Feb. 25, 2016.
U.S. Appl. No. 14/532,732, Non-Final Office Action mailed Apr. 11, 2016.
U.S. Appl. No. 13/503,841, Final Office Action mailed Jun. 9, 2016.
U.S. Appl. No. 13/503,842, Notice of Allowance mailed Jul. 11, 2016.
U.S. Appl. No. 14/532,707, Notice of Allowance mailed Jun. 8, 2016.
U.S. Appl. No. 14/532,732, Final Office Action mailed Oct. 3, 2016.

* cited by examiner

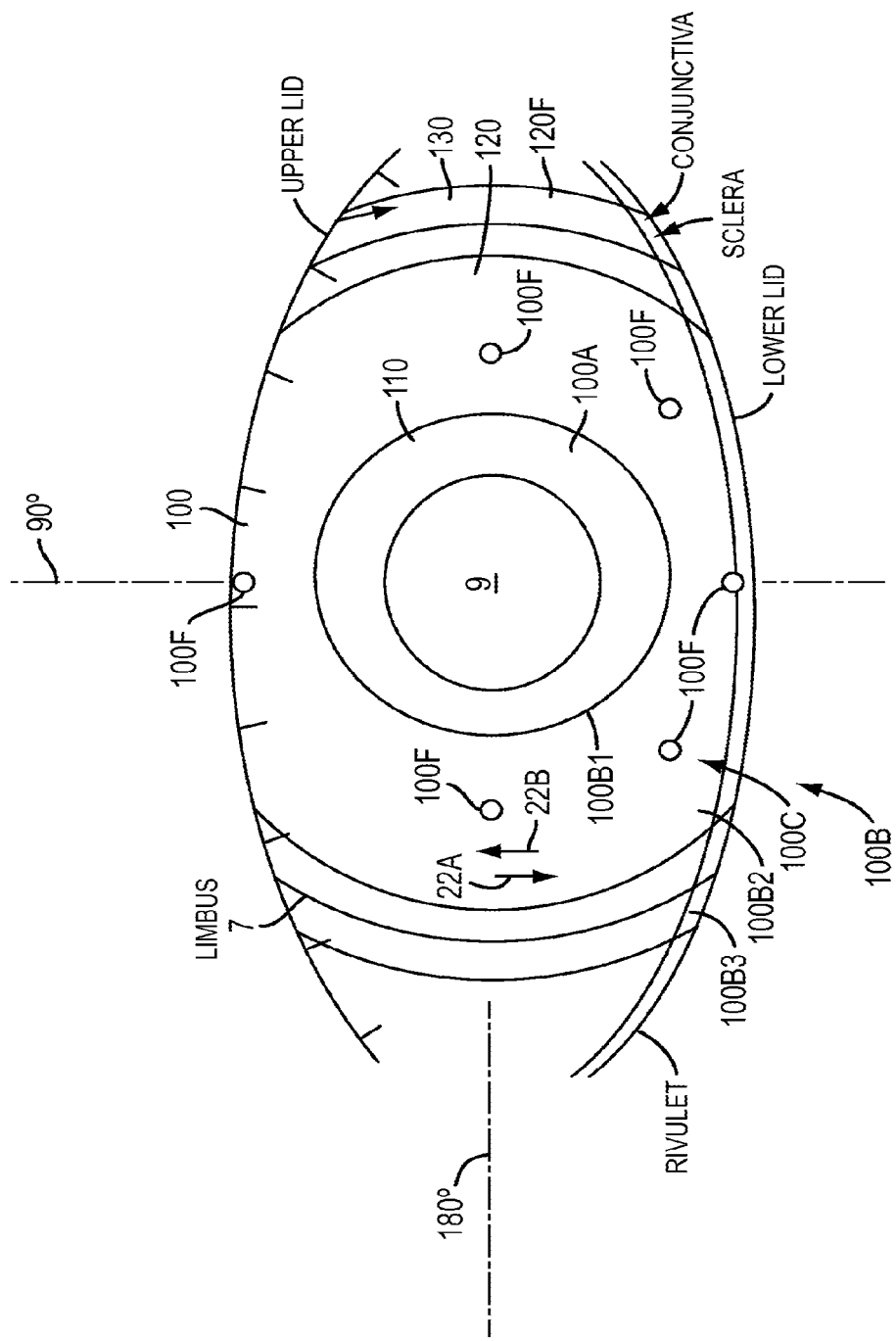
FIG. 1A1

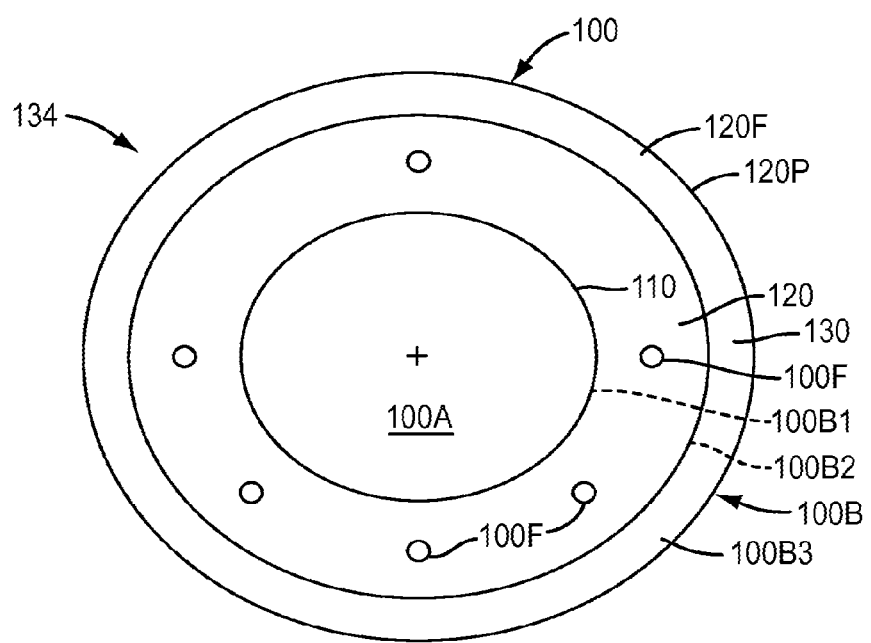
FIG. 1A2

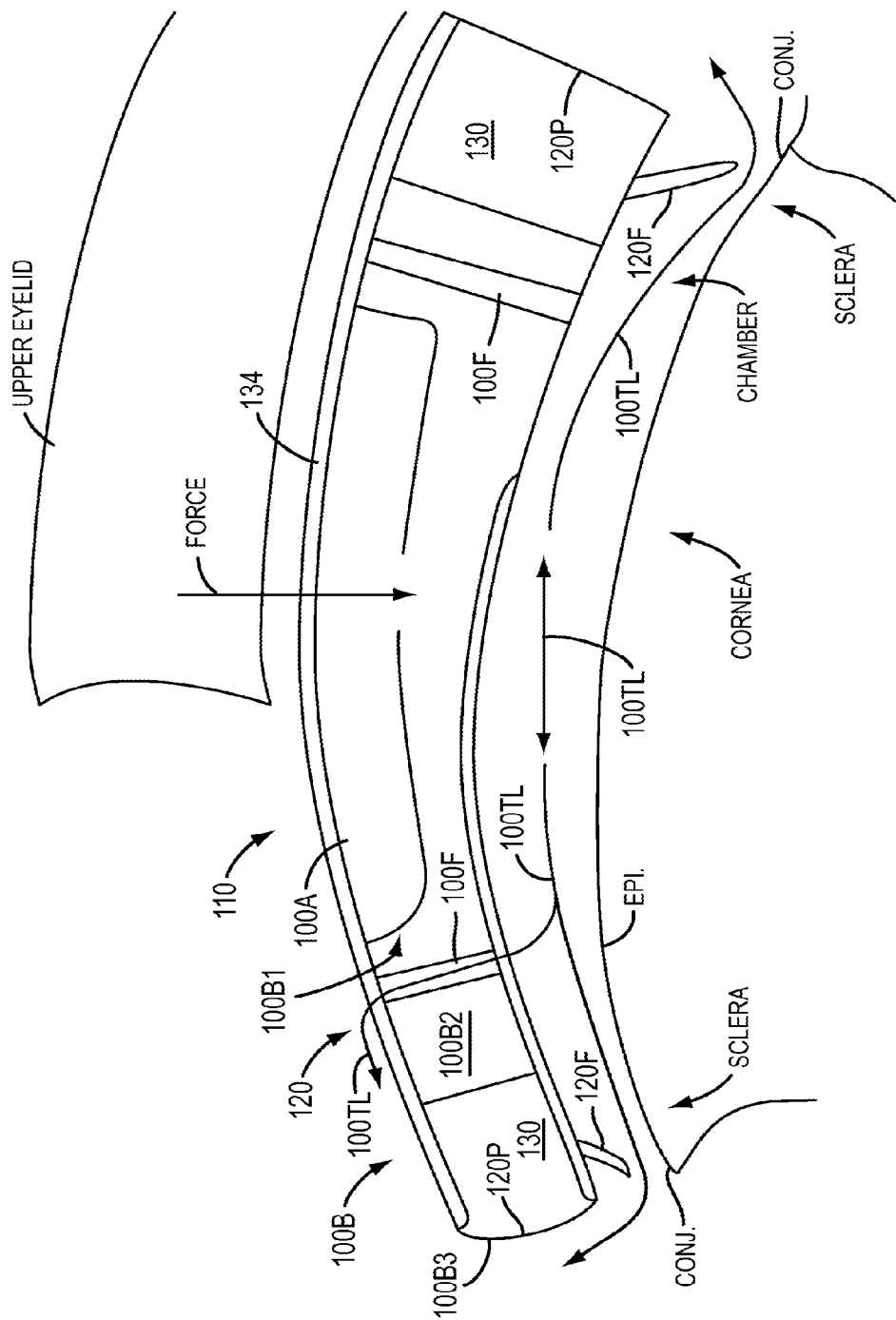
FIG. 1A3

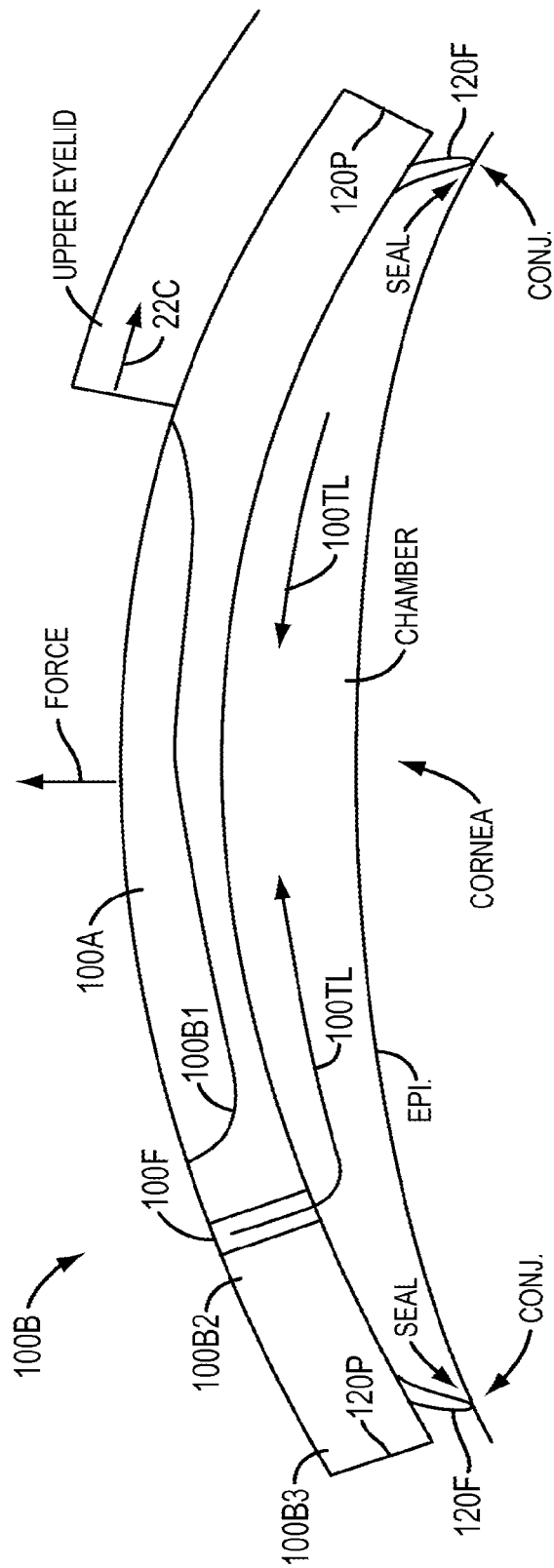
FIG. 1A4

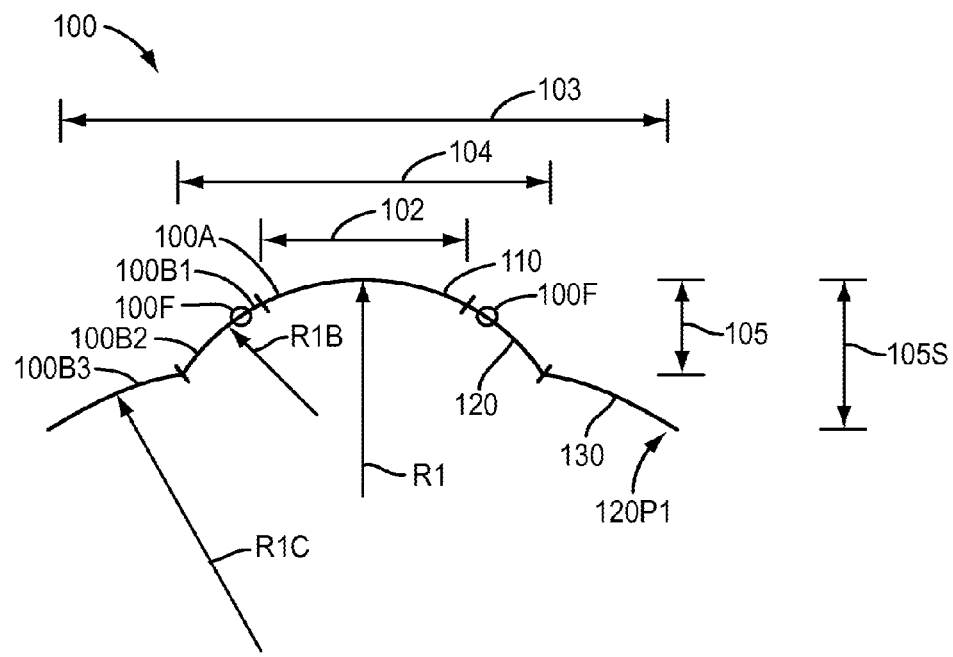
FIG. 1B1
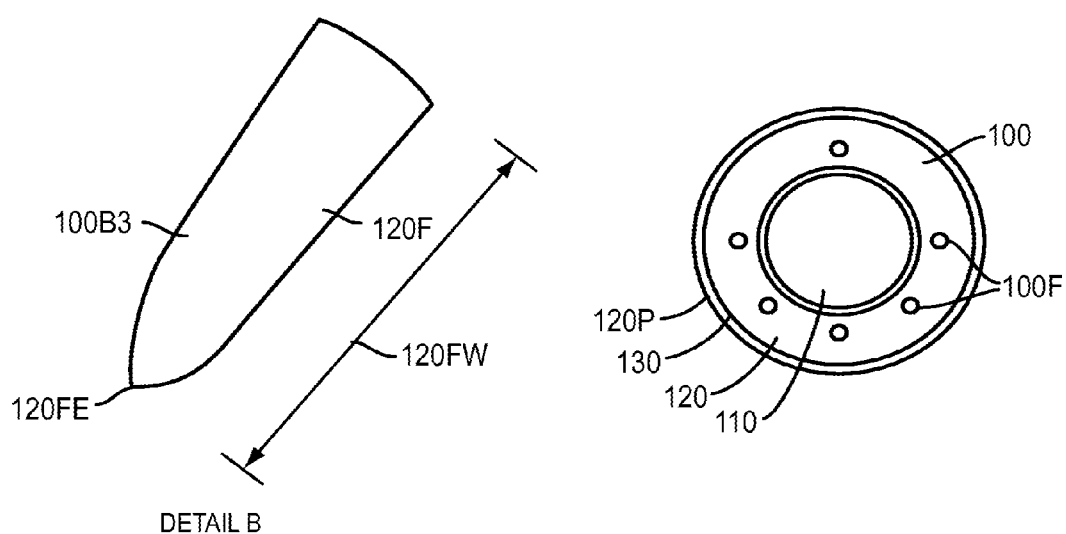
DETAIL B
FIG. 1B3
FIG. 1B4

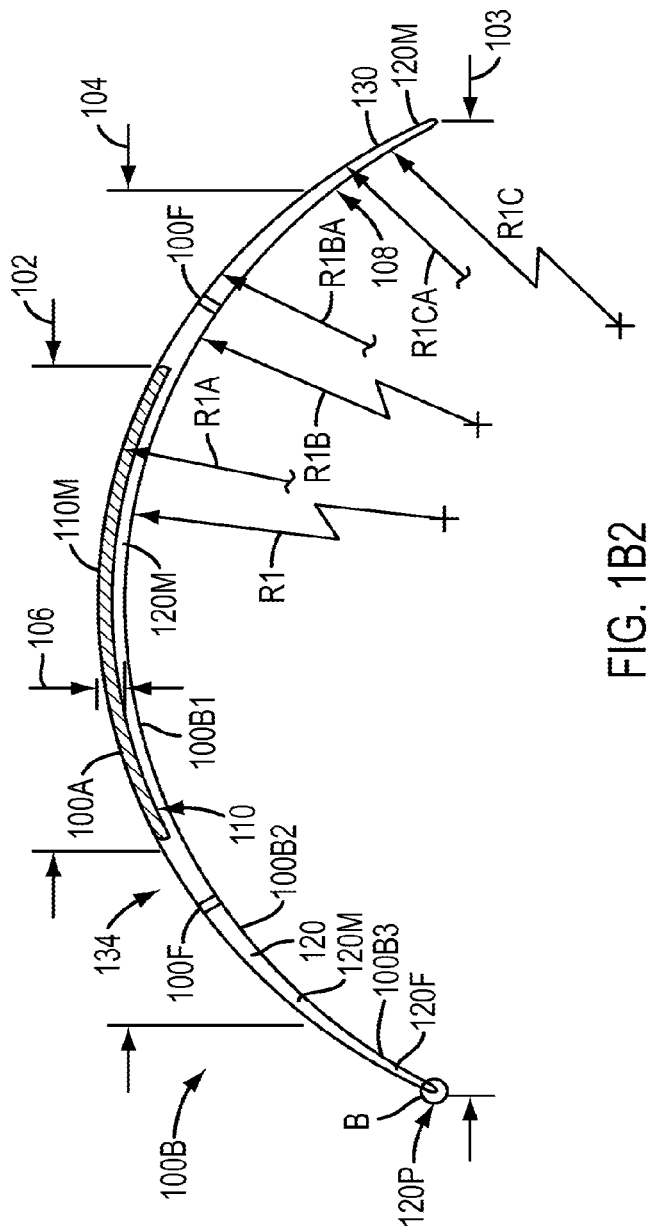
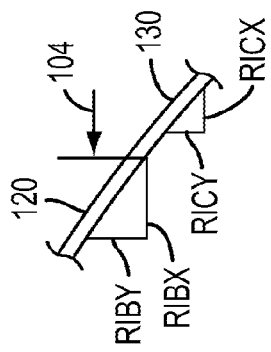
FIG. 1B2
FIG. 1B2-1

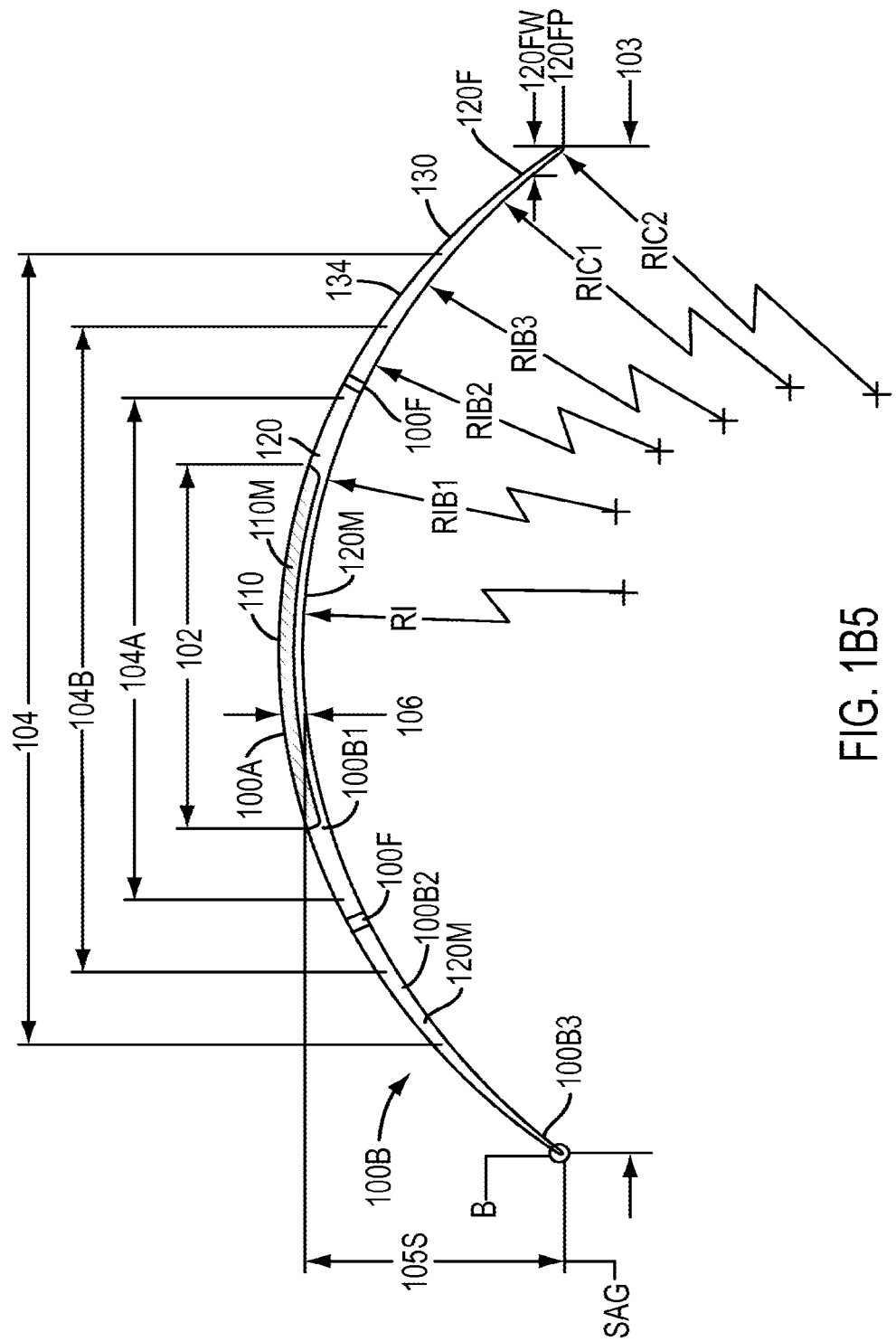
FIG. 1B5

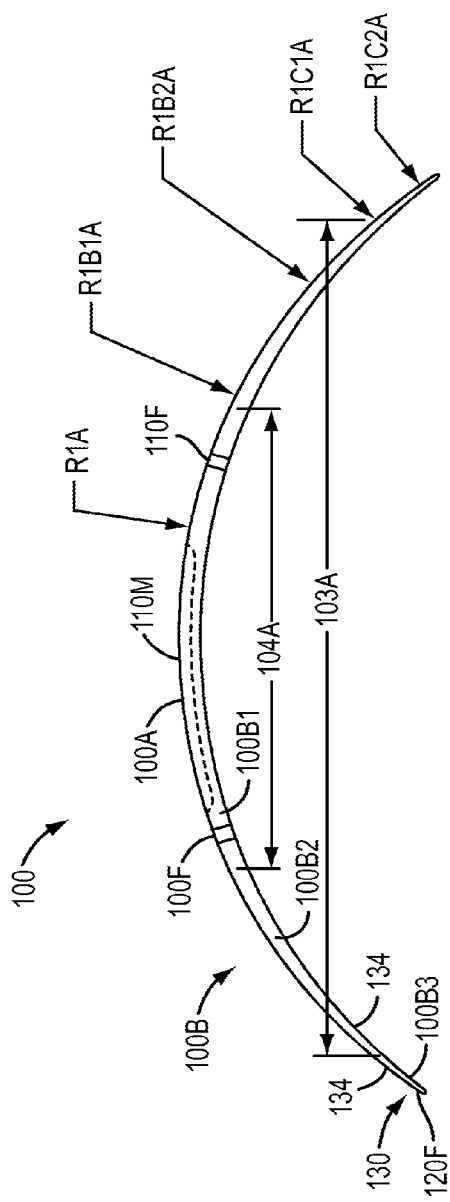
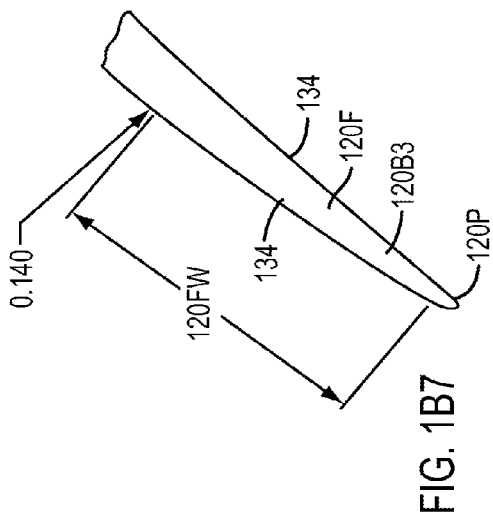
FIG. 1B6
FIG. 1B7

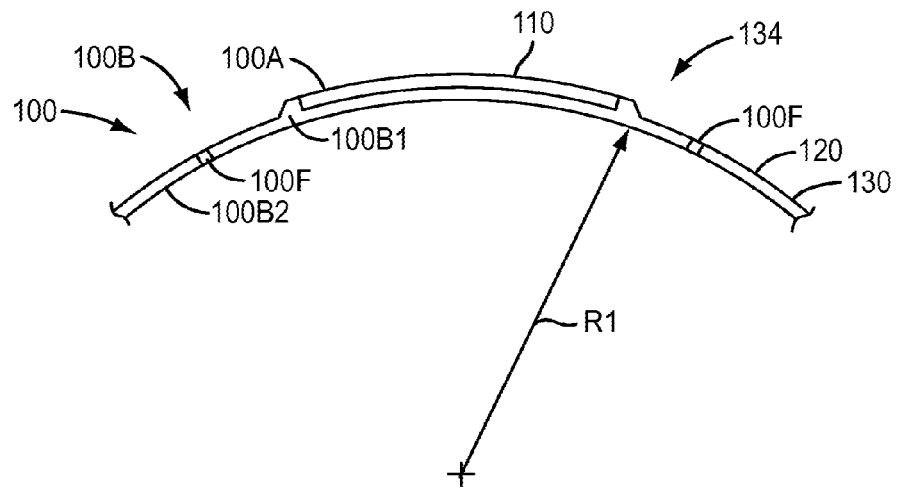
FIG. 1C
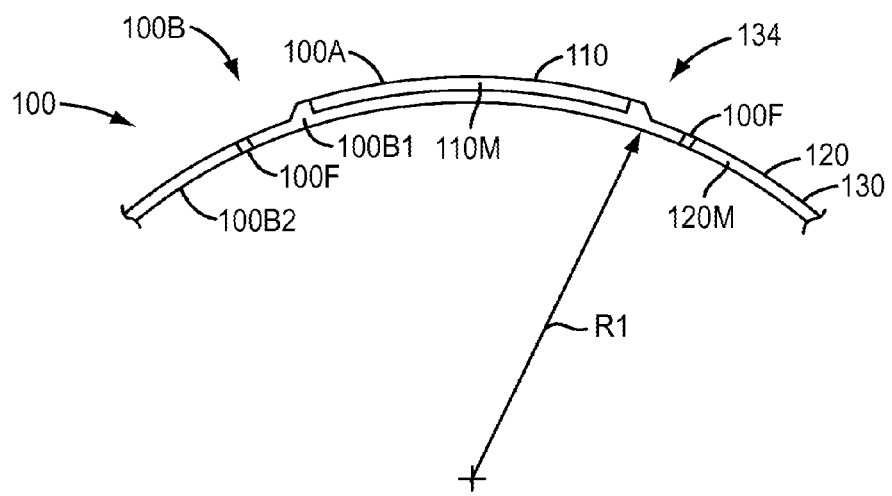
FIG. 1C1

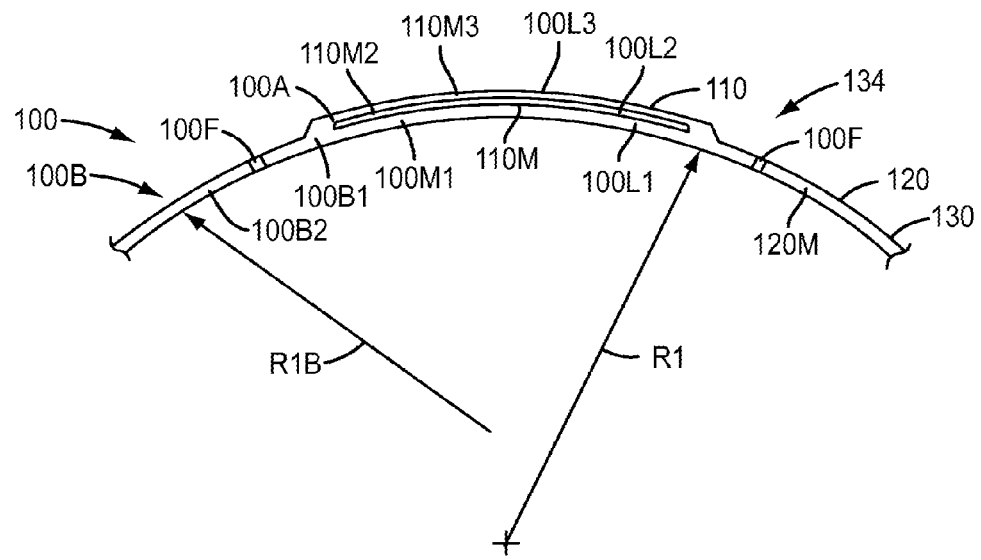
FIG. 1C2
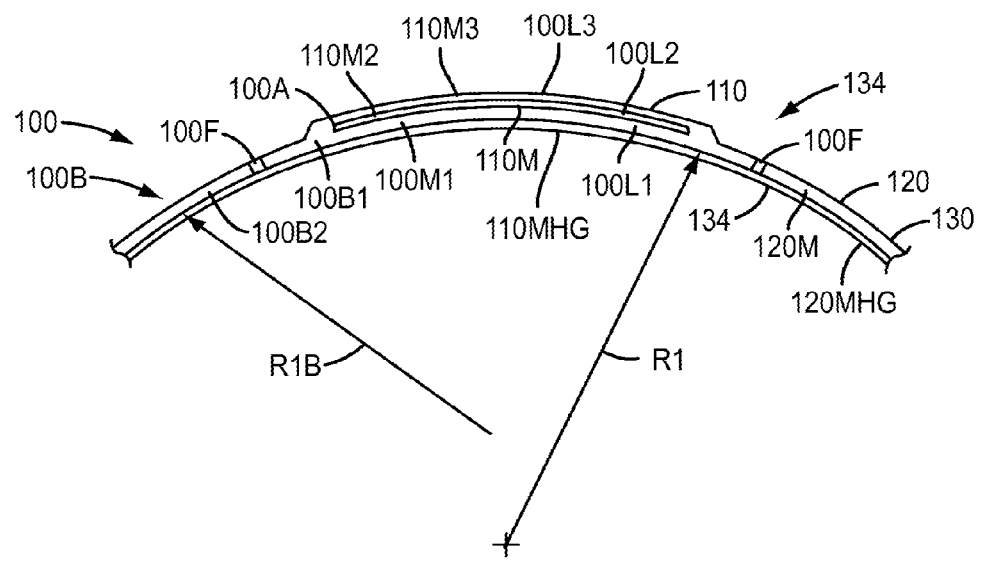
FIG. 1C2A

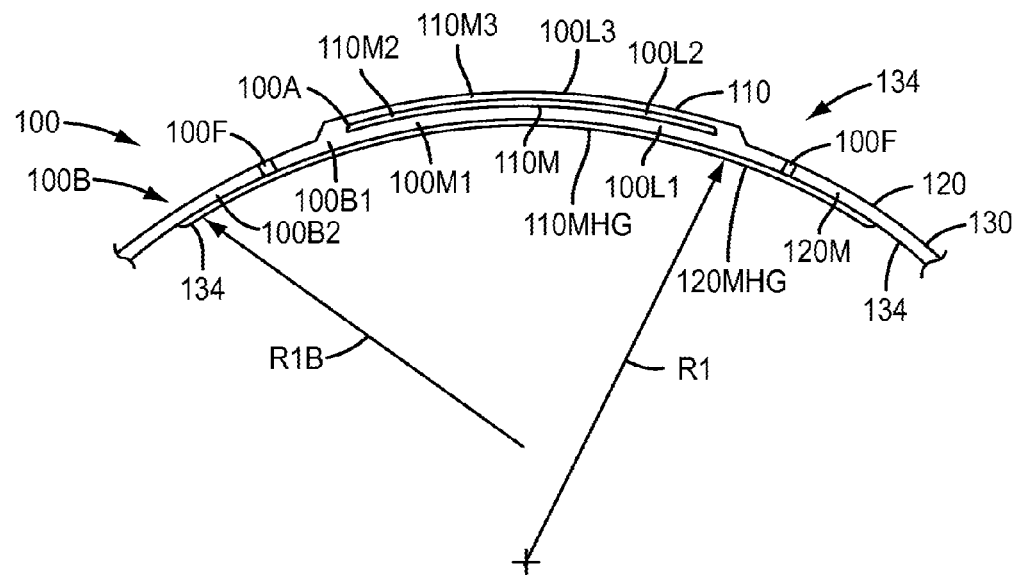
FIG. 1C2B
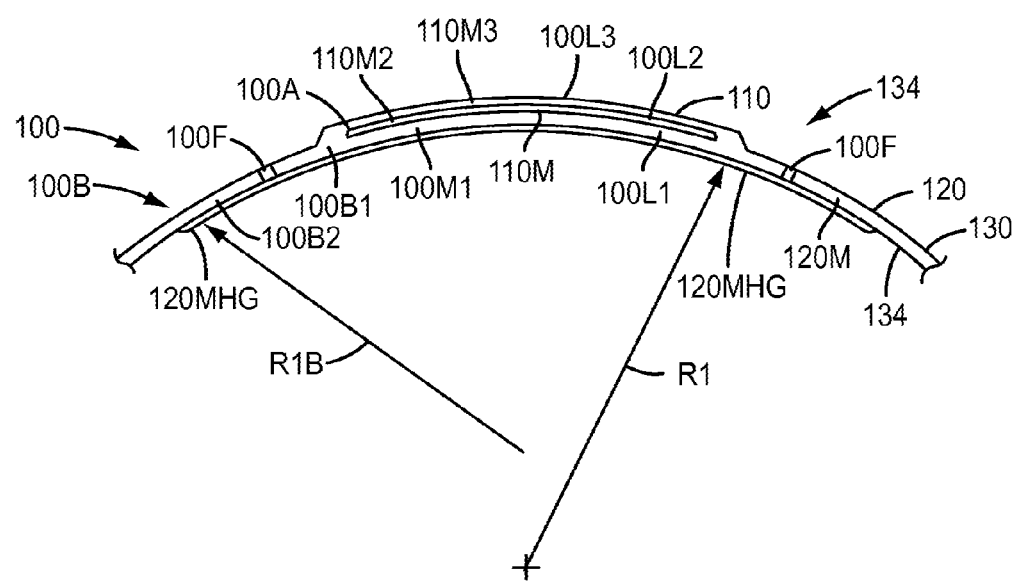
FIG. 1C2C

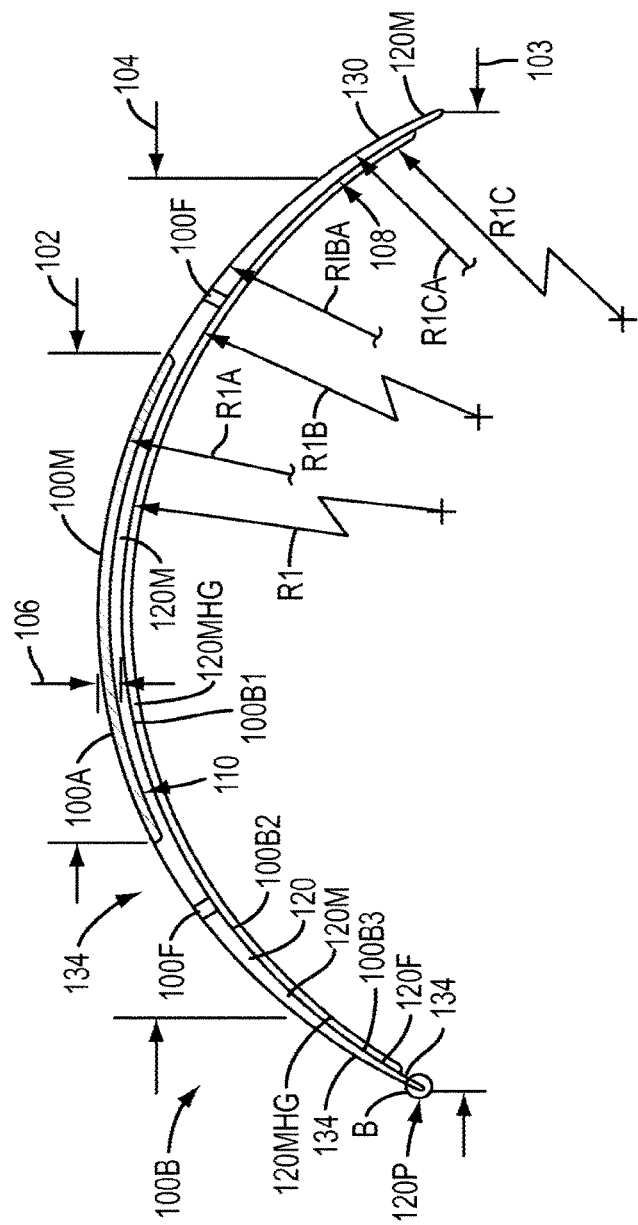
FIG. 1C3

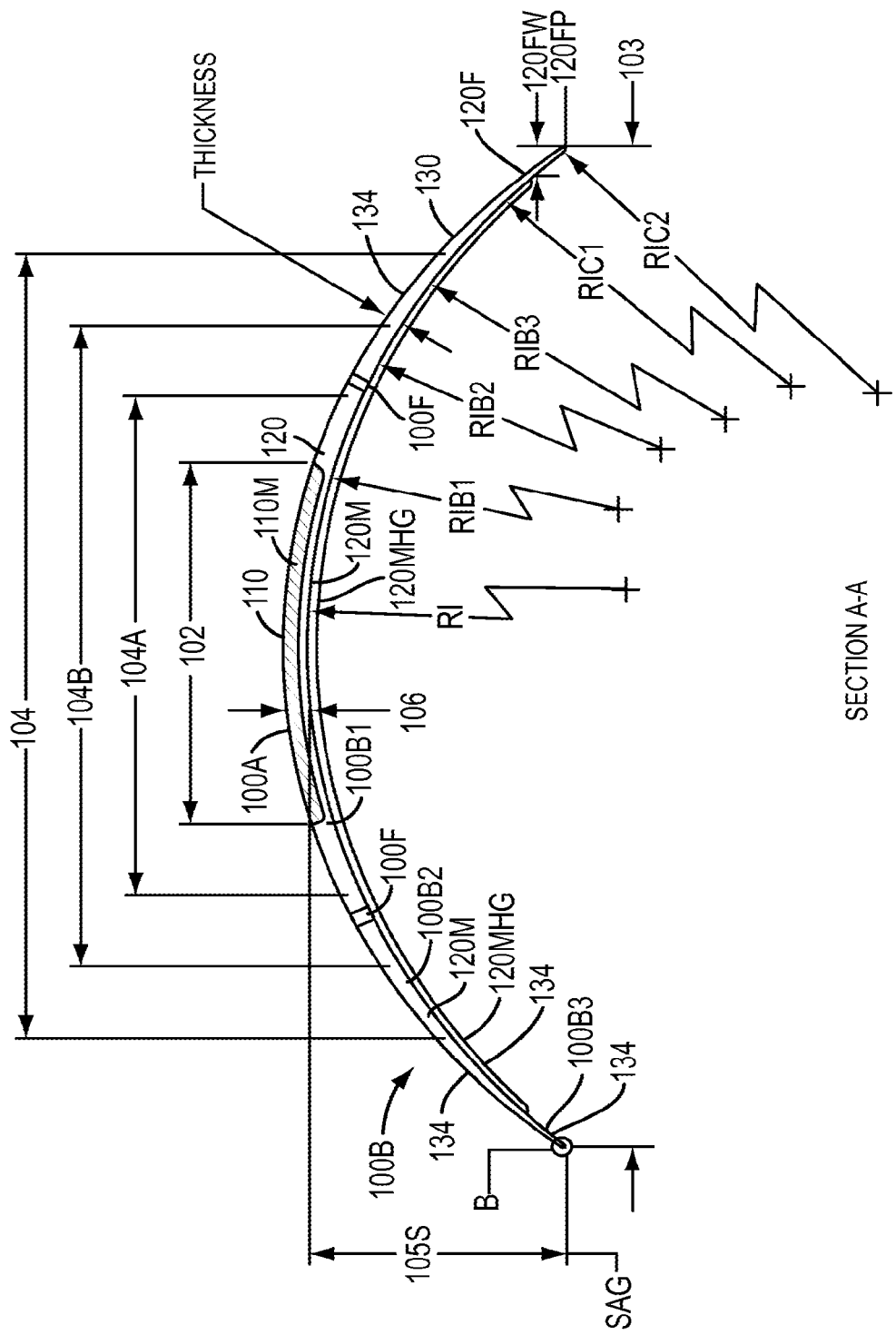
SECTION A-A
FIG. 1C4

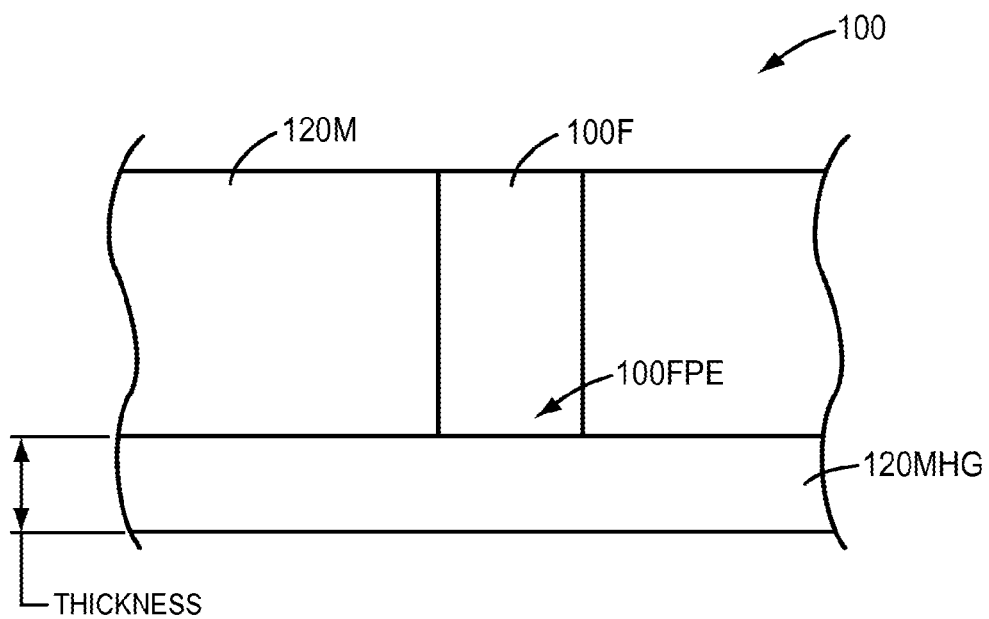
FIG. 1C5
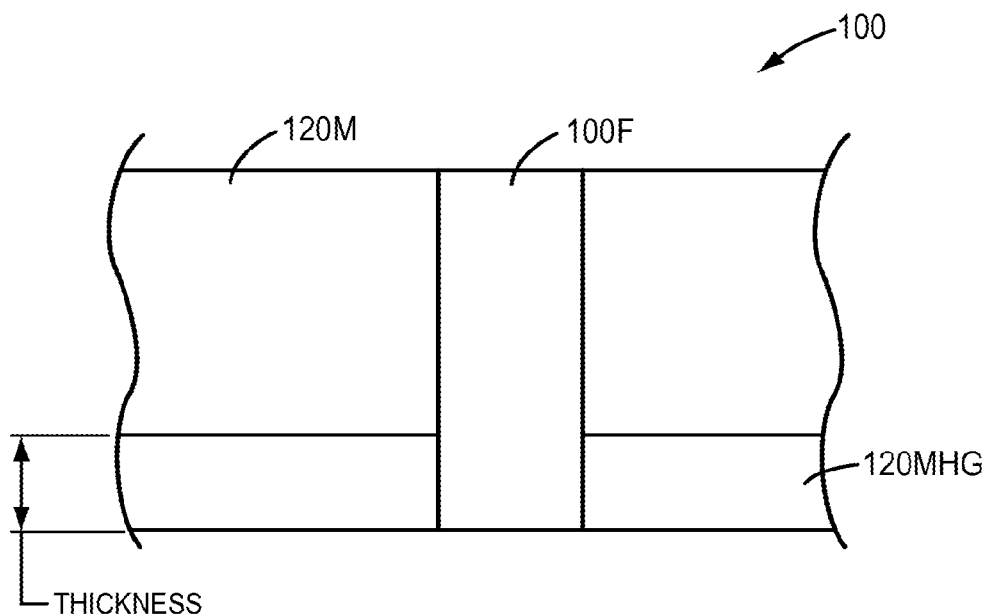
FIG. 1C6

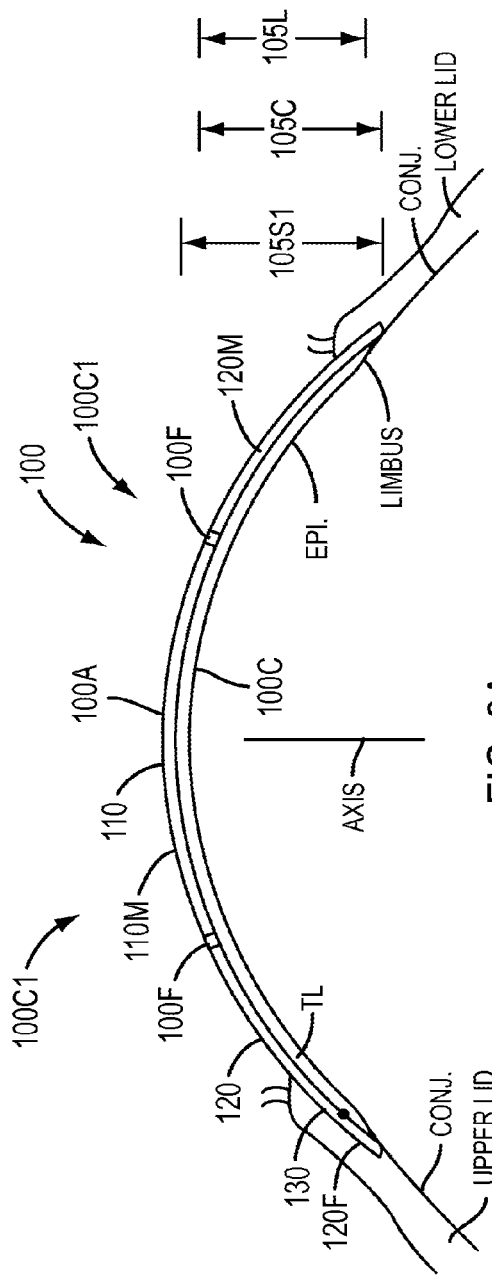
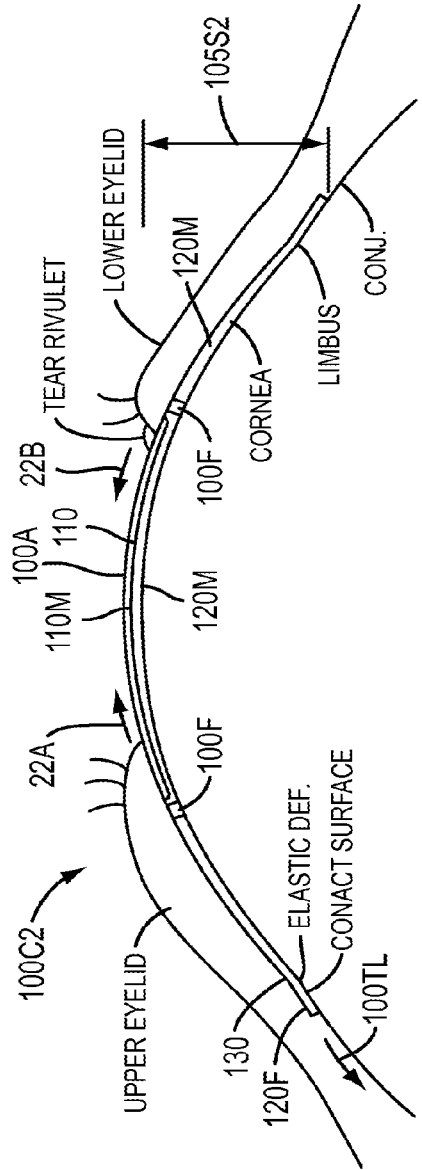
FIG. 2A
FIG. 2B

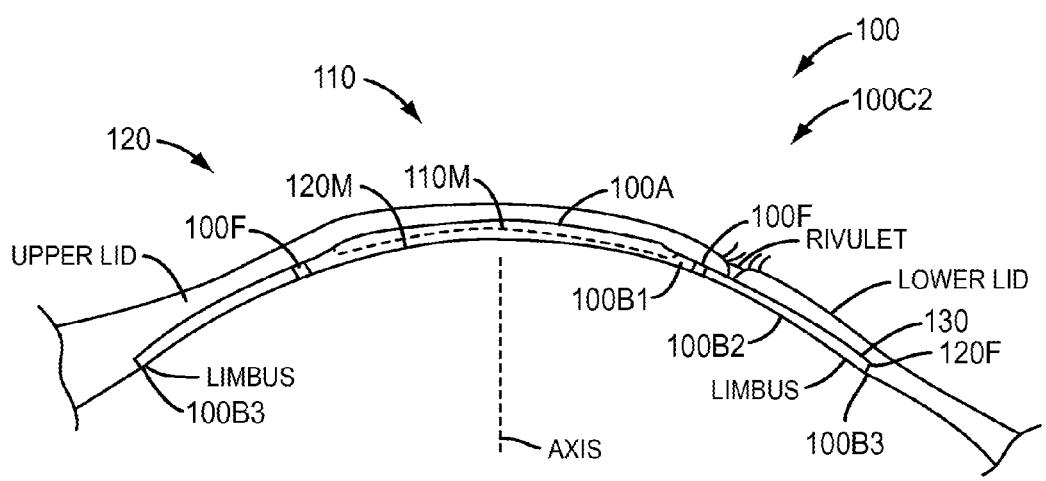
FIG. 2F1

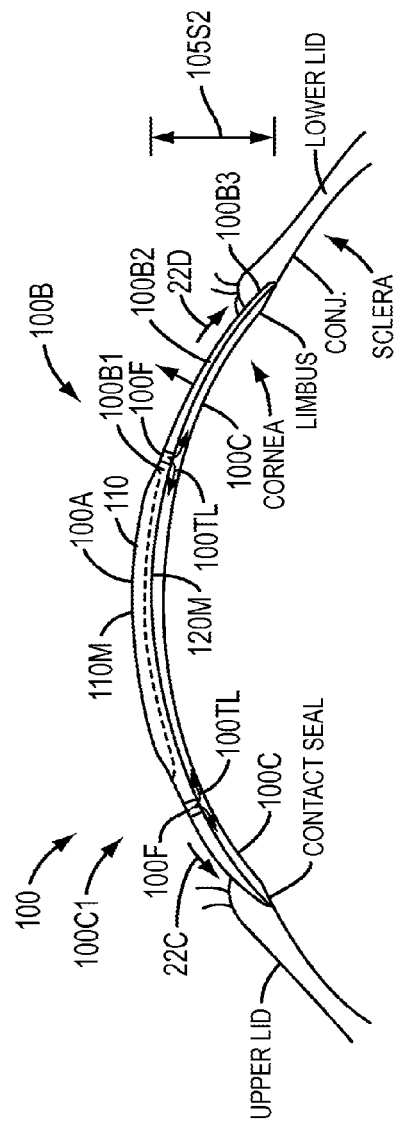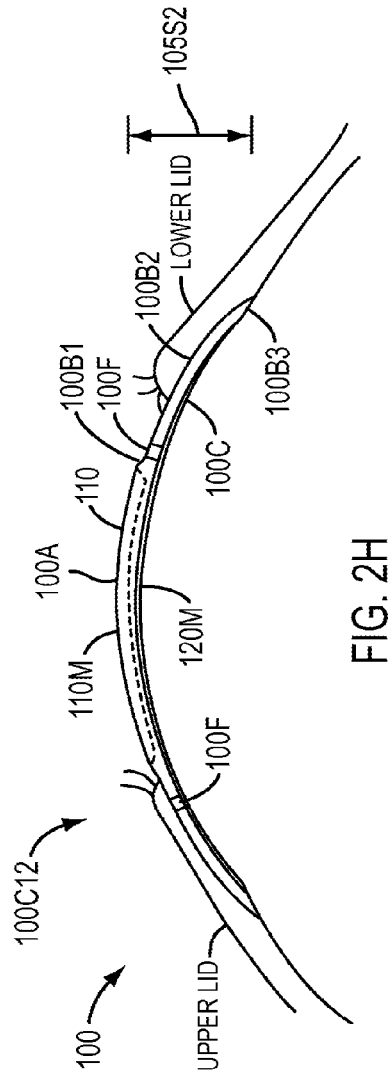

EYE COVERING AND REFRACTIVE CORRECTION METHODS AND APPARATUS HAVING IMPROVED TEAR FLOW, COMFORT, AND/OR APPLICABILITY

RELATED APPLICATIONS

This application is a divisional application of U.S. application Ser. No. 13/456,168 filed on Apr. 25, 2012, now allowed, which claims benefit of U.S. Provisional Application No. 61/636,404 filed on Apr. 20, 2012, U.S. Provisional Application No. 61/507,971 filed on Jul. 14, 2011, and U.S. Provisional Application No. 61/480,222 filed on Apr. 28, 2011, each of which is incorporated in its entirety.

BACKGROUND OF THE INVENTION

The present invention is generally directed to vision and treatment of the eye to provide improved vision. Although specific reference is made to coverings for vision correction such as the correction of refractive error and also to treatment of eyes having epithelial defects following photorefractive keratectomy, embodiments of the present invention may comprise extended wear contact lenses that can be used to correct vision in many ways such as with one or more of aberration correction, multifocal correction, presbyopia correction, and astigmatism correction.

The eye includes several tissues that allow patients to see. The cornea of the eye is an anterior tissue of the eye that is clear in healthy eyes and refracts light so as to form an image on the retina. The retina is a posterior tissue of the eye that senses light from the image formed thereon and transmits signals from the image to the brain. The cornea includes an outer layer of tissue, the epithelium, which protects the underlying tissues of the cornea, such as Bowman's membrane, the stroma and nerve fibers that extend into the stroma and Bowman's. The healthy eye includes a tear film disposed over the epithelium. The tear film can smooth small irregularities of the epithelium so as to provide an optically smooth surface. The tear film is shaped substantially by the shape of the underlying epithelium, stroma, and Bowman's membrane, if present. The tear film comprises a liquid that is mostly water and does include additional components, such as mucoids and lipids. The many nerve fibers of the cornea provide sensation to promote blinking that can cover the cornea with the tear film. The never fibers also sense pain so that one will normally avoid trauma to the cornea and also avoid direct contact of an object to the cornea so as to protect this important tissue.

Work in relation to embodiments of the present invention suggests that at least some of the prior contact lenses and therapeutic coverings can be less than ideal in at least some instances. Many contact lenses and therapeutic coverings can be left in the eye for less than idea amounts of time, as the patient removing and replacing the contact lens or therapeutic covering can be somewhat cumbersome and in at least some instances patients may leave the contact lens or therapeutic covering in the eye for amounts of time that can be longer than would be ideal. Although extended wear lenses can be left in the eye for somewhat longer amounts of time, the amount of time such lenses can be left in the eye can be less than ideal. Work in relation to embodiments of the present invention also suggests that tear flow of the prior contact lenses can be less than ideal, and that less than ideal tear flow may be related to the potential complications and can limit the amount of time such lenses can be left in the eye.

In the healthy cornea, the proper amount of hydration of the cornea, sometimes referred to as dehydration of the cornea, is maintained such that the cornea remains clear. The cornea includes a posterior endothelial layer that pumps water from the cornea into the adjacent anterior chamber. The epithelium inhibits flow of water from the tear liquid into the cornea, such that the corneal stroma can be maintained with the proper amount of hydration with endothelial pumping. The endothelial pumping of water from the cornea to maintain the proper hydration and thickness of the eye is often referred to as deturgescence. When the corneal epithelium heals, the layer of cells forming over the defect can be at least somewhat irregular in at least some instances, such that the vision of the patient can be less than ideal.

As the post-ablation cornea may have a complex shape, many of the prior commercially available lenses may not fit the ablated cornea as well as would be ideal, and in at least some instances fitting of lenses can be time consuming and awkward. Commercially available contact lenses having a rigid central RGP portion and a soft peripheral skirt can be difficult and/or time consuming to fit to the ablated cornea and may not fit very well in at least some instances. The ablated cornea may comprise an abrupt change in curvature near the edge of the ablation, and in at least some instances it can be difficult to fit such lenses near the edge of the ablation. Also, at least some of the commercially available contact lenses may not be suitable for extended wear and may be removed each day, which can be somewhat awkward for a patient and can result in lack of compliance and lenses remaining in the eye longer than would be ideal in at least some instances.

In light of the above, it would be desirable to provide improved contact lenses for vision correction and coverings for treatments related to epithelial defects of the cornea, such as epithelial defects following PRK. Ideally, these contact lenses and coverings would provide treatments that improve tear flow and avoid at least some of the deficiencies of known techniques while providing improved patient comfort and/or vision.

BRIEF SUMMARY OF THE INVENTION

Embodiments of the present invention provide an improved coverings that provide improved vision for extended amounts of time and can be used treat normal eyes or eyes having an epithelial defect, such as an epithelial defect subsequent to refractive surgery such as PRK. The covering may comprise a contact lens and can provide improved tear flow such that the covering can be left on the eye to correct vision for extended amounts of time. The covering may comprise a water inhibiting layer and one or more structures to pump tear liquid under the water inhibiting layer of the covering such that the covering can remain in the eye and correct vision for an extended amount of time. Alternatively or in combination, the covering may comprise a hydrogel layer extending along a posterior surface of the covering coupled to the fenestrations to provide hydration and patient comfort. The hydrogel layer may fluidly couple the cornea to the fenestrations so as to pass tear liquid and therapeutic agents from an anterior surface of the covering through the fenestrations and hydrogel to the cornea. In many embodiments, the covering comprises a material having fenestrations and an outer portion shaped to contact the conjunctiva to pump tear liquid when the eye blinks. The covering may comprise a deflectable outer portion having a resistance to deflection such that a chamber is formed when the covering is placed on the eye and the eye is open with the eyelids separated. A hydrogel layer coupled to the fenestrations may extend along a lower surface of the covering at least a portion of the chamber. The resistance to deflection of the deflectable outer portion can be configured such that the outer portion deflects inward toward the cornea when the eyelid closes to pump tear liquid. The fenestrations can draw tear liquid into the chamber located under the covering when the eye opens and the chamber can expands. The fenestrations may extend through the hydrogel layer to provide pumping. Alternatively or in combination, the hydrogel layer may cover the posterior end of the fenestrations and the deflection of the outer portion can encourage movement of liquid and medicament along the hydrogel. The outer portion of the covering comprises a sclera coupling portion shaped to contact the conjunctiva to define the chamber when the covering is placed on the eye. The fenestrations and sclera coupling portion of the covering can pass tear liquid away from the chamber when the eye closes and pressure of one or more eyelids urges the covering toward the cornea such that the chamber volume decreases. In many embodiments, opening of the eye so as to separate the eyelids reduces pressure on the outer portion of the covering such that the outer portion of the covering over an outer portion of the cornea can separate from the outer portion of the cornea so as to draw liquid through the fenestrations and into the chamber located under the covering. The sclera coupling portion of covering may contact the conjunctiva to inhibit the flow of tear liquid under the sclera coupling portion when the eye opens and tear liquid is drawn through the fenestrations, for example with formation of a seal where the covering contacts the conjunctiva. When the eye blinks subsequently, the pressure of the one or more eyelids can urge the covering toward the cornea such that tear liquid can pass through the fenestrations, and the sclera coupling portion may separate slightly from the conjunctiva to pass tear liquid under the sclera coupling portion, so as to rinse the cornea, the limbus, the conjunctiva and the underside of the covering with the pumped tear liquid. The covering may comprise a material having high oxygen permeability such as silicone such that the covering may provide improved tear flow and high oxygen permeability. This improved flow of tear liquid can allow the covering such as a contact lens to be worn for extended amounts of time of at least about one week, for example thirty days or sixty days or more. The improved tear flow can improve healing and vision of eyes with epithelial defects, for example epithelial defects following PRK.

In many embodiments, the covering comprises an inner optical component for vision, such as a lens, and an outer coupling component to hold the inner component in relation to the pupil to improve vision. The coupling component may comprise a deflectable material that inhibits passage of the tear liquid through the material such that the tear liquid passes through the fenestrations when the eye blinks and an eyelid exerts pressure on the optical component. The outer coupling component may comprise the fenestrations to pass the tear liquid and the outer sclera coupling portion to contact the conjunctiva. The optical component may comprise a first material and first thickness corresponding to a first rigidity. The coupling component may comprise a second material and a second thickness corresponding to a second rigidity. The second material can be softer than the first material and the second thickness can be less than the first thickness such that the coupling component can be deflected with the eyelid, and such that the coupling component can be deflected by an amount greater than the optical component when the eyelids close to cover the first component and the second component. The optical component can be more rigid than the coupling component, such that the optical component can provide vision when the outer portion is deflected with one or more eyelids.

The alignment of the optical component to the pupil provided with the coupling to the conjunctiva and underlying sclera can be beneficial for vision. The optical component can be held at a substantially fixed location in relation to the pupil so as to provide improved vision such as presbyopia correction and vision correction of aberrations that may depend on location of the pupil such as measured wavefront aberrations, spherical aberration, coma and trefoil.

The optical component and coupling component can be helpful to improve vision and regeneration of the epithelium in eyes with epithelial defects. The optical component can smooth the cornea and may smooth irregularities of the epithelium and ablated stroma. The coupling component can support the optical component so as to resist sliding movement of the optical component and provide an environment to promote regeneration of the epithelium. The pumping of the tear liquid may improve tear flow to the regenerating epithelium near the epithelial defect so as to promote regeneration of the epithelium over the defect. The pumping of the tear liquid can also promote delivery of a medicament, for example a steroid, to the ablated region so as to inhibit corneal infiltrates and haze.

In a first aspect, embodiments of the present invention provide a covering to treat an eye of a patient. The eye has a tear liquid, a pupil, a cornea, and a conjunctiva. The covering comprises an optical component to correct vision of the eye and a coupling component. The optical component comprises a first rigidity sufficient to resist deformation when placed on the eye. The coupling component contacts the cornea and the conjunctiva and supports the optical component in relation to the pupil. The coupling component comprises an outer portion sized to contact the conjunctiva, an inner portion to couple to the optical component, and an intermediate portion extending between the inner portion and the outer portion. One or more of the optical component or the coupling component comprises a plurality of fenestrations to pump the tear liquid when the eye blinks.

In many embodiments, the covering comprises an inner portion comprising the optical component and the inner portion of the coupling component. An outer portion of the covering may comprise the intermediate portion of the coupling component and the outer portion of the coupling component.

BRIEF DESCRIPTION OF THE DRAWINGS

FIG. 1-1A shows an ablated eye immediately following refractive surgery resulting in an epithelial defect, suitable for incorporation in accordance with embodiments of the present invention:

FIG. 1A1 shows a covering positioned on an eye and blinking of the eye, in accordance with embodiments of the present invention:

FIG. 1A2 shows the covering of FIG. 1A1 that is capable of pumping tear liquid under the covering, in accordance with embodiments of the present invention:

FIG. 1A3 shows a schematic illustration of the covering of FIGS. 1A1 and 1A2 pumping tear liquid when the eye closes, in accordance with embodiments of the present invention;

FIG. 1A4 shows a schematic illustration of the covering of FIGS. 1A1 and 1A2 pumping tear liquid when the eye opens, in accordance with embodiments of the present invention;

FIG. 1B1 shows a covering having a tricurve profile to fit sclera, which covering may be used to fit an ablated cornea, in accordance with embodiments of the present invention;

FIG. 1B2 shows a covering having a tricurve profile to fit sclera with slopes of the curved profiles aligned so as to inhibit ridges at the boundaries of the curved portions, in accordance with embodiments of the present invention;

FIG. 1B2-1 shows alignment of the slope of the lower surface of the corneal contacting portion with the slope of the lower surface of the sclera coupling portion, such that pressure to the limbus is decreased substantially, in accordance with embodiments of the present invention;

FIG. 1B3 shows a tapered edge of the covering of FIG. 1B1, in accordance with embodiments of the present invention;

FIG. 1B4 shows a plan view covering having a tricurve profile to fit the cornea, limbus and sclera with slopes of the curved profiles aligned so as to inhibit ridges at the boundaries of the curved portions, in accordance with embodiments of the present invention;

FIG. 1B5 shows a side sectional view of the covering of FIG. 1B4 and corresponding curved portions to couple to the cornea, limbus and sclera, in accordance with embodiments of the present invention;

FIG. 1B6 shows a side sectional view of the covering of FIG. 1B4 and corresponding curved portions of the upper surface, in accordance with embodiments of the present invention;

FIG. 1B7 shows a tapered edge of the covering of FIG. 1B4, in accordance with embodiments of the present invention;

FIG. 1C shows a covering comprising a single piece of material having an inner thickness greater than an outer thickness, in accordance with embodiments of the present invention;

FIG. 1C1 shows a covering as in FIGS. 1-2A to 1B2 having an inner portion comprising an inner thickness and an inner material and an outer portion comprising an outer thickness and an outer material, in which the inner thickness is greater than the outer thickness, in accordance with embodiments of the present invention;

FIG. 1C2 shows a covering as in FIGS. 1-2A to 1B2 having an inner portion comprising an inner thickness and an inner material and an outer portion comprising an outer thickness and an outer material, in which the inner thickness is greater than the outer thickness and the outer material extends around the inner material, in accordance with embodiments of the present invention;

FIG. 1C2A shows a covering as in one or more of FIGS. 1-2A to 1B7 having a layer of hydrogel material on a posterior surface of the covering, in accordance with embodiments of the present invention;

FIG. 1C2B shows a covering as in one or more of FIGS. 1-2A to 1B7 having a layer of hydrogel material on a posterior surface of the covering extending less than a maximum distance across the covering such that end portions of the covering are configured to engage the epithelium of the eye away from the hydrogel layer and inhibit movement of the covering when placed on the eye, in accordance with embodiments of the present invention;

FIG. 1C2C shows a covering as in one or more of FIGS. 1-2A to 1B7 having an annular layer of hydrogel material on a posterior surface of the covering such that an inner portion of the covering contacts the cornea away from the hydrogel layer and an outer portion of the covering contacts the cornea away from the covering when placed on the eye, in accordance with embodiments of the present invention;

FIG. 1C3 shows a shows a covering having a tricurve profile to fit sclera with slopes of the curved profiles aligned so as to inhibit ridges at the boundaries of the curved portions as in FIG. 1B2 and having a layer of hydrogel material on a lower surface, in accordance with embodiments of the present invention;

FIG. 1C4 shows a plan view covering having a tricurve profile to fit the cornea, limbus and sclera with slopes of the curved profiles aligned so as to inhibit ridges at the boundaries of the curved portions as in FIG. 1B4 and having a hydrogel material on a lower surface extending less than a maximum distance across the covering to engage the conjunctiva with the covering away from the hydrogel material, in accordance with embodiments of the present invention;

FIG. 1C5 shows a fenestration having a posterior end covered with a layer of hydrogel extending along the posterior surface of the covering, in accordance with embodiments of the present invention;

FIG. 1C6 shows a fenestration extending through a layer of hydrogel extending along the posterior surface of the covering, in accordance with embodiments of the present invention;

FIG. 2A shows a covering comprising a contact lens placed on the eye with the eyelids separated, in accordance with embodiments;

FIG. 2B shows a side sectional view of the covering of FIG. 2A with the eyelids closing, in accordance with embodiments;

FIG. 2C shows a front view the covering of FIG. 2A with the eyelids closing, in accordance with embodiments;

FIG. 2F1 shows a side sectional view of the covering of FIG. 2F with rotation of the eye when the lids close such that sliding of the covering along the epithelium is inhibited when tear liquid is pumped, in accordance with embodiments;

FIG. 2G shows a side view sectional view of the covering of FIG. 2E with the eyelids opening, in accordance with embodiments;

FIG. 2H shows a side view sectional view of the covering of FIG. 2E with the eyelids located at an intermediate location such that the chamber comprises an intermediate volume, in accordance with embodiments;

FIG. 5 shows a covering in accordance with certain embodiments.

DETAILED DESCRIPTION OF THE INVENTION

Figure 1:
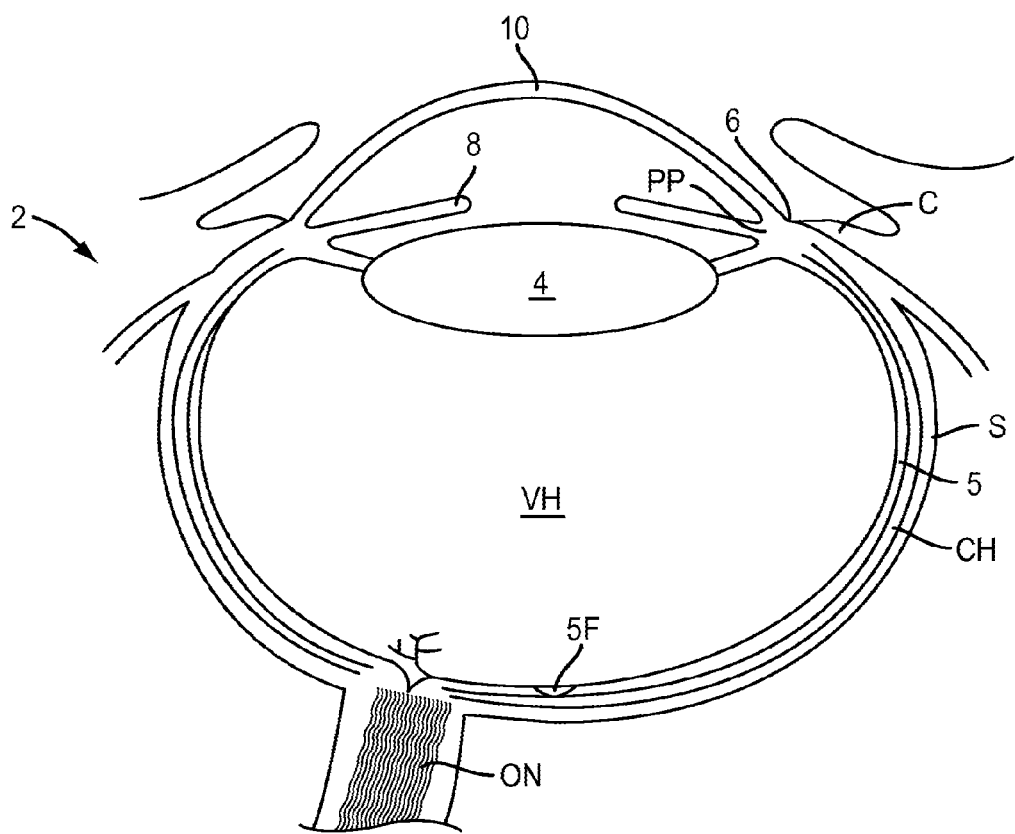
FIG. 1 shows an eye suitable for use with the covering as described herein, in accordance with embodiments of the present invention.

Embodiments of the present invention as described herein can be combined with the therapeutic covering device for pain management and vision as described in U.S. patent application Ser. No. 12/384,659, filed Apr. 6, 2009, entitled "Therapeutic Device for Pain Management and Vision", the full disclosure of which is incorporated herein by reference and suitable for combination in accordance with some embodiments of the present invention as described herein.

As used herein, a covering is used to refer to an ophthalmic device that covers an eye of a patient and that does not by itself provide refractive vision correction. Ophthalmic devices that provide refractive correction are referred to herein as contact lenses or ophthalmic lenses.

The embodiments described herein can be used to treat eyes in many ways with a covering such as a contact lens. The covering described herein can be used for long term vision correction with extended wear contact lenses that inhibit swelling of the cornea when the covering is positioned on the eye for an extended period, and may also be combined with many forms of ocular surgery, such as photorefractive keratectomy.

As used herein, mathematical equations and scientific notation can be used to values in many ways understood by a person of ordinary skill in the art, for example so as to express data in accordance with notations used in many commercially available spreadsheets such as Excel™ commercially available from Microsoft. As used herein the symbol "E" can be used to express an exponent in base 10, such that 1E1 equals about 10, 2E1 equals about 20, and 4E2 equals about 400. As used herein the symbol "^" can be used to express an exponent, such that A^B equals $A^B$. Units can be expressed in many ways and as would be understood by a person of ordinary skill in the art, for example "m" as meters, "Pa" as the Pascal unit for pressure, "MPa" as Mega Pascal.

As used herein, a siloxane bond encompasses a covalent Si—O—Si bond, for example of a silicone elastomer.

As used herein, an on K fit of a covering such as a contact lens encompasses fitting the contact lens to the flattest meridian of the cornea to and the on K fit can be flatter than the flatters meridian within about 1.5 D. For example, for a cornea having keratometer values (hereinafter "K's") of about 44 D axis 90 and 43 D axis 180, the on K fit would fit would provide a covering having a curvature corresponding to an optical power within a range from about 43 D to about 41.5 D for the region of the eye measured. The on K fit as described herein can allow for tear liquid to form under the covering such that the tear liquid can be pumped in accordance with embodiments as described herein.

The optical power of the cornea in Diopters ("D") can be related to the radius R of curvature with the formula D=(1.3375−1)/R, where 1.3375 corresponds to the index of refraction of the aqueous humor and corresponds to the radius of curvature of the cornea. The curvature of the cornea is inversely related to the radius of curvature such that as the radius of curvature increases the curvature of the cornea decreases and such that as the radius of curvature decreases the curvature of the cornea increases.

FIG. 1 shows an eye 2 suitable for use with the covering 100 as described herein. In many embodiments, covering 100 comprises a contact lens. The eye has a cornea 10 and a lens 4 configured to form an image on the retina 5, and the image can form on a fovea 5F corresponding to high visual acuity. The cornea can extend to a limbus 6 of the eye, and the limbus can connect to a sclera S of the eye. The eye 2 has a pars plana PP located near limbus 6. A conjunctiva of the eye can be disposed over the sclera. The lens can accommodate to focus on an object seen by the patient. The eye has an iris 8 that defines a pupil 9 that may expand and contract in response to light. The eye also comprises a choroid CH disposed the between the sclera 7 and the retina 5. The eye has a vitreous humor VH extending between the lens and the retina. The retina 5 senses light of the image and converts the light image to neural pulses that are processed and transmitted along an optic nerve ON to the brain of the patient.

Figures 1, 1A:
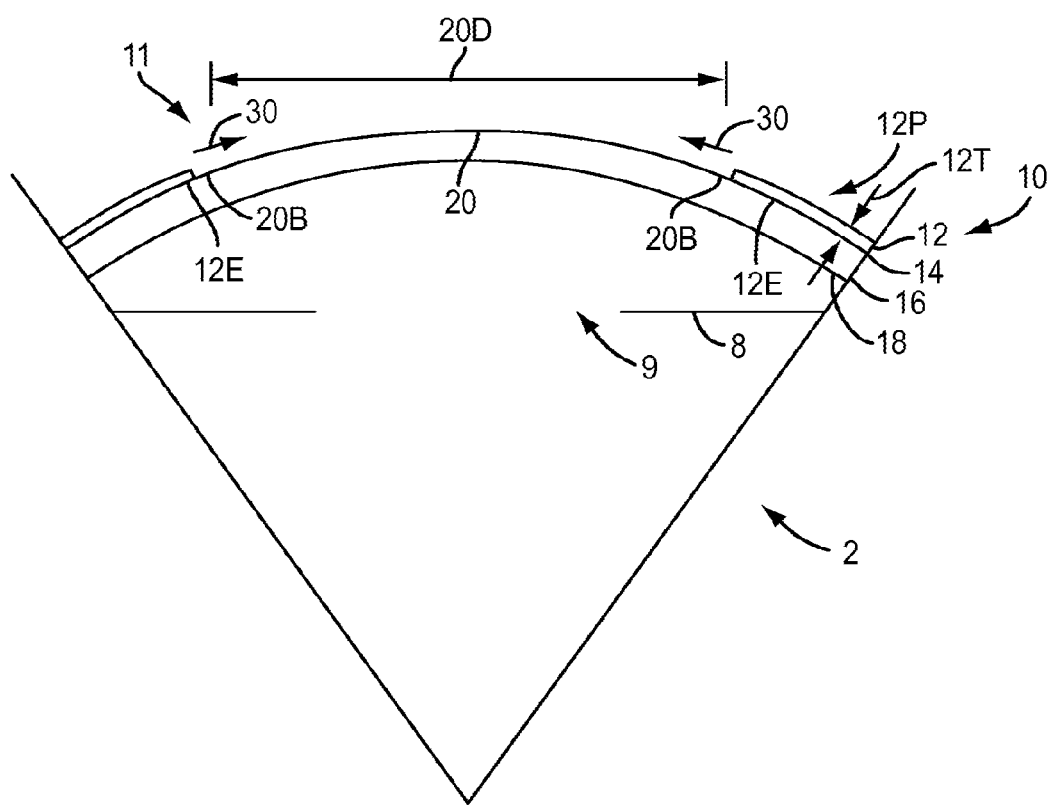

FIG. 1-1A shows an ablated eye immediately following refractive surgery, for example PRK surgery resulting in an epithelial defect. The covering comprising the contact lens as described herein can be placed over the ablated cornea and coupled to the conjunctiva to provide improved vision. The eye 2 comprises an iris 8 that defines a pupil 9, through which light passes such that the patient can see. Cornea 10 includes an epithelium 12 disposed over a stroma 16. The epithelium 12 comprises a thickness 12T that can be about 50 µm. A tear liquid covers the anterior surface of epithelium 12. In at least humans, primates and some birds, a Bowman's membrane 14 is disposed between epithelium 12 and stroma 16. Bowman's membrane 14 comprises an cellular substantially collagenous tissue with a thickness of about 5 to 10 microns. Stroma 16 comprises a substantially collagenous tissue with keratocytes disposed therein. In some animals, Bowman's membrane may be absent and the epithelium may be disposed adjacent to the stromal layer. An endothelium 18 is disposed under stroma 16. Endothelium 18 comprises a layer of cells that pump water from cornea 10 toward iris 8. Tear liquid also covers surfaces of the cornea that are exposed by the epithelial defect, such as an exposed surface of Bowman's membrane and an exposed stromal surface.

With refractive surgery, for example PRK, the epithelium can be removed to ablate a refractive correction into Bowman's membrane 14 and/or stroma 16. An initial profile of the anterior surface of stroma and/or Bowman's membrane is ablated to an ablated profile 20 to correct the patient's vision. The profile of tissue removed to correct vision is described in U.S. Pat. No. 5,163,934, entitled "Photorefractive keratectomy", the disclosure of which may be suitable for combination in accordance with some embodiments of the present invention described herein. Ablated profile 20 generally comprises an optical zone that extends across the cornea to correct refractive error of the eye and may correct aberrations of the eye, for example wavefront aberrations. Ablated profile 20 is bounded by boundary 20B that may circumscribe the ablated profile. The ablation profile 20 comprises a maximum dimension across, for example a diameter 20D.

The epithelium may comprise an inner boundary that moves centripetally inward as indicated by arrows 30.

In many embodiments as described herein, irregularities of the cornea are decreased when the epithelium regenerates so as to provide one or more of improved vision or comfort. The coverings as described herein can be configured so as to decrease an effect on vision of corneal irregularities.

FIG. 1A1 shows covering 100 positioned on a blinking eye. An upper lid and a lower lid can blink over the eye. Work in relation to embodiments suggests that the upper lid can exert a downward movement 22A and that the lower lid can exert an upper movement 22B on the eye. The downward movement 22A can be greater than the upper movement 22B. The wettable coating material as described herein can decrease force and movement transferred from the lids to the covering so as to inhibit motion of the covering.

FIG. 1A2 shows the covering of FIG. 1A1 that is capable of pumping tear liquid under the covering. The covering 100 has inner portion 110 and outer portion 120, and fenestrations 100F extending through the thickness of the covering on the outer portion so as to tear liquid TL, which may comprise a medicament. The medicament may comprise an anesthetic, an analgesic, or other medication, for example.

The covering 100 comprises an optical component 100A and a coupling component 100B. The optical component 100A may comprise an inner portion 110 of covering 100 and the coupling component 100B may comprise an outer portion 120 of covering 100. The optical component 100A comprises rigidity sufficient to resist deformation such that the optical component 100 can provide correction vision of the eye. The optical component 100A may comprise a single layer of material, or a plurality of layers of materials. The coupling component 100B may comprise a rigidity less than optical component 100A, such that the coupling component can one or more of deflect or elastically deform so as to conform to the cornea when covered with the eyelid. The coupling component 100B may comprise an inner component 100B1 to couple to the optical component, an outer portion 100B3 to couple to the sclera, and an intermediate portion 100B2. The intermediate portion 100B2 can extend between the inner component 100B1 and the outer component 100B3 so as define a chamber when placed on the eye.

The optical component 100A and the coupling component 100B can pump tear liquid under the cornea when the eye closes and opens, for example when the eye blinks. The outer component 100B comprising outer portion 120 may comprise fenestrations 100F. For example, the intermediate portion 100B2 may comprise fenestrations 100F. The outer portion 120 may comprise outer portion 100B3 comprising a sclera coupling portion 130 to contact the conjunctiva over the sclera and peripheral portion 120P. The sclera coupling portion 130 may comprise a thin flange portion extending to the peripheral portion 120P. The sclera coupling portion may comprise a thin elastic portion capable of elastic deformation when the eye blinks to allow the optical component to move downward. Alternatively or in combination, the outer portion 120 may comprise a rigidity sufficient to deflect when the eye blinks.

FIG. 1A3 shows a schematic illustration of the covering of FIGS. 1A1 and 1A2 pumping tear liquid when the eye closes, in accordance with embodiments of the present invention.

When placed on the eye, the covering 100 can define a chamber with the lower surface of the covering extending along the cornea, the limbus and conjunctiva over the sclera. When the eyelids are separated, the covering 100 is held loosely on the eye with slight pressure from the eyelids extending under the outer portion of the covering. When the eye blinks, the lids extend over the outer portion 120 of the covering and inner portion 110 so as to exert pressure on the covering such that the covering is urged downward toward the cornea and the volume of the chamber under the covering is decreased. The downward movement of the optical component 100A of the inner portion 110 of the covering 100 can move the covering downward so as to pass pumped tear liquid 100TL through the fenestrations, and in many embodiments the pumped tear liquid 100TL can pass under the peripheral portion 120P.

FIG. 1A4 shows a schematic illustration of the covering of FIGS. 1A1 and 1A2 pumping tear liquid when the eye opens, in accordance with embodiments of the present invention.

When the eyelids open, the pressure on the covering is decreased, such that the covering can move away from the cornea and increase the volume of the chamber. The movement of the optical portion 100A away from the cornea can draw pumped tear liquid 100TL into the covering through the fenestrations, and contact of the peripheral portion 120P and sclera coupling portion 130 with the conjunctiva can inhibit flow of tear liquid under the peripheral portion 120P. In many embodiments, the peripheral portion 120P and sclera coupling portion 130 can contact the conjunctiva so as to form a seal when the eyelids open and the optical portion 100A moves away from the cornea.

The fenestrations 100F can be located away from the optical component, for example about 3.5 to about 4.5 mm from a center of the optical component to decrease optical artifacts of the fenestrations 100F. However, the fenestrations may be located within the optical component when sufficiently small and diameter and sufficiently few so as to not produce perceptible visual artifacts. The fenestrations may comprise a patter to indicate the orientation of the covering 100 on the cornea. For example the upper fenestration and lower fenestrations may indicated a 90 degree axis on the patient and horizontal fenestrations can be provided to indicated the location of the 180 degree axis on the patient. The fenestrations may comprise additional fenestrations to be located inferiorly to indicate that the covering is not flipped by 180 degrees on the patient, for example upside down. The additional inferior fenestrations may also couple to the rivulet comprising tear liquid that forms near the lower lid, so as to facilitate pumping of tear liquid. For example, when the eye blinks the lower lid may extend over the inferior fenestrations and the upper lid may extend downward to couple to the lower rivulet. When the eye opens and the eyelids separate the upper eyelid can draw tear liquid of the rivulet over the upper fenestration and the lower eyelid can move inferiorly so as to pass the rivulet over the inferior rivulets.

The covering 100 may comprise one or more of many optically clear materials, for example synthetic materials or natural material such collagen based materials, and combinations thereof, such as described in U.S. patent application Ser. No. 12/384,659, filed Apr. 6, 2009, entitled "Therapeutic Device for Pain Management and Vision", U.S. Pub. No. US 2010-0036488 A1, published on 11 Feb. 2010. For example, the lens material may comprise a naturally occurring material, such as collagen based material. Alternatively or in combination, the lens material may comprise a known synthetic material, for example hydroxyethyl methacrylate (HEMA) hydrogel, hydrogel, silicone, for example hydrated silicone and derivatives thereof. For example the optically clear material may comprise one or more of silicone, silicone hydrogel, silicone comprising resin, silicone comprising silicate, acrylate, collagen. The cured silicone may comprise silicone that is two-part heat cured and RTV (room temperature vulcanized). For example, polydimethyl siloxane such as NuSil, or poly(dimethyl) (diphenyl)siloxane may be used to mold the covering, for example with less than 10% water content so as to increase oxygen diffusion through the covering. The covering 100 may comprise perfluoropolyethers or fluorofocal. The lens material can be elastic, for example a stretchable elastic material such as silicone, such that the lens can seal the cornea. The lens material can be cured with a hardness and size and shape such that the covering comprises a modulus within a range from about 4 to about 40 MPa. The material may comprise, for example, silicone elastomer having optically clear silicate disposed therein and a water content of no more than about 10%, for example no more than about 5%, such that the lens covering has a very high Dk exceeding 150, and the silicone lens comprising silicate can be treated to provide a wettable surface. The lens may comprise hydrogel, for example silicone hydrogel, and can be formed with a water content within a range from about 5% to about 35% and a modulus within a range from about 4 to about 40 MPa, such that the covering conforms at least partially to the ablated stroma.

The covering may comprise silicone or silicone hydrogel having a low ionoporosity such that covering seals to the cornea. For example, covering may comprise silicone hydrogel comprising a low ion permeability, and the range of water can be from about 5% to about 35%, such that the Dk is 100 or more. The low ion permeability may comprise an Ionoton Ion Permeability Coefficient of no more than about $0.25 \times 10^{-3}$ cm2/sec so as to seal the cornea, for example no more than about $0.08 \times 10^{-3}$ cm2/sec. The low ion permeability comprises an Ionoton Ion Permeability Coefficient of no more than about $2.6 \times 10^{-6}$ mm2/min to seal the cornea, for example no more than about $1.5 \times 10^{-6}$ mm2/min.

The covering 100 may comprise a wettable surface coating 134 disposed on at least the upper side of the covering, such that the tear film of the patient is smooth over the covering and the patient can see. The wettable surface coating may comprise a lubricious coating for patient comfort, for example to lubricate the eye when the patient blinks. The wettable coating may comprise a contact angle no more than about 80 degrees. For example the coating may comprise a contact angle no more than about 70 degrees, and the contact angle can be within a range from about 55 to 65 degrees to provide a surface with a smooth tear layer for vision. For example, the wettable coating can be disposed both an upper surface and a lower surface of the covering. The upper surface may comprise the wettable coating extending over at least the inner portion 110.

The wettable coating 134 may comprise one or more of many materials. For example, the wettable coating 134 may comprise polyethylene glycol (PEG), and the PEG coating can be disposed on Parylene™. Alternatively, the wettable coating 134 may comprise a plasma coating, and the plasma coating comprise a luminous chemical vapor deposition (LCVD) film. For example, the plasma coating comprises at least one of a hydrocarbon, for example CH4, O2 or fluorine containing hydrocarbon, for example CF4 coating. Alternatively or in combination, the wettable coating may comprise a polyethylene glycol (PEG) coating or 2-hydroxyethyl-methacrylate (HEMA). For example, the wettable coating may comprise HEMA disposed on a Parylene™ coating, or the wettable coating may comprise N-vinylpyrrolidone (NVP) disposed on a Parylene™ coating.

The covering 100 may comprise a base radius R1 of curvature corresponding to a curvature of a central portion of the cornea. The covering 100 comprises a first configuration 100C1 when placed on the cornea and the eyelids are spaced apart and a second configuration 100C2 when placed on the cornea and the blinks such that the eyelids. The first configuration 100C1 and the second configuration 100C2 pump tear liquid under the covering 100.

The covering 100 may comprise a lower surface corresponding to one or more of many suitable shapes to fit the covering to the cornea, such as a natural unablated cornea or an ablated cornea following refractive surgery such as PRK. The lower surface of the inner portion 110 of the covering 100 may correspond to base radius of curvature. With post ablation corneas, the covering can resist deformation and smooth the epithelium over about 3 mm and may deflect so as conform substantially to the ablated cornea over a larger dimension such as 6 mm. The covering may comprise a second curve in combination with a first curve, such that the lower surface comprises a bicurve surface. Alternatively, the lower surface may correspond to an aspheric surface. For example an aspheric surface may comprise an oblate shape and conic constant to fit a post PRK eye. The curved and aspheric surfaces as described herein can fit non-ablated eyes and the covering can be selected by based on the curvature of an unablated central region of the cornea. Also, it may be helpful to identity a covering that fits the cornea, for example with selection of one covering from a plurality of sizes.

The covering 100 may comprise an inner portion 110 having an optical component 1 100A. The optical component 100A may comprise an inner portion 110 of the covering 100. The optical component may have a modulus within a range from about 5 MPa to about 40 MPa, and a thickness within a range from about 100 µm to about 300 µm such that central portion can have sufficient rigidity to resist deformation and smooth irregularities and correct vision. The covering may comprise an elastomeric stretchable material such that the covering can stretch to fit the cornea, for example. The covering having the modulus within a range from about 4 MPa to about 40 MPa can be formed in many ways as described herein. For example, the covering may comprise a single piece of material having a non-uniform thickness extending across the cornea. The covering can be shaped in many ways and may comprise a single piece of one material, or may comprise a single piece composed to two similar materials, or may comprise a plurality of materials joined together.

FIG. 1B1 shows covering 100 having a tricurve profile to fit sclera and cornea. The tricurve profile can be used to fit an unablated natural eye, in which the base curvature R1 corresponds to the optically used central portion of the cornea. For ablated corneas, the base curvature R1 may correspond to the ablated cornea. The tricurve covering may comprise an inner portion with an inner lower surface having radius of curvature R1 and an outer portion comprising an outer lower surface having radius of curvature R1B. The outer portion 130 may comprise the sclera coupling portion 130 having a third radius of curvature R1C sized to fit the conjunctiva located over the sclera and contact the conjunctiva so as to inhibit sliding movement of inner portion 110. Work in relation to embodiments suggests that coupling to the sclera may improve alignment of the lens on the cornea.

The covering 100 having the tricurve profile may comprise dimensions sized to fit the cornea and sclera of the eye 2. The covering 100 having the at least tricurve profile may comprise an inner portion 110 and an outer portion 120 as described herein. The outer portion 120 may comprise the third sclera coupling portion 130 having curvature R1C shaped to fit the sclera of the eye, for example shaped so as to contact the conjunctiva of the eye such that the conjunctiva is located between the sclera and the sclera coupling portion 130. The inner portion 110 may comprise a dimension 102 and the outer portion 120 may comprise a dimension 104 as described herein. The covering 100 may comprise a sag height 105 extending between an upper location of the inner portion 110 and the outer boundary of outer portion 120 shaped to fit the cornea. The sclera coupling portion 130 may comprise a dimension across 103.

The dimension 102, the dimension 104, the dimension 103, the dimension 105 and the dimension 1055 can be sized to the eye based on measurements of the eye. The dimension 103 may correspond to an annular region of the sclera extending from the limbus to the outer boundary of the sclera coupling portion across a distance within a range from about 1 to 4 mm, for example within a range from about 1.5 to 2 mm. The size of the limbus of the eye can be measured so as to correspond to dimension 104, for example, and can be within a range from about 11 to 13 mm. The dimension 105 may correspond to a height of the eye from the vertex of the cornea to the limbus, and the dimension 1055 may correspond to the sag height were the outer location of the covering couples to the conjunctiva covering the sclera.

The dimension 102 may correspond to an inner region of the natural cornea or the dimension across an ablation. Dimension 102 may correspond to the more rigid inner portion 110 can be sized about 0.5 to about 2 mm less than the dimension across the ablation zone, such that the soft and less rigid outer portion 120 contacts the eye near the edge of the ablation and the epithelial debridement.

The radius of curvature R1C of portion 130 can be determined so as to fit the eye, and can be within a range from about 12 mm+/−3 mm. The radius R1B of the outer portion can be fit to within about +/−0.5 mm, for example to within about +/−0.25 mm.

The dimensions of the covering 100 can be determined in many ways, for example with topography measurements of the cornea and sclera. The corneal and scleral topography can be measured with many instruments, such as with the Orbscan™ topography system commercially available from Bausch and Lomb, and the Pentacam™ Scheimpflug camera system commercially available from Oculus, and commercially available optical coherence tomography (OCT). The ablation profile can be combined with the topography to determine the shape of the eye.

The dimensions of covering 100 can be sized to one or more of the cornea and sclera based on tolerances that may be determined clinically.

The outer portion 120 and sclera coupling portion 130 may comprise a hydrogel material, for example a silicone hydrogel material, and the inner portion 110 may comprise the rigid material 110M, for example second layer 110L2 and second material 110M2 between first layer 110L1 of first material 110M1 and third layer 110L3 of third material 110M3 as described herein.

The portions of the coverings as described herein, for example the inner portion and the outer portion, may comprise a junction wherein a first portion connects with a second portion, and the junction may have the modulus as described herein. The covering may comprise a contact lens having a central lens portion having a center stiffness of at least about 2 psi*mm2 coupled to an outer lenticular junction portion having a lenticular junction stiffness of at least about 5 psi*mm2.

FIG. 1B2 shows covering 100 having a tricurve profile to fit sclera with slopes of the curved profiles aligned so as to inhibit ridges at the boundaries of the curved portions, in accordance with embodiments of the present invention. The inner portion 110 comprises the optical component 100A and the outer portion 120 comprises the coupling component 100B. The coupling component 100B may comprise a thin layer of material 120M extending under the optical component 100A for improved comfort and support of the optical component. The outer portion 120 comprising coupling component 100B may comprise fenestrations 100F as described herein. The inner portion 120 comprises first radius R1 along the lower surface and a first anterior radius R1A along the upper surface. The outer portion 120 couples to the inner portion with a second radius R1B aligned with the first radius R1A at a boundary corresponding to dimension 102. The outer portion 120 has a second anterior radius R1BA extending along the anterior surface. The outer portion 120 comprising second radius R1B along the lower surface to contact the cornea may couple to sclera coupling portion 130 at a location corresponding to the limbus of the eye, for example along a boundary corresponding to dimension 104. Work in relation to embodiments suggests that formation of a ridge near the boundary of the cornea contacting portion and sclera coupling portion may decrease epithelial cell migration somewhat more than would be ideal, and the alignment of the curved profiles to inhibit ridge formation can provide a smooth transition over the limbus and may decrease mechanical pressure to the limbus. The sclera contacting portion 130 comprises an upper surface having an anterior radius of curvature R1CA.

The inner portion 110 can be curved to fit an ablated eye or a non-ablated eye. The modulus and thickness of the sclera coupling portion can be configured in many ways to fit may eyes with comfort and so as to resist movement of the inner portion 120. The modulus of sclera coupling portion 130 may be no more than about 5 MPa and the thickness no more than about 200 µm, for example no more than 100 µm, so as to stretch substantially for comfort and resist movement of the inner portion when the placed on the sclera.

The dimension 103 of sclera coupling portion 130 may correspond to an annular region of the sclera extending from the limbus to the outer boundary of the sclera coupling portion across a distance within a range from about 1 to 4 mm, such that the dimension 103 can be from about 12 mm to about 16 mm, for example from about 14 mm to about 16 mm.

The radius of curvature R1C, thickness and modulus of the portion 130 can be configured so as to fit the eye to resist movement of inner portion 110 and with comfort. The radius of curvature R1C can be sized less than the radius of curvature of the sclera and conjunctiva. For example, the radius of curvature R1C can be no more than about 10 mm, for example no more than about 9 mm when the curvature of the sclera portion of the eye is at least about 12 mm for example. The third relative rigidity may comprise no more than about 4E-5 Pa*m^3 so as to stretch substantially for comfort and resist movement of the inner portion when the outer portion is placed on the sclera.

The thickness of the sclera coupling portion having radius of curvature R1C can vary, for example from a thickness of about 100 µm to a tapered edge.

FIG. 1B2-1 shows alignment of the slope of the lower surface of the corneal contacting portion comprising second radius R1B with the slope of the lower surface of the sclera coupling portion 130 comprising radius R1C, such that pressure to the limbus is decreased substantially. The second slope corresponding to second radius R1B is given by a height R1BY and a length R1BX, and the third slope corresponding to third radius R1C is given by height R1CY and width R1CX. The second slope is aligned with the third slope such that no substantial ridge is formed at the location corresponding to the limbus. For example, the first slope can be substantially equal to the second slope. The slope of the inner portion 110 can be aligned with the slope of the second portion 120 at a location corresponding to dimension 102 in a similar manner.

FIG. 1B3 shows a tapered edge of the covering of FIG. 1B1 having a tricurve profile to fit sclera and cornea. The sclera coupling portion 130 may comprise a flange 120F having a narrowing taper extending a distance 120FW to a chamfer 120FE. The chamfer 120FE can be defined along an outer rim where a first convexly curved lower surface joins a second convexly curved upper surface. The convex surfaces along the outer rim allow the covering to slide along the conjunctiva and the narrowing taper permits the sclera coupling portion of the covering to stretch substantially and couple to the sclera and conjunctiva with decreased resistance for comfort.

The dimensions of the covering 100 can be determined in many ways, for example with one or more topography measurements or tomography measurements of the cornea and sclera. The corneal and sclera topography can be measured with many instruments, such as with the Orbscan™ topography system commercially available from Bausch and Lomb, and the Pentacam™ Scheimpflug camera system commercially available from Oculus. The tomography can be measured with optical coherence tomography (hereinafter "OCT") so as to determine the sag height of the limbus and conjunctiva, for example with OCT measurement systems commercially available from Zeiss/Humphrey. The ablation profile can be combined with the topography to determine the shape of the eye.

FIG. 1B4 shows a plan view covering 100 having a multi-curve profile to fit the cornea, limbus and sclera with slopes of the curved profiles aligned so as to inhibit ridges at the boundaries of the curved portions, in accordance with embodiments of the present invention. The covering 100 comprises fenestrations 100F and optical component 100A for vision correction and outer coupling component 100B that may pump tear liquid as described herein.

Figure 4A:
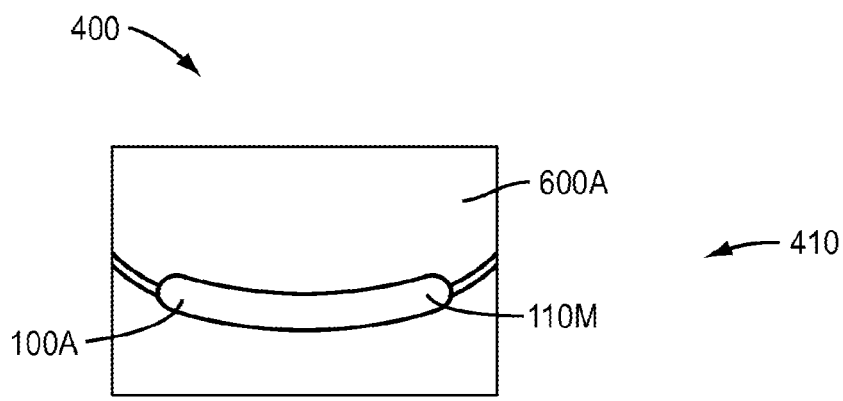
FIG. 4A shows a mold to form an optical component of a covering.
Figure 4B:
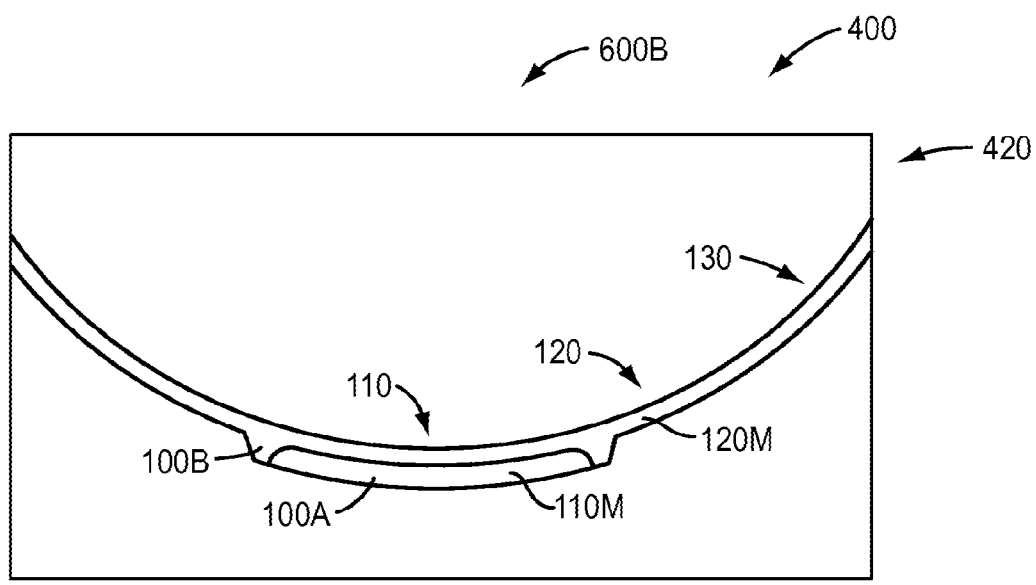
FIG. 4B shows a mold to form a covering comprising the optical component of FIG. 4A.
Figure 4C:
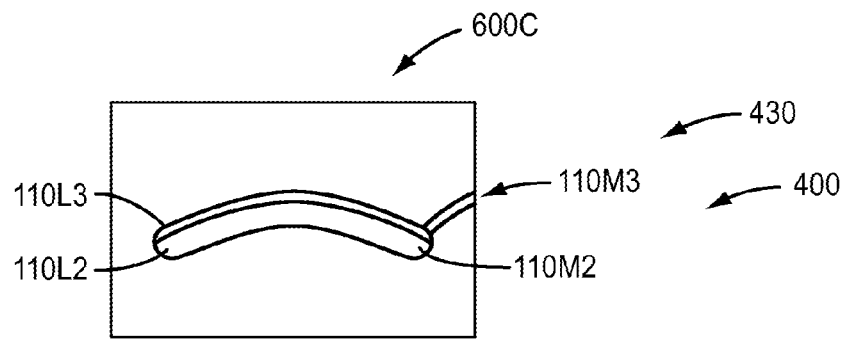
FIG. 4C shows a mold to form a covering comprising the optical component of FIG. 4A and a layer of a soft material of the covering.
Figure 4D:
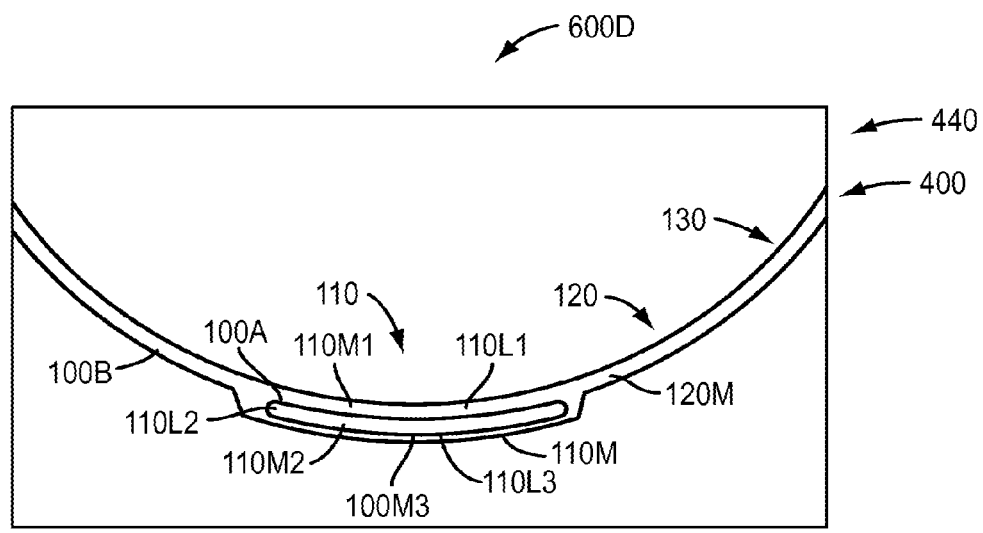
FIG. 4D shows a mold to form a covering and having a solid inner component comprising the rigid material placed therein prior to injection of a flowable material, in accordance with embodiments of the present invention.
Figure 4E:
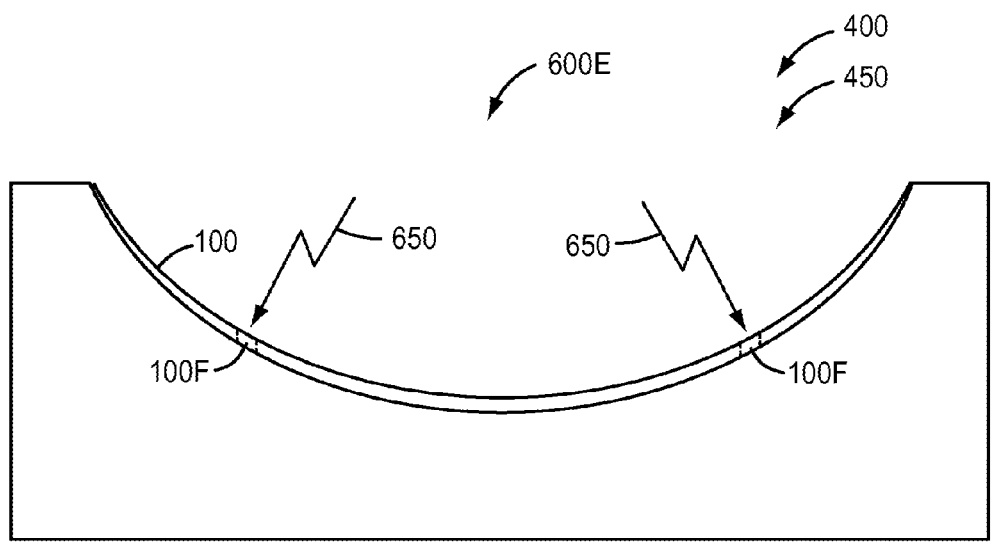
FIG. 4E shows formation of fenestrations in the covering with energy, in accordance with embodiments of the present invention.
Figure 4F:
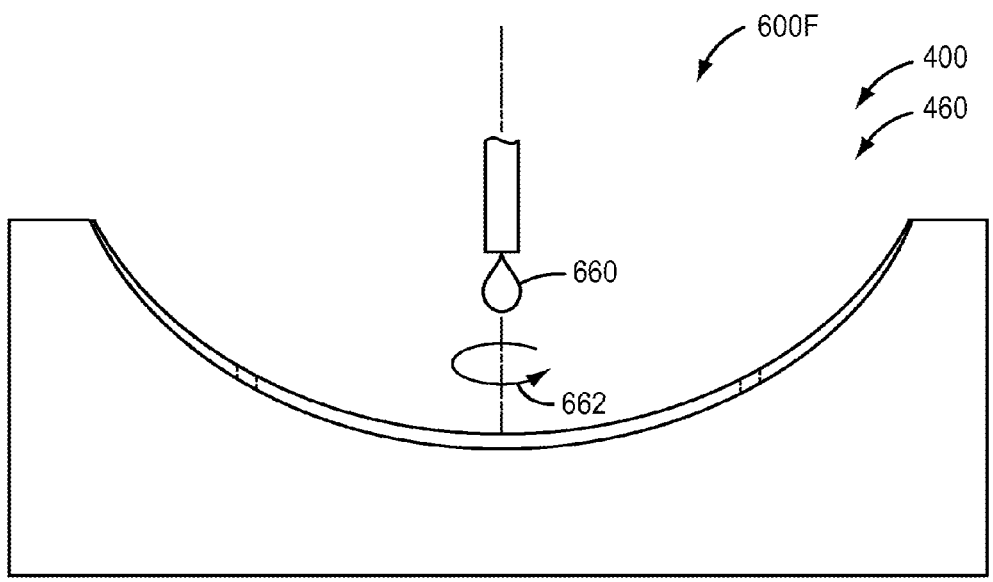
FIG. 4F shows spin coating of a hydrogel material on a posterior surface of the covering, in accordance with embodiments of the present invention.
Figure 4G:
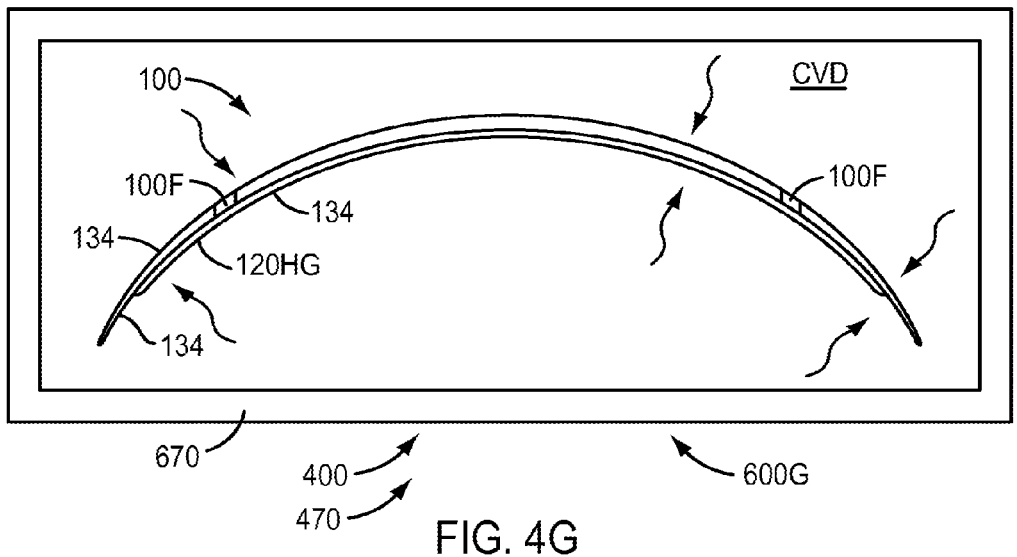
FIG. 4G shows chemical vapor deposition on the covering having the hydrogel material formed thereon, in accordance with embodiments of the present invention.
Figure 4H:
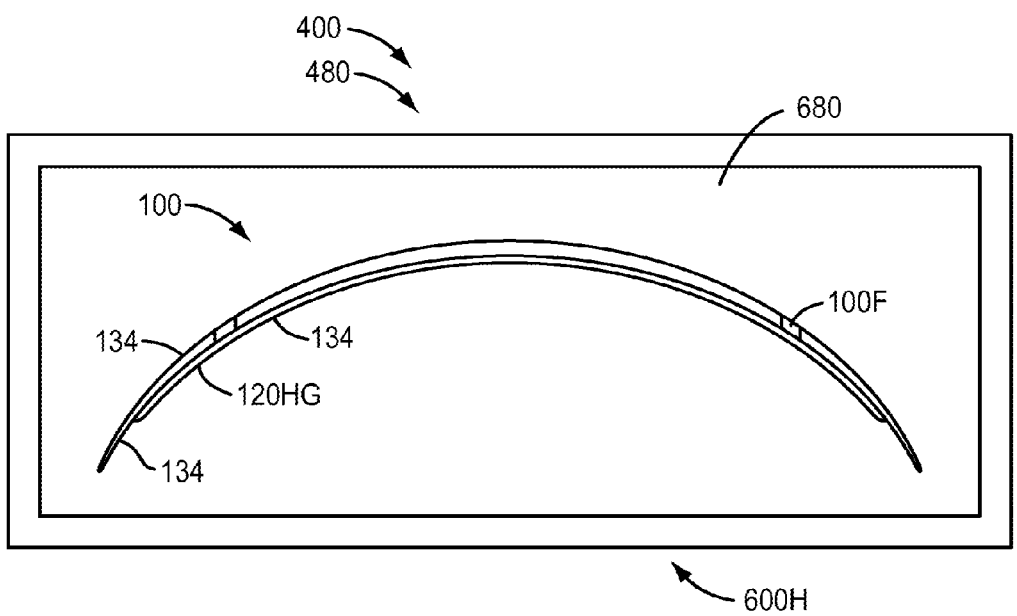
FIG. 4H shows the covering comprising the hydrogel material packaged in a container, in accordance with embodiments of the present invention.
Figure 5:
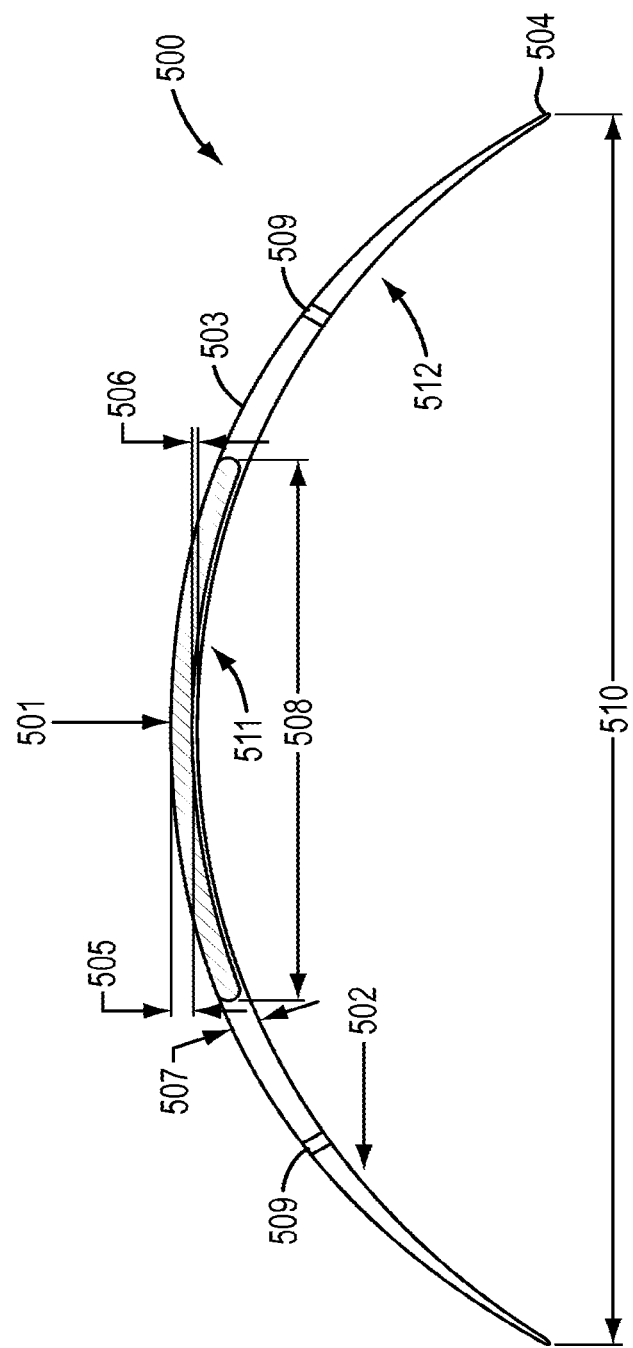

FIG. 1B5 shows a side sectional view of the covering of FIG. 1B4 and corresponding curved portions to couple to the cornea, limbus and sclera, in accordance with embodiments of the present invention.

The inner portion 110 comprises optical component 100A, which may comprise material 110M. The outer portion 120 comprises coupling component 100B, which may comprise outer material 120M. The inner portion 110 is coupled to the outer portion along a boundary corresponding to dimension 102. The lower surface of inner portion 110 has a shape profile corresponding to a first radius R1. The outer portion 120 couples to the inner portion with a first outer radius R1B1 of curvature, such that the slopes are aligned as described herein at a location corresponding to dimension 102. The outer portion 120 comprises a second outer radius R1B2 of curvature coupled to the first outer radius of curvature R1B1. The first outer radius R1B1 of curvature is coupled to the second outer radius R1B2 of curvature with the slopes aligned as described herein at a location corresponding to dimension 104A. The outer portion 120 comprises a third outer radius R1B3 of curvature coupled to the second outer radius of curvature R1B2. The second outer radius R1B2 of curvature is coupled to the third outer radius R1B3 of curvature with the slopes aligned as described herein at a location corresponding to dimension 104B.

The first outer radius of curvature R1B1, the second outer radius of curvature R1B2, and the third outer radius of curvature R1B3 may comprise values determined from a patient population. The first radius of curvature R1 may comprise a value determined based on the patient population. Alternatively or in combination, the first radius of curvature R1 may correspond to a post ablation profile.

The first outer radius of curvature R1B1, the second outer radius of curvature R1B2, and the third outer radius of curvature R1B3 can be combined or replaced with an aspheric surface such as a conic surface. The conic surface can be determined in accordance with first outer radius of curvature R1B1, the second outer radius of curvature R1B2, and the third outer radius of curvature R1B3, such that the conic surface corresponds to values determined from a patient population.

The sclera coupling portion 130 may have a lower surface comprising a first sclera coupling radius R1C1 of curvature and a second sclera coupling portion having a second sclera coupling radius R1C2 of curvature. The first sclera coupling portion comprising radius R1C1 can be aligned to the third radius R1B3 at a location corresponding to dimension 104. The second sclera coupling portion comprising radius R1C2 can be aligned to the first sclera coupling portion having radius R1C1 at a location corresponding to dimension 120FW corresponding to an inner boundary of tapering flange 120F.

FIG. 1B6 shows a side sectional view of the covering of FIG. 1B4 and corresponding curved portions of the upper surface, in accordance with embodiments of the present invention. The upper surface may comprise an inner anterior radius of curvature R1A, a first outer anterior radius of curvature R1B1A, a second outer anterior radius of curvature R1B2A. The sclera coupling portion 130 may comprise a first anterior radius R1C1A of curvature and a second anterior coupling radius R1C2A of curvature.

FIG. 1B7 shows a tapered edge of the covering of FIG. 1B4, in accordance with embodiments of the present invention.

FIG. 1C shows therapeutic covering 100 comprising a covering molded with a homogeneous material, in which the outer portion comprises a thickness configured to conform with the cornea and in which the inner portion 110 comprises thickness configured to smooth the epithelium and cornea. The inner portion 110 comprises optical component 100A, and the outer portion 120 comprises coupling component 100B. The inner portion 110 may comprise a thickness of no more than about 300 microns, for example no more than about 200 microns. Many materials can be used as described herein, and the covering may comprise one or more materials. For example, the covering may comprise a single piece of material such as silicone having a water content within a range from about 0.1% to about 10%, for example no more than about 1%, and a hardness Shore A durometer parameter within a range from about 5 to about 90, for example within a range from about 40 to about 85.

FIG. 1C1 shows a covering 100 having an inner portion 110 comprising an inner thickness and an inner material 110M and an outer portion 120 comprising an outer thickness and an outer material 120M, in which the inner thickness is greater than the outer thickness. The inner material 110M may comprise many materials and may comprise an optically clear silicone, for example silicone with resin. The inner material may comprise silicone positioned in a mold with the outer portion 120 formed around the inner portion. The inner portion may comprise a hardness similar to the outer portion. The outer material 120M of the outer portion 120 may comprise a material similar to the inner portion. For example the outer material 120M may comprise silicone and the inner material 110M may comprise silicone. This use of similar materials on the inner and outer portion can improve adhesion of the inner portion to the outer portion. The outer material 120M may extend along the inner portion 110, for example along the underside of the inner portion 110, such that the inner material 110M is held in a pocket of the outer material 120M. Alternatively, the inner material 110M may extend substantially across the thickness of the inner portion 110, such that the outer material 120M comprises a substantially annular shape with the inner material 110M comprising a disc shaped portion disposed within the annulus and extending substantially from the upper surface coating to the lower surface coating when present.

FIG. 1C2 shows covering 100 having inner portion 110 comprising an inner thickness and inner material 110M and outer portion 120 comprising an outer thickness and outer material 120M, in which the inner thickness can be greater than the outer thickness and the outer material 120M extends around the inner material 110M. The inner portion 110 comprises the optical component 100A and the outer portion 120 comprises the coupling component 100B. The covering 100 may comprise at least a bicurve covering having at least a second radius R1B. The inner portion 110M may comprise three layers of material, a first layer 110L1 of a first material 110M1, a second layer 110L2 of a second material 110M2 and a third layer 110L3 of a third material 110M3. The second material 110M2 may comprise a rigid material, for example one or more of a rigid gas permeable material, a rigid silicone, or a rigid silicon acrylate. The first material 110M1 and the third material 110M3 may comprise a soft material, for example a soft elastomer or soft hydrogel such as one or more of a soft optically clear silicone or a soft silicone hydrogel. The first material, the third material, and the outer material 120M may comprise similar materials, such that the second layer of rigid material 110M2 is encapsulated with the first soft material 110M1, the third soft material 110M3 and on the perimeter with the soft outer material 120M. In many embodiments, the second rigid material 110M2 comprises a material similar to each of the first material 110M1, the third material 110M3 and the outer material 120M, for example each may comprise silicone, such that the corresponding portions of the covering 100 can be bonded together with the silicone similar silicone elastomer material, for example. In many embodiments, the covering 100 can be formed in a mold with rigid second material 110M2 placed in the mold and encapsulated within a single piece of material comprising first material 110M1, third material 110M3 and outer material 120M, such that first material 110M1, third material 110M3 and outer material 120M comprise substantially the same material, for example silicone elastomer. The rigid second material 110M2 may comprise silicone bonded to each of first material 110M1, third material 110M3 and the outer material 120M, for example with curing such that first material 110M1, third material 110M3 and outer material 120M comprise the same soft silicone material bonded to the second material 110M2 comprising rigid silicone.

The soft material comprising soft outer portion 120 composed of soft material 120M, first layer 110L1 composed of soft material 110M1 and third layer 110L3 composed of soft material 120M3 can provide improved comfort and healing for the patient, and can extend the amount of time the covering can be worn in the eye when combined with the fenestrations 100F and sclera coupling component 130 and peripheral portion 120P and flange 120F as described herein. The soft material can deflect, bend or indent so as to conform at least partially to the tissue of the eye when the rigid portion comprising rigid material 110M2 corrects vision of the patient. The dimension 102 across inner portion 110 can be sized to substantially cover one or more of the entrance pupil of the eye or ablation zone. With ablated eyes, the dimension 102 can be sized slightly smaller than the ablation dimensions, such as ablation diameter 20D, so that the epithelium can grow inward and contact the layer 110L1 of soft first material 110M1 without substantial disruption from the rigid material 120M2 when the inner portion 110M corrects vision with the layer of rigid material 110M2. The eyelid can also move over the third layer 110M3 for improved comfort. The soft first material 110M1 and soft third material 110M3 may comprise soft elastomer or soft hydrogel, for example, and may each comprise the same material so as to encapsulate the second layer 110L2 of rigid second material 110M2.

The soft material comprising soft outer portion 120 composed of soft material 120M, first layer 110L1 composed of soft material 110M1 and third layer 110L3 composed of soft material 120M3 can have a modulus within a range from about 1 to 20 MPa, for example within a range from about 1 to 5 MPa.

The material inner material 120M and 120M2 of second layer 120L2 can have a modulus within a range from about 5 to about 35 or more, for example as set forth in Table A below. For example, when material 120M comprises silicone elastomer or layer 110L2 of material 120M2 comprises silicone elastomer, the modulus can be within a range from about 5 to about 35 MPa, for example within a range from about 20 to about 35 MPa.

The layers of covering 100 can comprise dimensions so as to provide therapeutic benefit when placed on eye 2. The thickness of layer 110L1 can be from about 5 μm to about 50 μm, for example, within a range from about 10-30 μm, such that the layer 110L1 can provide a soft at least partially conformable material to receive the lens. The middle layer 110L2 can be from about 20 μm to about 150 μm, for example, and material M2 can have a modulus greater than first material 110M1 of first layer 110L1, so as to deflect the epithelium of the eye when the middle layer is deflected. The third layer 110L3 can be within a range from about 5 μm to 50 μm, for example within a range from about 10 μm to about 30 μm, and can cover second layer 110L2 so as to retain the second layer in the inner portion 110 of the covering 100.

The therapeutic covering 100 may comprise a first inner material 110M and a second outer material 120M, in which the outer portion 120 comprises a hardness configured to stretch elastically and conform with one or more of epithelium of the cornea or the conjunctiva, and in which the inner portion 110 comprises second hardness configured to smooth the cornea to provide optical benefit. The outer material 120M may comprise many materials as herein. The Shore A hardness of each of the inner portion and the outer portion can be within a range from about 5 to about 90. For example, the outer material 120M may comprise silicone having a hardness Shore A durometer parameter from about 20 to about 50, for example from about 20 to about 40, and the inner material 110M may comprise silicone having a hardness durometer parameter from about 40 to about 90, for example from about 50 to about 90. The outer portion comprises a perimeter 120P, and the perimeter may comprise a peripheral and circumferential edge structure to abut the epithelium to form the seal with the epithelium, for example when the base radius of the covering is less than the cornea. The peripheral and circumferential edge structure can be shaped in many ways to define an edge extending around the perimeter to abut the epithelium, for example with one or more of a taper of the edge portion extending to the perimeter, a bevel of the edge portion extending to the perimeter or a chamfer of the edge portion extending to the perimeter. The inner portion 110 may comprise inner thickness and inner material 110M and the outer portion 120 may comprise an outer thickness and outer material 120M, in which the inner thickness is substantially similar to the outer thickness.

The peripheral edge structure to abut the epithelium can be used with many configurations of the inner portion as described herein. For example, the inner portion may comprise an RGP lens material having a lower rigid surface to contact and smooth the cornea and an upper rigid optical surface. Alternatively, the inner portion may conform to the cornea as described herein. The outer portion may comprise a skirt, and the skirt may comprise the peripheral edge structure to abut and seal the cornea, such as the chamfer. The rigidity of the outer portion comprising the edge structure can be determined to seal the cornea with one or more of hardness and thickness, as described herein.

FIG. 1C2A shows a covering as in one or more of FIGS. 1-2A to 1B7 having a layer of hydrogel material on a posterior surface of the covering. The covering 100 may comprise a wettable surface coating 134 disposed on at least the upper side of the covering as described herein. The layer of hydrogel material may comprise an inner portion of the layer of hydrogel material 110MHG and an outer portion of the layer of hydrogel material 120MHG. The layer of hydrogel material extends to the fenestration so as to couple the hydrogel material to the fenestration. The hydrogel material can be coupled to the fenestration in many ways. For example, the layer of hydrogel material may cover the fenestration, or the fenestration 100F may extend through the hydrogel material. The fenestration 100F extending through the layer of hydrogel material can encourage pumping of the tear liquid as described herein. Alternatively or in combination, the layer of hydrogel material covering a posterior surface of the fenestration 100F to couple the fenestration 100F to the hydrogel layer may encourage movement of a therapeutic agent along the hydrogel layer toward a central portion of the cornea for example. The hydrogel may extend along a deflectable portion of the covering so as to exert at least some pressure on the hydrogel layer to encourage movement of one or more of tear liquid or the therapeutic agent along the hydrogel layer when the patient blinks, for example.

The hydrogel layer as described herein may encourage regeneration of the epithelium and may provide a soft surface to contact the epithelium regenerating over the ablation so as to encourage epithelial regeneration under the optical component as described herein, and the optical component can resist deformation so as to protect the epithelium and provide an environment to encourage regeneration of the epithelium.

The hydrogel material may comprise one or more of the hydrogel materials as described herein. The hydrogel material extending along the lower surface can increase comfort of the covering when placed on the eye. The hydrogel material may comprise a substantially uniform thickness within a range from about 1 μm to about 100 μm, for example from about 2 μm to about 50 μm and in many embodiments within a range from about 5 μm to about 20 μm. The hydrogel material extending along the posterior surface may comprise on or more of the hydrogel materials as described herein combined with one or more of materials 110M, 110M1, 110M2, 110M3 or 120M as described herein. For example the one or more of materials 110M, 110M1, 110M2, 110M3 or 120M may comprise silicone such as silicone elastomer comprising siloxane, and the hydrogel may comprise a hydrogel such as silicone hydrogel material as described herein.

FIG. 1C2B shows a covering as in one or more of FIGS. 1-2A to 1B7 having a layer of hydrogel material on a posterior surface of the covering extending less than a maximum distance across the covering such that end portions of the covering are configured to engage the epithelium of the eye away from the hydrogel layer and inhibit movement of the covering when placed on the eye. In many embodiments, the material 120M can couple to the surface of the eye, for example the epithelium so as to inhibit movement of the covering. The material 120M may comprise a sticky tacky hydrophobic material such as silicone to engage the epithelium to inhibit movement, and the material 120M may be coated with one or more coatings as described herein, for example with vapor deposition. The hydrogel material can be coupled to the fenestration in many ways. For example, the layer of hydrogel material may cover the fenestration, or the fenestration 100F may extend through the hydrogel material.

Figure 2C:
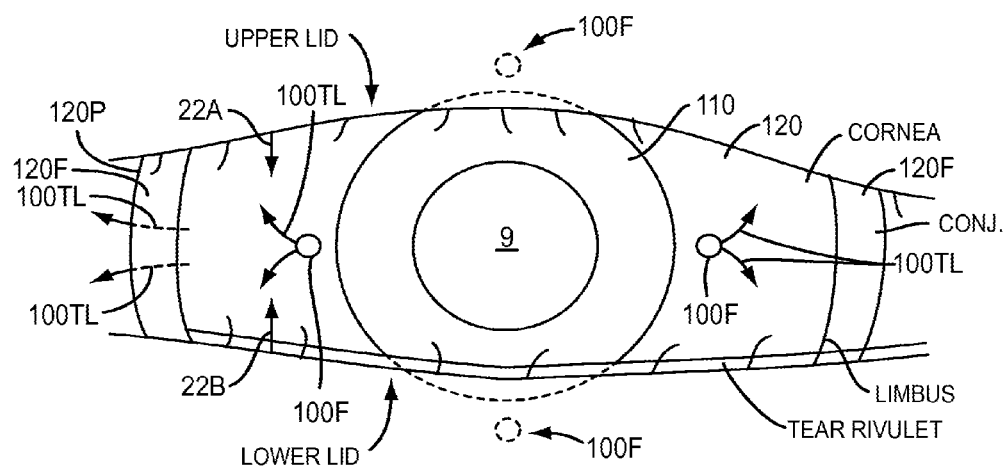

FIG. 1C2C shows a covering 100 as in one or more of FIGS. 1-2A to 1B7 having an annular layer of hydrogel material 120MHG on a posterior surface of the covering such that an inner portion of the covering contacts the cornea away from the hydrogel layer and an outer portion of the covering contacts the cornea away from the covering when placed on the eye. Work in relation to embodiments suggests that the annular hydrogel layer can provide an environment to encourage growth of the epithelium along the posterior surface of inner material 110M1 as described herein, and the lower surface of material 110M1 can be coated with a material having a thickness less than the hydrogel, for example.

FIG. 1C3 shows a covering having a tricurve profile to fit sclera with slopes of the curved profiles aligned so as to inhibit ridges at the boundaries of the curved portions as in FIG. 1B2 and having a layer of hydrogel material 120MHG on a lower surface. The hydrogel material 120M may extend substantially across the posterior surface of the covering. The covering may extend along the lower surface a distance less than a distance across the covering so as to provide a portion of the covering without the hydrogel to engage the eye, for example the epithelium of the eye that may comprise one or more of the corneal epithelium or the conjunctival epithelium. Alternatively, the covering may extend substantially along the posterior surface of the covering corresponding to the distance across the covering so as to provide the hydrogel covering over the outer portion of the covering that engages the eye.

FIG. 1C4 shows a plan view covering having a tricurve profile to fit the cornea, limbus and sclera with slopes of the curved profiles aligned so as to inhibit ridges at the boundaries of the curved portions as in FIG. 1B4 and having a hydrogel material on a lower surface extending less than a maximum distance across the covering to engage the conjunctiva with the covering away from the hydrogel material. Alternatively, the covering may extend substantially along the posterior surface of the covering corresponding to the distance across the covering so as to provide the hydrogel covering over the outer portion of the covering that engages the eye. The hydrogel covering may comprise an annular shape extending along the lower surface as described herein.

FIG. 105 shows a fenestration 100F having a posterior end 100FPE covered with a layer of hydrogel material 29MHG extending along the posterior surface of the covering 100, in accordance with embodiments of the present invention.

FIG. 1C6 shows a fenestration 100F extending through a layer of hydrogel material 120MHG extending along the posterior surface of the covering 100, in accordance with embodiments of the present invention.

Figure 1D:
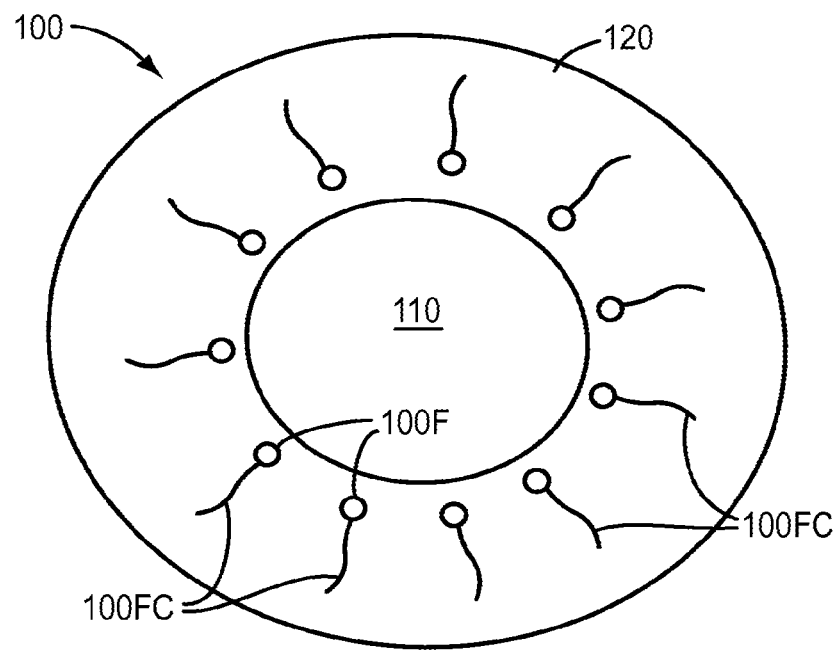
FIG. 1D shows a covering comprising channels extending radially outward along a lower surface of the covering, in accordance with embodiments.

FIG. 1D shows a covering comprising channels 100FC extending radially outward from fenestrations 100F along a lower surface of the covering, in accordance with embodiments.

Figure 1E:
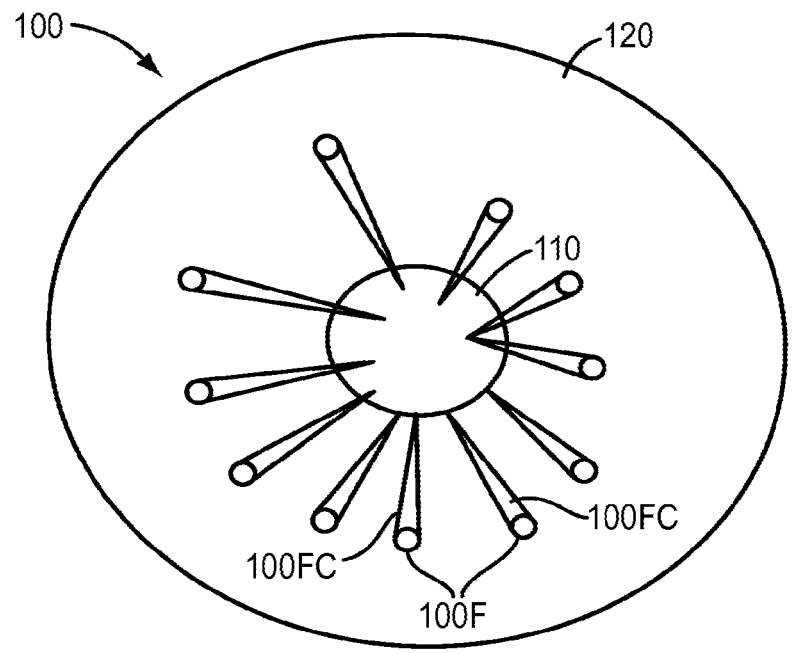
FIG. 1E shows a covering comprising channels extending radially inward along a lower surface of the covering, in accordance with embodiments.

FIG. 1E shows a covering comprising 100FC channels extending radially inward from fenestrations 100F along a lower surface of the covering, in accordance with embodiments.

Figure 1F:
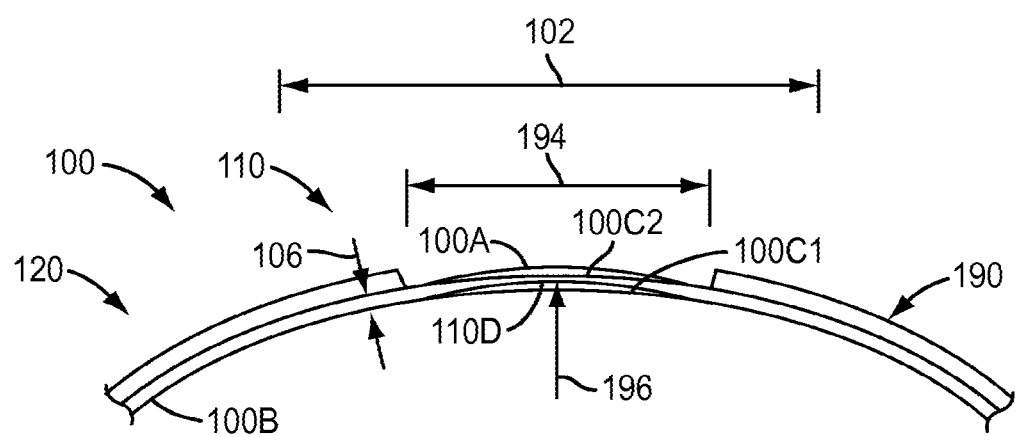
FIG. 1F shows a test apparatus to measure deflection of a portion of a lens in response to a load, in accordance with embodiments.

FIG. 1F shows a test apparatus 190 to measure deflection of a portion of a lens in response to a load. The load deflection of the coverings and composite layers as described herein can be used to determine the deflection of the covering and corresponding pumping. Work in relation to embodiments suggests that one or more of the inner covering or the outer covering contacting the epithelium may comprise a rigidity such that blinking of the eye deflects the covering sufficiently with elastic deformation so as to urge tear liquid from beneath the covering as described herein. For example, the inner portion 120 of the coverings suited to cover the ablated cornea and provide pumping as described herein are also well suited to cover natural unablated corneas to provide vision correction with pumping of the tear liquid. The outer portion 120 may comprise a rigidity as described herein sufficient to deflect when the eye blinks and provide elastic deformation that may pump tear liquid under the covering such as a contact lens.

The test apparatus 190 may comprise a rigid support having an aperture 192, such that deflection of the covering 100 through the aperture 192 can be measured. The aperture 192 has a dimension across 194 that can be sized smaller than the dimension across inner portion 110, so as to measure a deflection 110D of the inner portion 110 in response to a load 196. The deflection 110D may comprise a peak deflection, for example a distance. The load 196 may comprise a point load or a load distributed over an area corresponding to diameter 104, for example a pressure from a gas or liquid on the lower side of the covering. The covering may comprise a first configuration C1 corresponding to the shape of the covering prior to placement on the eye, and the covering may comprise a second configuration C2 when placed on the eye, and the amounts of force and/or pressure to deflect covering 100 can be determined such that covering 100 can be deflected without substantially degrading vision and so as to smooth the epithelium. For example, the covering may deflect slightly so as to decrease vision no more than about 1 or 2 lines of visual acuity and such that the covering can smooth the epithelium and provide environment 100E as described herein.

The modulus and thickness of the covering can be used to determine an amount of relative rigidity of the covering 100, the corresponding amount of force to deflect the covering 100 across a distance, and the corresponding amount pressure to smooth the epithelium with the deflected covering as described herein.

The amount of relative rigidity can be determined based on the modulus multiplied with cube of the thickness. The amount of deflection corresponds to the $6^{th}$ power of the deflected span across the covering, the modulus, and the cube of the thickness. The approximately fourth order relationship of the span to the deflection can allow the coverings as described herein to conform at least partially to the ablation profile within a range from about 4 to 6 mm, and inhibit substantially irregularities having diameters of about 3 mm or less, for example.

The deflection can be approximated with the following equation:

$$\text{Deflection} \approx (\text{constant}) * (\text{Load} * \text{Span}^4) / (\text{Modulus} * \text{thickness}^3)$$

The above approximation can be useful to understand the properties of covering 100, for example with a substantially uniform thickness of the inner portion. The substantially uniform thickness may comprise a thickness that is uniform to within about +/−25%, for example to within about +/−10%, such that the covering can conform substantially to at least a majority of the surface area of an ablation zone and inhibit irregularities over a smaller portion of the ablation zone corresponding to no more than a minority of the surface area of the ablation. In many embodiments, the covering conforms over an area having diameter of at least about 4 mm and inhibits irregularities over an area having a diameter of no more than about 4 mm, for example less inhibits irregularities over an area of no more than about 3 mm. For example, based on the above equations, the deflection is related to the fourth power of the span, such that for a comparable load, a 2 mm span will have about $\frac{1}{16}^{th}$ the deflection of a 4 mm span. Similarly, a 3 mm span will have a deflection that is about 1/16th the deflection of a 6 mm span. As the deflection is related to the cube of the thickness, doubling the thickness can decrease the deflection by about a factor of 8. The above approximations can be combined with clinical testing to determine thicknesses and moduli suitable for incorporation in accordance with embodiments as described herein.

The equations for deflection of an unsupported circular span of a material having a substantially uniform thickness are:

$$E_c = E_1\left(\frac{t_1}{t_1 + t_2}\right) + E_2\left(\frac{t_2}{t_1 + t_2}\right)$$

"Relative" Rigidity $= E_c(t_1 + t_2)^3$ where:
W=evenly distributed load over the surface, Pressure (Pa)
R=span of unsupported material (m)
E=Young's Modulus (Pa)
t=Thickness (m)
v=Poisson's Ratio (unit-less, assumed to be constant among materials)
y=Deflection (m)

Equation for deflection is described in *Theory and analysis of elastic plates*, Junuthula Narasimha Reddy, p. 201 equation 5.3.43(1999).

Although the above equations describe relative rigidity for a substantially flat surface, the equations can approximate a curved surface and a person of ordinary skill in the art can determine the deflection load and relative rigidity empirically based on the teachings described herein, for example with finite element modeling.

TABLE A1

Material, modulus, thickness, relative rigidity Dk/and deflection load of inner portions of coverings as described herein.

| Button Material | Uniform Button Thickness (um) | Button Thickness (m) | Flexural Modulus (MPa) | Flexural Modulus (Pa) | Relative Rigidity (Pa * m 3) | Material Dk | Dk/t |
|---|---|---|---|---|---|---|---|
| Rigid Silicone | 250 | 2.50.E−04 | 35 | 35000000 | 5.47E−04 | 600 | 240 |
| Rigid Silicone | 200 | 2.00.E−04 | 35 | 35000000 | 2.80E−04 | 600 | 300 |
| Rigid Silicone | 150 | 1.50.E−04 | 35 | 35000000 | 1.18E−04 | 600 | 400 |
| Rigid Silicone | 100 | 1.00.E−04 | 35 | 35000000 | 3.50E−05 | 600 | 600 |
| Rigid Silicone | 50 | 5.00.E−05 | 35 | 35000000 | 4.38E−06 | 600 | 1200 |
| Exemplary Silicone | 293 | 2.93.E−04 | 20 | 20000000 | 5.03E−04 | 600 | 205 |
| Exemplary Silicone | 272 | 2.72.E−04 | 20 | 20000000 | 4.02E−04 | 600 | 221 |
| Exemplary Silicone | 250 | 2.50.E−04 | 20 | 20000000 | 3.13E−04 | 600 | 240 |
| Exemplary Silicone | 215 | 2.15.E−04 | 20 | 20000000 | 1.99E−04 | 600 | 279 |
| Exemplary Silicone | 200 | 2.00.E−04 | 20 | 20000000 | 1.60E−04 | 600 | 300 |
| Exemplary Silicone | 175 | 1.75.E−04 | 20 | 20000000 | 1.07E−04 | 600 | 343 |
| Exemplary Silicone | 150 | 1.50.E−04 | 20 | 20000000 | 6.75E−05 | 600 | 400 |
| Exemplary Silicone | 100 | 1.00.E−04 | 20 | 20000000 | 2.00E−05 | 600 | 600 |
| Exemplary Material | 50 | 5.00.E−05 | 20 | 20000000 | 2.50E−06 | 600 | 1200 |
| enflufocon A (Boston ES) | 25 | 2.50.E−05 | 1900 | 1900000000 | 2.97E−05 | 18 | 72 |
| enflufocon A | 50 | 5.00.E−05 | 1900 | 1900000000 | 2.38E−04 | 18 | 36 |
| enflufocon A | 150 | 1.50.E−04 | 1900 | 1900000000 | 6.41E−03 | 18 | 12 |
| hexafocon B (Boston XO2) | 25 | 2.50.E−05 | 1160 | 1160000000 | 1.81E−05 | 141 | 564 |
| hexafocon B | 50 | 5.00.E−05 | 1160 | 1160000000 | 1.45E−04 | 141 | 282 |
| hexafocon B | 150 | 1.50.E−04 | 1160 | 1160000000 | 3.92E−03 | 141 | 94 |

-continued $$y = \frac{3wR^4}{16Et^3}(5+v)(1-v)$$

$$w = \frac{y16Et^3}{(5+v)(1-v)3R^4}$$

As shown in Table A1, an RGP material such as an enflufocon or hexafocon having a thickness of about 50 μm can have a relative rigidity suitable for epithelial smoothing and so as to conform at least partially to the ablated stroma. The rigid silicone having a modulus of about 20 MPa and a thickness of about 250 μm will provide a relative rigidity 3E-4 and deflection under load similar to the RGP material having a thickness of about 50 μm and modulus of about 1900 MPa so as to provide a relative rigidity of about 2.4E-4. Commercially available RGP lens materials as shown in Table A1 can be combined in accordance with embodiments as described herein so as to provide covering 100. Based on the teachings described herein, a person of ordinary skill in the art can determine the thickness of the covering based on the modulus and the intended relative rigidity.

Work in relation to embodiments in accordance with clinical studies as described herein has shown that the inner portion 110 of the covering 100 having the relative rigidity of about 3E-4 ($3\times10^{-4}$ Pa*m^3) can be effective so to improve vision and conform at least partially of the eye so as to provide at least some comfort and improve fitting. Many eyes have been measured with many coverings and work in relation to embodiments indicates that an inner portion 110 having a relative rigidity within a range from about 1E-4 to about 5E-4 (Pa*m^3) can allow the covering to conform to the ablation and smooth the epithelium as described herein. For example, inner portion 110 may a relative rigidity within a range from about 2E-4 to about 4E-4, and the eye can be fit accordingly based on the deflection of the covering 100.

The relative rigidity can be related to the amount of deflection of the covering 100 on the eye. Work in relation to embodiments indicates that a relative rigidity of inner portion 110 about 3E-4 can deflect about +/-2 D when placed on the eye so as to conform to an ablation to within about +/-2 D across the approximately 5 or 6 mm ablation diameter when an inner diameter of about 2 or 3 mm is smoothed. A covering 100 having a relative rigidity of about 1.5E-4 can deflect about +/-4 D when placed on the eye so as to conform to an ablation to within about +/-4 D across an approximately 5 or 6 mm diameter when an inner diameter of about 2 or 3 mm is smoothed.

The outer portion of the covering may comprise a relatively rigidity less than the inner portion to fit an outer portion of the eye such as an outer portion of the cornea or to fit the sclera when placed on the conjunctiva.

The coverings as described herein may comprise a relative rigidity corresponding to a range within two or more values of many of the coverings of Table A1, for example a relative rigidity within a range from about 2.50E-06 to about 6.41E-03 (Pa*m^3), and two or more intermediate values for example within a range from about 6.75E-05 to about 5.47E-04 (Pa*m^3). Based on the teachings described herein the covering can have a relative rigidity within one or more of many ranges such as within a range from about 0.5E-3 to about 10E-3 (Pa*m^3), for example a range from about 1E-3 to about 6E-3, for example. Based on the teachings described herein, a person of ordinary skill in the art can conduct clinical studies to determine empirically the thickness and modulus corresponding to a relative rigidity of the inner portion 110 for the covering 100 so as to smooth irregularities and conform substantially to the ablation zone.

TABLE A2

Pressure for 5 μm deflection at diameters of 3, 4, 5 and 6 mm for coverings of Table A1.

| Button Material | Button Thickness (um) | Relative Rigidity (Pa * m^3) | Pressure Required to obtain 5 um deflection (Pa) | | | |
|---|---|---|---|---|---|---|
| | | | 3 mm span | 4 mm span | 5 mm span | 6 mm span |
| Rigid Silicone | 250 | 5.47E-04 | 1002.2 | 317.1 | 129.9 | 62.6 |
| Rigid Silicone | 200 | 2.80E-04 | 513.1 | 162.4 | 66.5 | 32.1 |
| Rigid Silicone | 150 | 1.18E-04 | 216.5 | 68.5 | 28.1 | 13.5 |
| Rigid Silicone | 100 | 3.50E-05 | 64.1 | 20.3 | 8.3 | 4.0 |
| Rigid Silicone | 50 | 4.38E-06 | 8.0 | 2.5 | 1.0 | 0.5 |
| Exemplary Silicone | 293 | 5.03E-04 | 921.9 | 291.7 | 119.5 | 57.6 |
| Exemplary Silicone | 272 | 4.02E-04 | 737.6 | 233.4 | 95.6 | 46.1 |
| Exemplary Silicone | 250 | 3.13E-04 | 572.7 | 181.2 | 74.2 | 35.8 |
| Exemplary Silicone | 215 | 1.99E-04 | 364.3 | 115.3 | 47.2 | 22.8 |
| Exemplary Silicone | 200 | 1.60E-04 | 293.2 | 92.8 | 38.0 | 18.3 |
| Exemplary Silicone | 175 | 1.07E-04 | 196.4 | 62.2 | 25.5 | 12.3 |
| Exemplary Silicone | 150 | 6.75E-05 | 123.7 | 39.1 | 16.0 | 7.7 |
| Exemplary Silicone | 100 | 2.00E-05 | 36.7 | 11.6 | 4.8 | 2.3 |
| Exemplary Silicone | 50 | 2.50E-06 | 4.6 | 1.4 | 0.6 | 0.3 |
| enflufocon A (Boston ES) | 25 | 2.97E-05 | 54.4 | 17.2 | 7.1 | 3.4 |
| enflufocon A | 50 | 2.38E-04 | 435.2 | 137.7 | 56.4 | 27.2 |
| enflufocon A | 150 | 6.41E-03 | 11751.3 | 3718.2 | 1523.0 | 734.5 |
| hexafocon B (Boston XO2) | 25 | 1.81E-05 | 33.2 | 10.5 | 4.3 | 2.1 |
| hexafocon B | 50 | 1.45E-04 | 265.7 | 84.1 | 34.4 | 16.6 |
| hexafocon B | 150 | 3.92E-03 | 7174.5 | 2270.1 | 929.8 | 448.4 |

The data of Table A1 and A2 show that the pressure to deflect a 3 mm zone a distance of 5 μm can be about three times the pressure to deflect a 4 mm zone the distance of 5 μm, and about 15 times the pressure to deflect the 6 mm zone the 5 μm distance. For example, for the relative rigidity of about 3.13E-4 (Pa*m^3), the 5 μm deflection pressures are 572.7, 181.2, 74.2, 35.8 (Pa) for diameters of 3, 4, 5 and 6 mm, respectively, such that the central 3 mm of inner portion 110 can provide a compressive force to irregularities of about 570 Pa when the inner portion 110 conforms to the ablation across a 6 mm span with a pressure of about 35 Pa, for example. By comparison with intraocular pressure (IOP) measure in mm of Hg, 12 mm of Hg is about 1,600 Pa, such that the coverings may conform to the cornea, for example over a 6 mm region, when the eye blinks. This conformation of the covering to the cornea when the eye blinks can provide pumping in accordance with embodiments as described herein.

The relative rigidity and deflection pressures can be determined for many coverings based on the teachings described herein, for example for coverings having a plurality of layers having a plurality of materials.

TABLE A3

| | | Material 1 (Rigid) | | Material 2 (Soft) Flexural | | Composite | | Relative |
|---|---|---|---|---|---|---|---|---|
| Total Thickness | Layered Material | Thickness (m) | Modulus (Pa) | Thickness (m) | Modulus (Pa) | Thickness (m) | Composite Modulus (Pa) | Relative Rigidity (Pa * m^3) |
| 270 µm thick | Exemplary Silicone Shield | 2.40E−04 | 2.00E+07 | 3.00E−05 | 2.00E+06 | 2.70E−04 | 1.80E+07 | 3.54E−04 |
| | Soft and Hard are Equal | 1.35E−04 | 2.00E+07 | 1.25E−04 | 2.00E+06 | 2.70E−04 | 1.13E+07 | 1.99E−04 |
| 150 µm thick | Exemplary Silicone Shield | 1.20E−04 | 2.00E+07 | 3.00E−05 | 2.00E+06 | 1.50E−04 | 1.64E+07 | 5.54E−05 |
| | Soft and Hard w/ Equal thickness | 7.50E−05 | 2.00E+07 | 7.50E−05 | 2.00E+06 | 1.50E−04 | 1.10E+07 | 3.71E−05 |

When two or more materials are combined so as to provide two or more layers, the relative rigidity of each layer can be combined so as to determine a total composite rigidity. For example, the combined rigidity can be determined for a covering having first layer 110L1 of first material, a second layer 110L2 of second material M2 and third layer 110L3 of third material 110L3, in which the first and third materials can be the same material.

A weighted average system can be used to treat the two layers as one material. The relative amounts of each material and the moduli of the two materials can be combined to determine a composite modulus based on the weight average of the thickness of each layer. For example, with 90 µm of 20 Mpa material layer and a 10 µm of 5 MPa material layer can be combined so as to determine the composite modulus as 20 MPa*0.9+5 MPa*0.1=18.5 MPa The equations described herein accommodate many layers of different materials and thicknesses.

Based on the composite modulus, one can multiply the composite modulus by the overall thickness cubed, in the present example 18.5 MPa*100^3. Although these calculations can be based on approximations, a person of ordinary skill in the art can conduct simulations, for example finite element modeling simulations, so as to determine the amount of relative rigidity, pressures and deflection forces and pressures as described herein.

The index of refraction of one or more layers of covering 100 may correspond substantially to the index of refraction of the cornea.

One or more of the materials 110M1, 110M2 or 110M3 may comprise an index of refraction within a range from about 1.38 to about 1.43 so as to match the index of refraction of the cornea to within about +/−0.05. For example the materials 110M1 and 110M3 may comprise an optically transparent soft silicone elastomer having an index of refraction of about 1.41 and the material M2 may comprise an optically transparent rigid silicone elastomer having an index of refraction of about 1.43, for example available from NuSil. Alternatively, material 110M1 and material 110M3 may comprise silicone hydrogel and material 110M2 may comprise silicone, for example.

While the covering may comprise similar materials such as a more rigid silicone combined with a softer silicone, the covering may comprise dissimilar materials. For example, and RGP material can be combined with a hydrogel, such as the bicurve or tricurve embodiments as described herein. The covering can extend at least to the limbus for stability. The RGP material may comprise the second layer 110L2 of the second material 110M2, for example in accordance with Table A1, and the hydrogel may comprise the first layer 110L1 of the first material 110M1 and the third layer 110L3 of the third material 110M3. The hydrogel may have an index of refraction from about 1.38 to about 1.42 so as to match the index of refraction of the cornea of about 1.377 to within about 0.05 and may comprise one or more of HEMA, NVP, GMA, MMA, SiH, TRS, HEMA/NVP, MMA/NVP, HEMA/GMA, or SiH/TRS, commercially available from Vista Optics, UK, for example. The hydrogel comprising HEMA/NVP, MMA/NVP, or HEMA/GMA may have water content within a range from about 40% to about 70% so as to comprise the index of refraction within the range from about 1.38 to about 1.43. A water content of about 40% corresponds to an index of refraction of about 1.43 and a water content of about 70% corresponds to an index of refraction of about 1.38. The hydrogel comprising SiH/TRS may comprise water content within a range from about 20% to about 70% so as to comprise the index of refraction within the range from about 1.38 to about 1.43. With these SiH hydrogels a water content of about 20% corresponds to an index of refraction of about 1.43 and a water content of about 70% corresponds to an index of refraction of about 1.38.

FIG. 2A shows a covering 100 comprising a contact lens placed on the eye with the eyelids separated, in accordance with embodiments. The covering 100 is placed on the eye such that the tear liquid TL extends under at least a portion of the covering between the covering and the cornea so as to provide a chamber 100C. The covering 100 can be fit on or slightly flatter than the cornea so as to provide chamber 100C. Alternatively or in combination, the flange 120F and sclera coupling portion 120S of the outer portion 120 may comprise an angle steeper than the conjunctiva such the covering is urged away from the cornea near inner portion 110 so as to provide chamber 100C. The covering 100 comprises a sag height 10551 corresponding to the elevation distance from the center of the covering to the outer perimeter 120P of the sclera coupling portion 130. The eyelids can be separated for the patient to see an object.

FIG. 2B shows a side sectional view of the covering of FIG. 2A with the eyelids closing.

FIG. 2C shows a front view the covering of FIG. 2A with the eyelids closing, in accordance with embodiments. The eyelids can close with a downward movement 22A of the upper eyelid and an upward movement 22B of the lower eyelid. The closing of the eyelids exerts pressure on the covering 100 such that covering 100 comprises second configuration 100C2. The second configuration 100C2 comprises the sag height 105 decreased to second sag height 105S2 such that the volume of chamber 100C decreases and urges pumped tear fluid 100TL from under the covering. The pumped tear liquid 100TL flows radially outward under the outer portion 120P and through fenestrations 100F such as fenestrations not covered by the eyelid. The pressure of the eyelid can urge the covering 100 toward cornea 100 so as to decrease the volume of chamber 100C. The volume of chamber 100C can decrease substantially when the outer portion 120 comprising flange 120F deflects with elastic deformation. Alternatively or in combination, the outer portion 120 corresponding to the cornea can deflect so as to decrease the volume of chamber 100C. In many embodiments, the inner portion 110 comprising optical component 100A may deflect with pressure of the eyelid so as to decrease the volume of chamber 100.

Figure 2D:
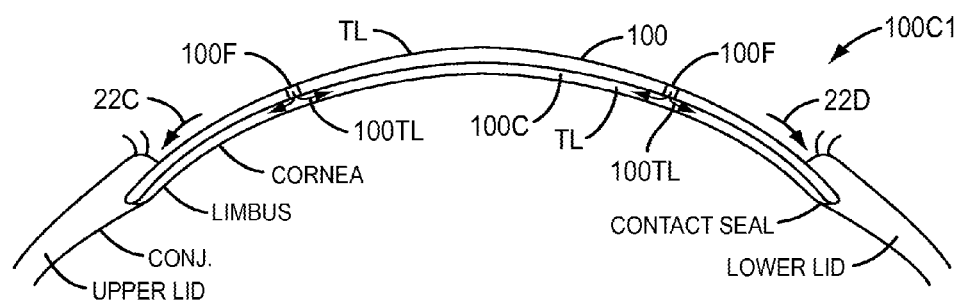
FIG. 2D shows side profile the covering of FIG. 2A with the eyelids opening, in accordance with embodiments.

FIG. 2D shows side profile the covering of FIG. 2A with the eyelids opening, in accordance with embodiments. When the eyelids retract with upward movement 22C of the upper eyelid and downward movement 22D of the lower eyelid, the covering 100 can return to the first configuration 100C1 having first sag height 105S1, such that the volume of the chamber increases. The outer portion 120 comprising flange 120F and peripheral portion 120F of the sclera coupling portion 130 may contact the conjunctiva so as to form a contact seal with the conjunctiva. The contact seal with the conjunctiva encourages flow of the tear liquid TL through the fenestrations 100F and into the chamber 100C, such that pumped tear liquid 100TL can be located between the cornea and the covering 100.

The tear rivulet of the lower lid can move upward when the eyes close so as to provide tear liquid on the surface of the eye, and at least a portion of the rivulet can couple to the upper lid when the lids contact each other. When the upper lid moves upward with movement 22C and the lower lid moves downward with movement 22D, the upper lid provide tear liquid TL near the upper fenestrations to pass through the upper fenestrations and the lower lid can provide tear liquid TL near the lower fenestrations to move through the lower fenestrations.

Repeated blinking of the eye may occur naturally, so as to pump tear liquid under the covering and rinse the cornea and conjunctiva under the covering. This pumping and rinsing provided by the covering can extend the amount of time the covering can be worn by a patient such as a patient having a normal unablated eye, and may encourage epithelial regenerations in post PRK eyes, for example.

Figure 2E:
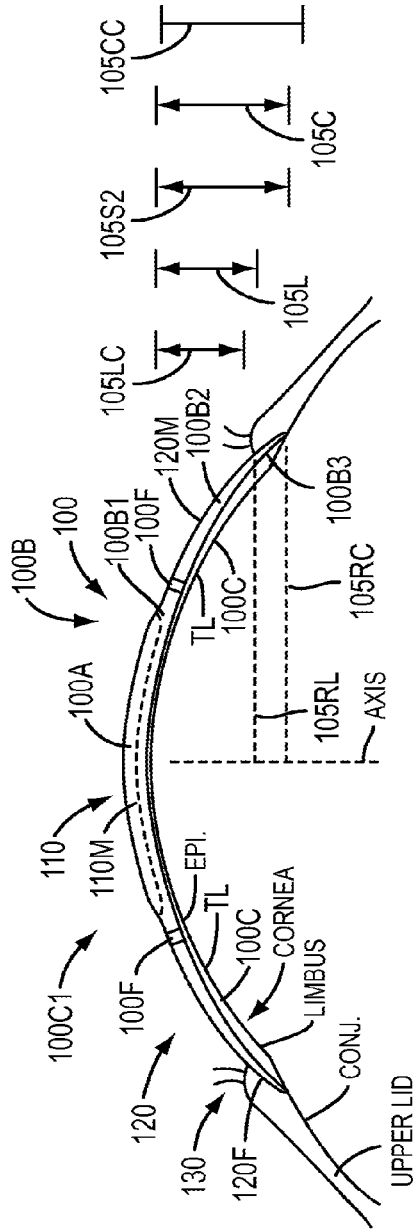
FIG. 2E shows a covering comprising a contact lens placed on the eye such that the covering is supported with an inner portion of the cornea and the conjunctiva with the covering separated from an outer portion of the cornea so as to define a chamber when the eyelids are separated, in accordance with embodiments.

FIG. 2E shows a covering comprising a contact lens placed on the eye such that the covering is supported with an inner portion of the cornea and the conjunctiva with the covering separated from an outer portion of the cornea so as to define a chamber when the eyelids are separated, in accordance with embodiments. The covering 100 may contact the cornea at an inner portion of the cornea, for example at a central location. The inner portion 110 can be sized to fit the cornea centrally as described herein, for example with on fitting. The outer portion of the covering 120 comprising flange 120F and sclera coupling portion 130 can be sized to contact the conjunctiva when the inner portion 110 contacts the sclera centrally, such that chamber 100C is formed over the outer portion of the cornea with a gap extending between the outer portion of the cornea and the covering. The outer portion 120 of the covering extending over the outer portion of the cornea may have a curvature less than the cornea, such that the outer portion 120 over the outer portion of the cornea can form chamber 100C when the inner portion 110 is supported with the cornea and the outer portion 120 comprising flange 120F is coupled to the conjunctiva. The fenestrations 100F can be located on the covering to correspond with a location of chamber 100C and the gap when the eyelids are open. The outer portion 120 comprises a resistance to deflection sufficient to form chamber 100C when the eyelids are open an insufficient to resist deflection when the eyelids move over the outer portion such that the outer portion moves toward the cornea and decrease the gap distance when the eyelids close.

The covering 100 can be fit to the cornea to encourage formation of the chamber 100C and such that covering 100 comprises an initial configuration 100C1 with chamber 100C formed beneath. The cornea may comprise a limbus sag height 105L corresponding to an elevational distance extending from a vertex of the cornea to the limbus. The limbus may be located a radial distance 105RL from a measurement axis of the eye. The eye may comprise a conjunctiva sag height 105C at a radial distance 105RC from the axis of the eye. The covering may comprise a limbus sag height 105LC at a location corresponding to the radial distance RL to the limbus. The covering may comprise a conjunctiva sag height 105CC at a conjunctiva contacting location corresponding to the radial distance 105RC of the conjunctiva, for example along flange 120F. In many embodiments, the sag height 105LC of the covering at the location corresponding to the limbus is no more than the limbus sag height 105L, and the sag height 105CC of the covering at the location corresponding to the conjunctiva is no more than the conjunctiva sag height 105C, such that pressure to the limbus is decreased. When the covering is placed on the eye, the conjunctiva coupling portion 130 comprising flange portion 120F can deflect such that the sag height of the conjunctiva contacting portion is decreased from 105CC the sag height of the conjunctiva to the sag height of the conjunctiva 105C, such that the sag height of the covering comprises a sag deflected sag height 105S2.

Figure 2F:
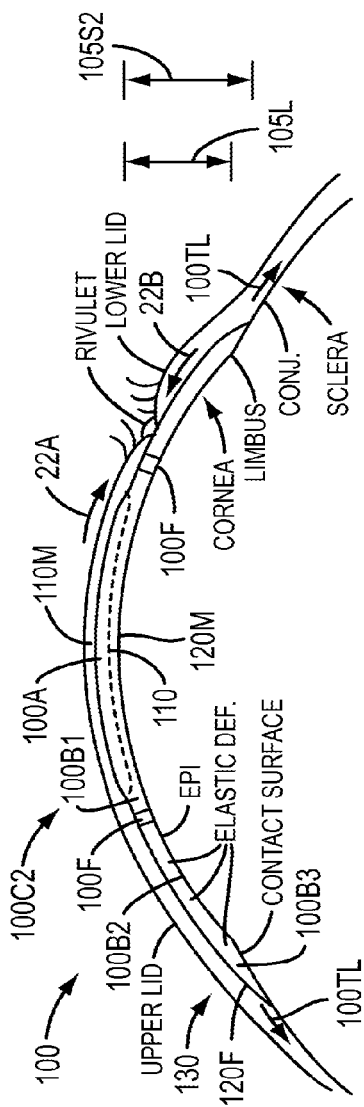
FIG. 2F shows a side sectional view of the covering of FIG. 2E with the eyelids closing, in accordance with embodiments.

FIG. 2F shows a side sectional view of the covering of FIG. 2E with the eyelids closing such that covering 100 comprises a configuration 100C2 with chamber 100C having a decreased volume. When the eyelids close, the upper and lower lids exert pressure on the covering such that the covering is urged toward the outer portion of cornea and the conjunctiva. The outer portion of the covering over the outer portion of the cornea may not have sufficient resistance to deflection such that the outer portion of the covering is deflected downward toward the outer portion of the cornea. The gap distance extending between the outer portion of the covering over the outer portion of the cornea is decreased, such that the volume of chamber 100C decreases and pumped tear liquid 100TL flow from chamber 100C through fenestrations 100F and under the conjunctiva contacting portion 130 comprising flange portion 120F. The upper eyelid can extend across the pupil so as to cover inferior and superior fenestrations 100F. The upper eyelid may contact the lower eyelid so as to draw the tear liquid of the rivulet superiorly when the eye opens, such that tear liquid of the rivulet can be drawn into the chamber through the inferior and superior fenestrations.

The deflection of the outer portion of the covering over the outer portion of the cornea can be provided with a covering having a relative rigidity within a range from about 1.0E-6 Pa*m^3 to about 6E-4 Pa*m^3, for example from about 2.5E-6 Pa*m^3 to about 5E-4 Pa*m^3. Table A2 shows values suitable of relative rigidity and corresponding ranges of outer portion 120 corresponding to the outer portion of the cornea that can be determined based on the teachings described herein so as to determine the relative rigidity of the outer portion of the covering to provide resistance to deflection and form the chamber with the gap when the eyelid is away from the portion of the covering and so as to deflect toward the cornea and decrease the gap and corresponding chamber volume when the eyelid covers the portion of the covering.

The deflection of the sclera contacting portion 130 to couple to the conjunctiva can be provided with the sclera contacting portion 130 comprising a relative rigidity of no more than about 2E-4 Pa*m^3, for example no more than about 1E-4 Pa*m^3, and in many embodiments no more than about 2E-5 Pa*m^3. Table A2 shows values suitable of relative rigidity and corresponding ranges of sclera coupling portion 130 that can be determined based on the teachings described herein so as to determine the relative rigidity of the sclera coupling portion of the covering to provide resistance to deflection and form the chamber with the gap when the eyelid is away from the portion of the covering and so as to deflect toward the cornea and decrease the gap and corresponding chamber volume when the eyelid covers the outer portion of the covering over the outer portion of the cornea.

The deflection of the flange portion 120F to couple to the conjunctiva can be provided with the flange portion 130 comprising a relative rigidity of no more than about 1E-4 Pa*m^3, for example no more than about 2E-5 Pa*m^3, and in many embodiments no more than about 2.5E-6 Pa*m^3. Table A2 shows values suitable of relative rigidity and corresponding ranges of outer flange portion 120F that can be determined based on the teachings described herein so as to determine the relative rigidity of the flange portion 120F of the covering to provide resistance to deflection and form the chamber with the gap when the eyelid is away from the portion of the covering and so as to deflect toward the cornea and decrease the gap and corresponding chamber volume when the eyelid covers the outer portion of the covering over the outer portion of the cornea.

FIG. 2F1 shows a side sectional view of the covering of FIG. 2F with rotation of the eye when the lids close such that sliding of the covering along the epithelium is inhibited when tear liquid is pumped, in accordance with embodiments. The axis of the eye can rotate superiorly such that the covering slides along the upper lid and the lower lid. The axis of the eye may comprise one or more known axis of the eye and can be determined in many ways by a person of ordinary skill in the art.

FIG. 2G shows a side view sectional view of the covering of FIG. 2E with the eyelids opening, in accordance with embodiments. The opening of the eyelids decreases pressure and allows the outer portion of the covering above the outer portion of the cornea to move away from the cornea. The tear liquid TL may pass through fenestrations 100F and into the chamber 100C. The outer portion of the covering comprising portion 130 and flange 120F can contact the conjunctiva to inhibit tear flow and may seal the covering.

FIG. 2H shows a side view sectional view of the covering of FIG. 2E with the eyelids located at an intermediate location such that the chamber comprises an intermediate configuration 100C12 volume, in accordance with embodiments. The optical component 100A comprising inner portion 110 may comprise sufficient rigidity and resistance to deflection so as to provide vision for the patient when the covering comprises intermediate portion 100C12 having outer portion 120 deflected so as to decrease volume of chamber 100C. For example, the patient can close the eyelids to the pupil margin to deflect the outer portion and the optical component 100B and inner portion 110 can remain substantially undeflected such that the patient can have vision of 20/20 or better (metric 6/6 or better) with a portion of one or more eye lids contacting the inner portion 110. Opening of the eyelids can increase the chamber volume and pump tear liquid and closing of the eyelids can decrease chamber volume and pump tear liquid.

Figure 2I:
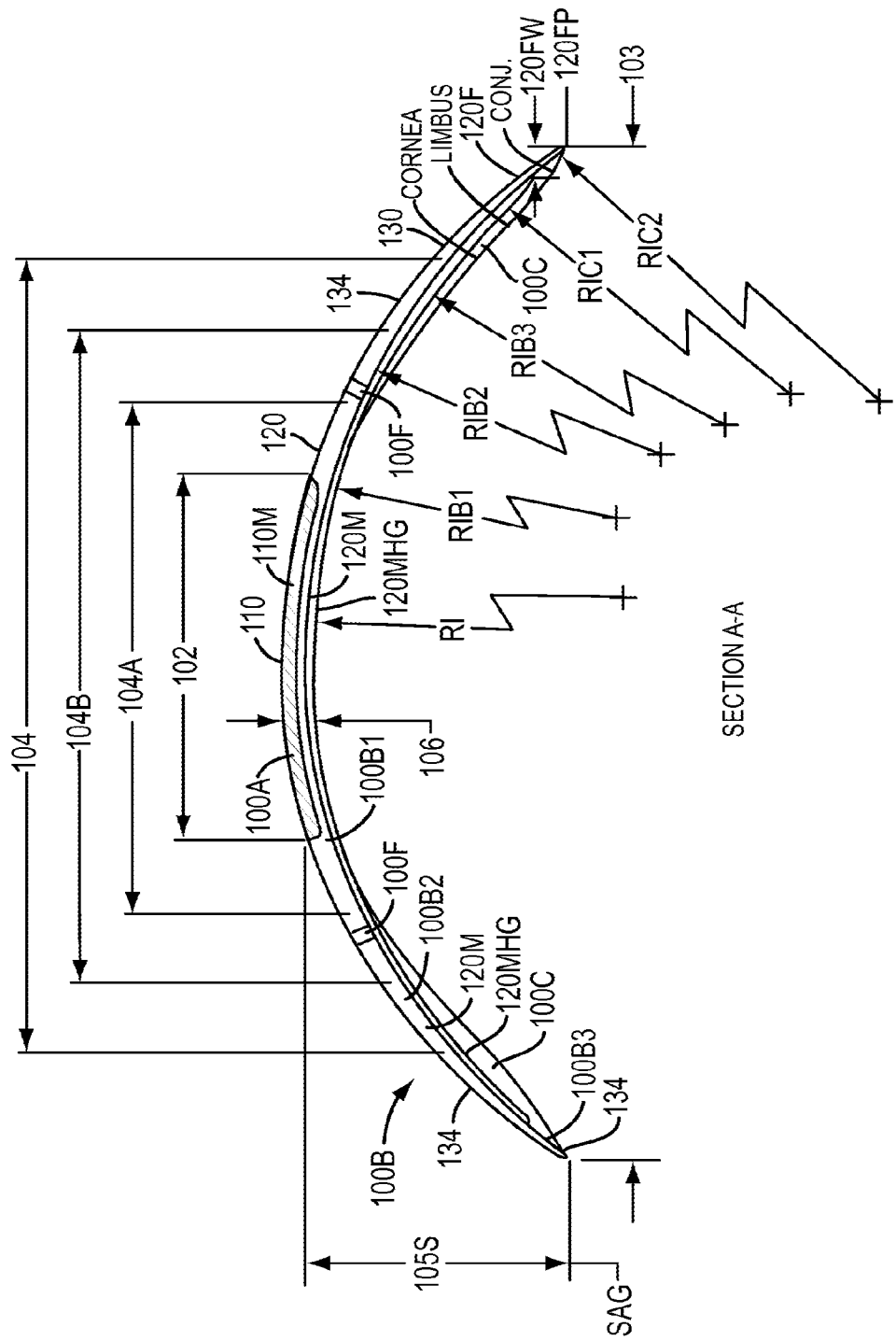
FIG. 2I shows a side view sectional view of the covering of FIG. 1C4 placed on the eye with hydrogel contacting the eye, in accordance with embodiments.

FIG. 2I shows a side view sectional view of the covering of FIG. 1C4 placed on the eye with hydrogel contacting the eye. The covering 100 comprises the layer of hydrogel material 120MHG extending along the posterior surface of the covering so as to contact the eye with at least a portion of the hydrogel layer. The covering 100 can be dimensioned to form chamber 100C defined at least in part with the layer of hydrogel material. The fenestration may extend through the hydrogel layer so as to provide pumping as described herein. Alternatively or in combination, the posterior end of the fenestration can be covered with the hydrogel material to couple the cornea to the fenestration with the layer of hydrogel material. The fenestrations covered with the layer of hydrogel material 120MHG can be located along the deflectable portion of the covering so as to encourage movement of water and therapeutic agents along the hydrogel material, for example when the eye blinks. The hydrogel layer may comprise a medium to pass liquid and therapeutic agent from the fenestration to a desired location of the cornea, for example with wicking of the liquid and therapeutic agent to a central location of the cornea. The covering comprising the hydrogel layer extending along the lower surface as described herein can be fit to an unablated eye to provide refractive correction or fit to an ablated eye as described herein.

Clinical testing in accordance with embodiments has shown that the curved portions of the covering can be fit with on K-values in accordance with corneal curvatures and sag heights and limbus sag heights and conjunctiva sag heights of a patient population.

Appendix I shown herein below provides dimensions and fit parameters for covering 100 in accordance with embodiments and teachings as described herein. The coverings may comprise one or more of the materials in the Series A Tables shown herein, for example. The dimensions and fit parameters of the coverings can provide pumping of the tear liquid when placed on the cornea in accordance with embodiments described herein. The tables of Appendix I identify the coverings for use with steep corneas, medium corneas and flat corneas, for example. The values listed can be based on population norms, such that the coverings provide pumping as described herein when placed on the eye. The coverings can be used with non-ablated eyes or ablated eyes, and the covering can be identified at least in part based on the first inner curvature R1.

Table B1 shows covering 100 having a diameter of approximately 14 mm across and can be fit on or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-11 mm across. The portion corresponding to R1C1 can extend from about 11 to 13.5 mm across, and may comprise curvature having one or more values between portion R1B3 and portion R1C2, for example a radius of curvature between about 8 mm and about 12 mm such as about 10 mm. The portion corresponding to R1C2 can extend from about 13.5 to 14 mm across. The sag height of the portion R1C2 can be from about 3.1 to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Table B2 shows covering 100 having a diameter of approximately 14 mm across and can be fit on or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-11 mm across, and these values range from about 35.75 to about 40, such that each value is somewhat flatter at the peripheral portion than corresponding values of Table B1. For example, Table B1 lists the values for R1B3 as having a range from about 36.75 to about 41 D. The portion corresponding to R1C1 can extend from about 11 to 13.5 mm across. The portion corresponding to R1C2 can extend from about 13.5 to 14 mm across. The sag height of the portion R1C2 can be from about 3.1 to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Table B3 shows covering 100 having a diameter of approximately 16 mm across and can be fit on or flatter, for example as described herein. The table lists R1 corresponding to the center ablated portion of the cornea. The inner portion 110 comprising optical component 100A and inner coupling component 100B1 has dimension R1 extends about 5 mm across, and the ablation zone can be larger, for example about 6 mm. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-10.5 mm across, and these values range from about 36.75 to about 41. The portion corresponding to R1C can extend from about 13 to about 16 mm across. The sag height of the portion R1C2 can be less than about 3.6 mm, for example, such that portion R1C2 can be deflected when placed on the eye. The portion corresponding to R1C1 can be fit to the cornea in many ways as described herein.

Table B4 shows covering 100 having curvatures for use with non-ablated eyes so as to pump tear liquid as described herein, for example with an extended wear contact lens. Covering 100 has a diameter of approximately 14 mm across and can be fit on or flatter, for example as described herein. The table lists R1 corresponding to the center ablated portion of the cornea. The inner portion 110 comprising optical component 100A and inner coupling component 100B1 has dimension R1 extends about 5 mm across. The curvatures of the inner portion corresponding to R1 have curvature values corresponding to optical powers from about 39 D to about 48 D, which can be based on population data for unablated eyes and combined with the curvatures for portions R1B1 to R1B3 and R1C1 and R1C2, for example. The portion corresponding to radius R1B1 has dimensions of about 5-7 mm across, and the curvature can be expressed with keratometry values (K-values) corresponding to the optical power of the eye in Diopters (D). The portion corresponding to radius R1B2 has dimensions of about 7-9 mm across. The portion corresponding to radius R1B3 has dimensions of about 9-11 mm across. The portion corresponding to R1C1 can extend from about 11 to about 13.5 mm across. The portion corresponding to R1C2 can extend from about 13.5 to 14 mm across. The sag height of the portion R1C2 can be from about 3.1 to about 3.4 mm, for example. The portion corresponding to R1C1 can be fit to the cornea in many ways as described herein, for example with the tangent of portion R1C1 aligned with R1B3 on the inner boundary and R1C2 along an outer boundary so as to inhibit ridge formation as described herein.

Although Tables B1-B4 list specific curvature values by way of example, a person of ordinary skill in the art can determine many curvature values based on the teachings and embodiments described herein and one or more of the curvatures can be combined with an aspheric surface, for example an aspheric surface having a conic constant.

Figure 3A:
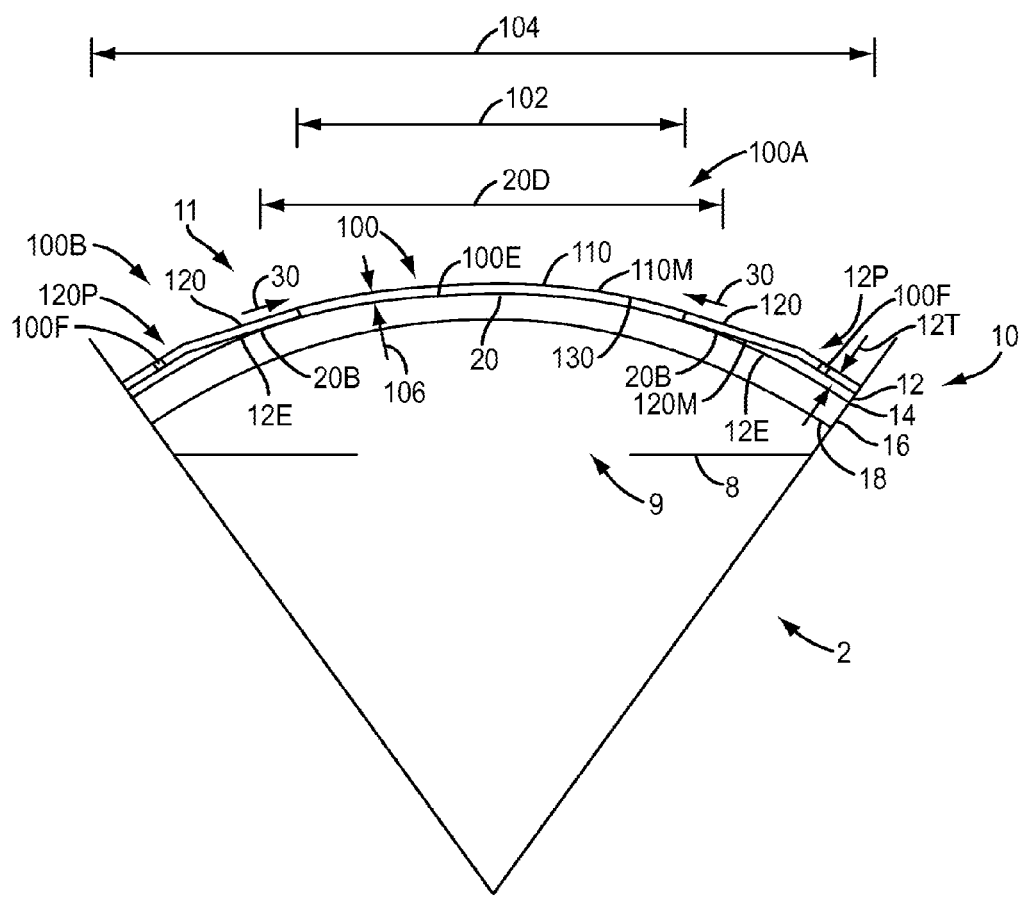
FIG. 3A shows a covering positioned on cornea an eye having an epithelial defect, in accordance with embodiments.

FIG. 3A shows a covering 100 positioned on cornea 10 an eye 2 having an epithelial defect 11. The covering may comprise a curved body, for example a curved contact lens body shaped to fit the cornea.

The covering 100 can be sized to cover the ablated profile and epithelial defect. The inner portion 110 comprises a dimension across 102 that can be sized to extend across a majority of the ablation, and the outer portion 120 comprises a dimension across 104 sized to extend across at least the epithelial defect and contact the epithelium on opposite sides of the defect.

The dimension 102 extending across a majority of the ablation may extend about 6 to 8 mm, for example, and may be sized larger than the ablation. The dimension 104 may comprise about 12 to 14 mm across, for example so as to extend to the limbus and can be sized to the limbus of the patient for example. Work in relation to embodiments suggests that the covering sized to extend to the limbus and circumferentially around the limbus can be centered on the cornea. The covering may extend such that the outer rim of the covering contacts the conjunctiva disposed above the sclera peripheral to the limbus, for example, and that such configurations may center the lens on the cornea, for example.

The thickness of the covering can be sized and shaped in many ways. The inner portion 110 of the covering comprises a thickness 106 and the outer portion 120 of the covering comprises a thickness 108. The thickness 106 of the inner portion may comprise a substantially uniform thickness such that the inner portion comprises an optical power of no more than about +/−1 D prior to placement on the eye, for example when held in front of the eye and separated from the cornea by a distance. Alternatively, the thickness of the inner portion may vary so as comprise optical power, for example optical power to correct vision of the patient.

A smooth layer 12S of regenerated epithelium 12R may substantially cover an ablated profile. The environment 100E is configured to guide epithelial regeneration and smooth the regenerated epithelium. The regenerating epithelium comprises a thickness profile 12RP.

The epithelium grows centripetally from circumscribing boundary 12E toward the center of ablated profile 20 to cover the exposed stroma, as indicated by arrows 30.

The covering 100 may comprise an inner portion 110 and an outer portion 120. The outer portion 110 can be configured to form a seal 100S with the cornea near the edge of the ablation and the epithelial defect, for example with a soft conformable material such as silicone elastomer or silicone hydrogel. The inner portion 120 is positioned over the pupil and configured for the patient to see, and may comprise a rigidity greater than the outer portion, so as to smooth irregularities of the epithelium when the cornea heals. Alternatively, the inner portion may comprise rigidity equal to or less than the rigidity of the outer portion as well. For example, the inner portion may comprise silicone and the outer portion may comprise silicone, and the inner portion may comprise one or more of a more rigid silicone or a greater thickness such that the inner portion can be more rigid than the outer portion so as to smooth the epithelium. Although the inner portion can be more rigid than the outer portion, the inner portion can be sufficiently soft, flexible and conformable so as to conform at least partially to the ablated profile 20 in the stroma, such that the patient receives the benefit of the vision correction with the ablation profile 20 when the patient looks through the inner portion and the inner portion smoothes the epithelium. Work in relation to embodiments of the present invention suggests that the regenerating epithelium is softer than the underlying stroma of ablation profile 20, such that the inner portion can be configured to conform to the shape of the ablation profile 20 when the inner portion smoothes the epithelium disposed under the inner portion, for example with deflection pressure as described herein.

Figure 3B:
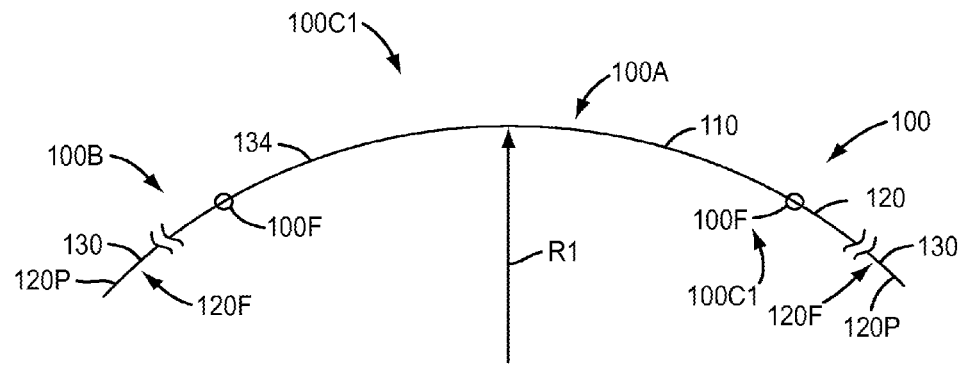
FIG. 3B shows a covering in a first configuration prior to placement on cornea of an eye having an epithelial defect, in accordance with embodiments.

FIG. 3B shows covering 100 in a first configuration prior to placement on the cornea of an eye having an epithelial defect, such as an eye having a PRK ablation. The covering 100 comprises fenestrations 100F. The fenestrations 100F can be located on the covering such that the fenestrations are located away from the epithelial defect to pump tear liquid under the covering as described herein. The covering 100 may comprise inner portion 110 having a base radius R1 of curvature, and the base radius of curvature may be slightly longer than the ablated cornea such that the covering can be flatter than the cornea prior to placement on the cornea. The outer portion 120 comprising sclera coupling portion 130 may comprise a portion steeper than the cornea to reduce pressure to the limbus. For example flange portion 120F can be steeper than the corresponding portions of conjunctiva and sclera so as to decrease pressure of the covering on the limbus.

The base radius R1 can be sized to the cornea in many ways. For example, the base radius R1 may have a radius corresponding to the post ablated eye.

The covering 100 may comprise a modulus within a range from about 4 MPa to about 35 MPa, such that central portion can conform at least partially to the ablated stroma and so that the covering can smooth corneal irregularities and stromal irregularities of the ablated cornea. The covering may comprise an elastomeric stretchable material such that the covering can stretch to fit the cornea, for example. The covering having the modulus within a range from about 4 MPa to about 35 MPa can be formed in many ways as described herein. For example, the covering may comprise a single piece of material having a substantially uniform thickness extending across the ablated cornea and at least a portion of the unablated cornea, and the single piece of material may comprise an elastic material such as a silicone elastomer or a hydrogel. Alternatively, the covering may comprise a single piece of material having a non-uniform thickness extending across the ablated cornea and at least a portion of the unablated cornea. The covering can be shaped in many ways and may comprise a single piece of one material, or may comprise a single piece composed to two similar materials, or may comprise a plurality of materials joined together.

The covering 100 may comprise one or more outer portions extending outside the inner portion as described herein.

Figure 3C:
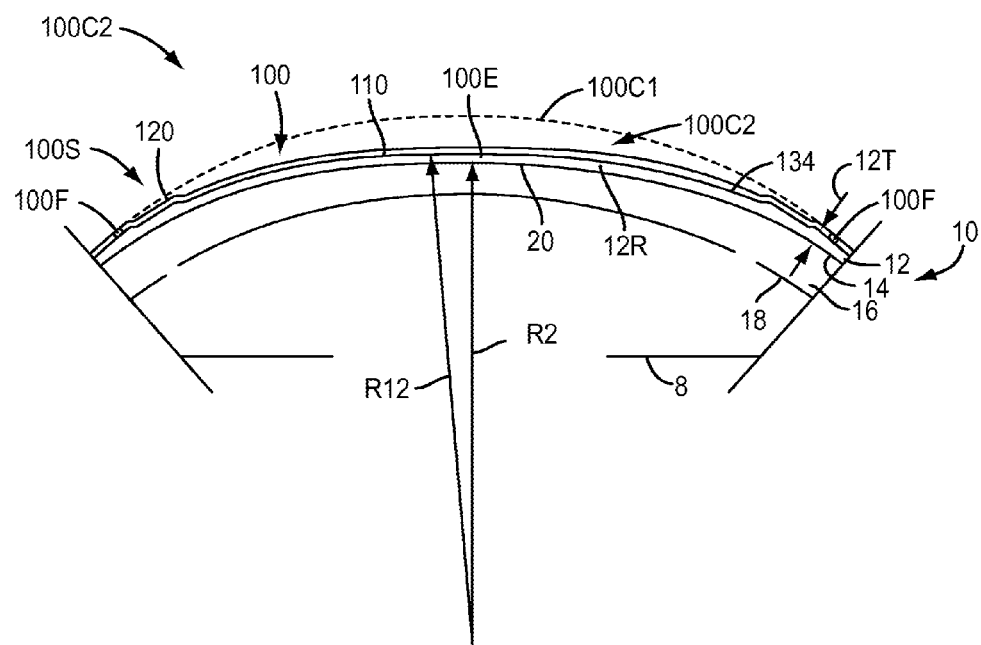
FIG. 3C shows the covering of FIG. 3B placed on the eye having a second configuration, in accordance with embodiments.

FIG. 3C shows the covering of FIG. 3B placed on the eye having a second configuration 100C2 conforming to ablated stromal tissue and smoothing the epithelium over the ablated stroma, such that the covering can pump tear liquid as described herein. The cornea comprises an ablated surface 20 to correct vision that may have a corresponding radius of curvature, for example radius R2. The ablated profile 20 may comprise additional, alternative, or combinational shapes with those corresponding to radius R2, such as aberrations ablated into the cornea to correct aberrations of the eye and astigmatism ablated into the cornea, and the inner portion 110 of covering 100 can conform to these ablated profiles of the cornea such that the patient can receive the benefit of the ablative vision correction when the covering is positioned on the cornea. For example, the cornea ablation profile 20 may correspond to radius of curvature R2, and the inner portion 110 can flatten from configuration 100C1 corresponding to radius of curvature R1 prior to placement to a second configuration 100C2 corresponding substantially to the ablated profile 20, such the patient can see with the benefit of ablation profile 20. For example, the second configuration 100C2 can comprise a conforming radius of curvature R12 that corresponds substantially to radius of curvature R2. The profile corresponding to the first configuration 100C1 of the covering 100 is shown positioned over cornea 10 to illustrate the change in profile of the covering from configuration 100C1 prior to placement to conforming configuration 100C2 of the covering 100 when positioned on the cornea.

The conformable covering 100 comprises sufficient rigidity so as to smooth the epithelium when covering 100 is positioned on the cornea over the ablation profile 20. The epithelium comprises a peripheral thickness 12T that may correspond substantially to a thickness of the epithelium prior to debridement of the epithelium to ablate the cornea. The epithelium also comprises regenerating epithelium 12R disposed over the ablation profile 20. The covering 100 can smooth the epithelium 12R when conforming to the cornea in the second configuration 12C2. For example, irregularities 121 of the regenerating epithelium 12R disposed over the ablation can be smoothed when the epithelium regenerates along the inner portion of covering 100, such that the irregularities 121 of the regenerating epithelium 12R are thinner than the thickness 12T of the peripheral epithelium.

Work in relation to the embodiments as described herein indicates that an at least partially conformable covering having a modulus within a range from about 4 MPa to about 35 MPa can conform at least partially to the ablated stroma and smooth irregularities of the epithelium and stroma so as to improve vision as described herein. The covering having the modulus within the range from about 4 MPa to about 35 MPa can be formed in many ways as described herein.

FIGS. 4A to 4H show a method 400 of manufacturing a covering 100 and apparatus for manufacturing the covering as described herein.

FIG. 4A shows a mold 600A to form an optical component 100A of a covering 100 comprising material 110M as described herein. The optical component 100A may comprise an optically transparent material such as a silicone, for example. The optical component may comprise a modulus and thickness and corresponding rigidity as described herein, so as to provide vision and smoothing of the cornea. The mold 600A may comprise an optical correction on one surface and a base curvature on the opposite surface, for example. With a step 410, the optical component 100A can be formed in mold 600A.

FIG. 4B shows a mold 600B to form a covering comprising the optical component of FIG. 4A and the coupling component 100B. The optical component 100A can be placed in the mold and the flowable material 120M of the coupling component injected into the mold so as to form the covering. The solid inner component comprising a rigid material placed therein prior to injection of a flowable material. The mold 600B may comprise inner material 110M positioned within the mold as a solid piece of material and outer material 120M comprising a flowable material injected into mold 600B and cured around the preformed piece comprising inner material 120M. The flowable material can be injected around the inner material 100M in many ways. For example, the inner material 110M may comprise a second layer 110L2 of rigid material 110M2 of the inner portion 110 as described herein, and the flowable material can be injected around the upper and lower surfaces of second material 110M2 so as to form a first layer 110L1 of first material 110M1 and a third layer 110L3 of the third material 110M3 with the flowable material such that the first material 110M1, the third material 110M3 and the outer material 120M each comprise substantially the same soft material when cured. With a step 420, the covering comprising the optical component 100A and the coupling component 100B can be formed FIG. 4C shows a mold 600C to form a covering comprising the optical component of FIG. 4A and a layer of a soft material of the covering, such that the optical component can be located between two layers of the coupling component. The optical component 100M can be removed from the mold as shown in FIG. 4A and placed in the mold 600C. The flowable material M3 corresponding to layer 110L3 can be injected into the mold and cured. The partially formed inner component comprising layer 110L2 and layer 110L3 can be removed from mold 600C. With a step 430, the portion of the covering comprising the two layers can be formed.

FIG. 4D shows a mold 600D to form a covering and having a solid inner component comprising the rigid material placed for injection of a flowable material, in accordance with embodiments of the present invention. The mold 600 may comprise inner material 110M positioned within the mold as a solid piece of material and outer material 120M comprising a flowable material injected into mold 600 and cured around the preformed piece comprising inner material 600. The mold may comprise an upper portion and a lower portion. In many embodiments, the covering 100 can be formed in a mold with rigid second material 110M2 placed in the mold and encapsulated within a single piece of material comprising first material 110M1, third material 110M3 and outer material 120M, such that first material 110M1, third material 110M3 and outer material 120M comprise the same material, for example silicone. The rigid second material 110M2 may comprise silicone bonded to each of first material 110M1, third material 110M3 and the outer material 120M, for example with curing such that first material 110M1, third material 110M3 and outer material 120M comprise the same soft silicone material bonded to the second material 110M2 comprising rigid silicone. With a step 440, the covering comprising the solid inner component between first material 110M1 and third material 110M3 can be formed.

FIG. 4E shows formation of fenestrations in the covering with energy. With a step 450 the covering as described in FIG. 4B or 4D can be treated with energy 650, for example mechanical energy or electromagnetic energy such as light energy to form the fenestration extending through the covering. For example, the fenestration can be removed from the mold and mechanically punched or ablated with laser light energy to form the fenestration.

FIG. 4F shows spin coating of a hydrogel material on a posterior surface of the covering. An amount of a curable hydrogel forming material 660 as described herein can be deposited on the posterior surface of the covering and spun with rotation 662 at rate such that the coating moves away from a center of the covering toward and outer boundary of the hydrogel material. The outer boundary of the hydrogel material can be determined based on the amount of curable material 660 and spin rate, and the curable hydrogel material can be formulated to provide the desired thickness as described herein, for example a substantially uniform thickness within a range from about 1 µm to about 100 µm when fully hydrated. With a step 460, the curable hydrogel forming material 660 can be cured so as to provide the layer of hydrogel material on the lower surface of the covering 100.

FIG. 4G shows chemical vapor deposition on the covering having the hydrogel material formed thereon. The covering 100 can be placed in a chemical vapor deposition chamber 670, and treated with one or more forms of chemical vapor deposition as described herein. With a step 460, the covering 100 can be coated with the CVD to provide the wettable material on the surface of the covering.

FIG. 4H shows the covering comprising 100 the hydrogel material 120HG packaged in a container 680. The covering can be sterilized, and can be packaged wet or dry, or combinations thereof in container 680. For example, the covering can be placed with a fluid comprising saline in the container. Alternatively, the covering 100 can be dry packaged in container 680, for example. With a step 480, the covering 100 can be placed on container 680 and the container sealed.

It should be appreciated that the specific steps illustrated in method 400 provide a particular method of manufacturing a covering, according to an embodiment of the present invention. Other sequences of steps may also be performed according to alternative embodiments. For example, alternative embodiments of the present invention may perform the steps outlined above in a different order. Moreover, the individual steps illustrated may include multiple sub-steps that may be performed in various sequences as appropriate to the individual step. Furthermore, additional steps may be added or removed depending on the particular applications. One of ordinary skill in the art would recognize many variations, modifications, and alternatives.

A Method 500 of manufacturing covering 100 comprising a contact lens to pump tear liquid may comprise one or more of the following steps:

505—Provide first mold for optical component
510—Inject first flowable material into first mold
515—Cure first flowable material to form first optical component
520—Remove first optical component from first mold
525—Place first optical component in second mold
530—Inject second curable material into second mold
535—Cure second flowable material to form second component
540—Remove second component from second mold
545—Place second component in third mold
550—Inject third flowable material into third mold
555—Cure third flowable to form covering
560—Remove covering
565—Drill fenestrations
570—Coat with wettable material The rigidity and hardness of the molded covering can be determined by one or more of the material hardness, the modulus or the thickness. The molded covering may comprise a covering with an inner center more rigid than the outer periphery, for example, and the center can be thicker than edge. For example, the covering may comprise a single piece covering with an inner portion thicker than the outer portion such that the inner portion is more rigid than the outer portion. Alternatively or in combination, an optically clear inner portion can be molded; the inner portion placed in the mold, and the covering molded to form the outer portion around the inner portion. For example, the molded inner portion comprising layer 110L2 of material 110M2 as described herein, and one or more of layers 110L1 or 110L3 molded around layer 110L2.

It should be appreciated that the specific steps illustrated in Method 500 provide a particular method of manufacturing a covering, according to an embodiment of the present invention. Other sequences of steps may also be performed according to alternative embodiments. For example, alternative embodiments of the present invention may perform the steps outlined above in a different order. Moreover, the individual steps illustrated may include multiple sub-steps that may be performed in various sequences as appropriate to the individual step. Furthermore, additional steps may be added or removed depending on the particular applications. One of ordinary skill in the art would recognize many variations, modifications, and alternatives.

Clinical studies have been undertaken and are contemplated to show the pumping of the tear under the lens with blinking of the eye in accordance with the embodiments described herein. A person of ordinary skill in the art can determine empirically the properties of covering 100 as described herein so as to provide pumping of the tear fluid under the covering to provide one or more of an extended wear contact lens or a covering for placement on the cornea following PRK to improve vision and promote reepithelialization.

As used herein, like reference characters indicate like structures that can be combined in accordance with the teachings and embodiments described herein.

In certain embodiments, methods for selecting ophthalmic lenses are provided. The methods may be used to correct a refractive error of an eye of a patient, the eye having a cornea with an epithelium providing a refractive shape. In certain embodiments, methods for selecting ophthalmic lenses comprise determining a desired spherical power so as to mitigate any spherical component of the refractive error of the eye of the patient; and identifying, from among a plurality of alternative ophthalmic lenses having differing spherical powers, the ophthalmic lens corresponding to the desired spherical power. The identified ophthalmic lens may then be selected and applied to the eye of the patient to correct the spherical refractive error. The identified ophthalmic lens has an anterior surface corresponding to the desired optical power, and the anterior surface extends along an inner portion of the ophthalmic lens.

The ophthalmic lenses have an inner portion for correcting spherical refractive error and a peripheral portion for contacting an optical tissue. The inner portion of the ophthalmic lens is deformable and the peripheral portion of the ophthalmic lens is deformable. The inner portion of the ophthalmic lens has a modulus and a rigidity that is higher than the modulus and the rigidity of the peripheral portion. The peripheral portion of the ophthalmic lens has a shape suitable for engaging the eye outside the optical region so as to support the inner portion in alignment with an optical region of the eye. In certain embodiments, the peripheral portion is configured to engage a tissue of the eye such as the epithelium and to prevent or minimize motion of the ophthalmic device with respect to the optical region of the eye. In certain embodiments, the inner portion, the peripheral portion, or both the inner and peripheral portions may deform or deflect upon blinking of the eye.

In certain embodiments, the refractive shape of the epithelium extends across the optical region of the eye such that the refractive error comprises astigmatism and/or a high-order optical aberration. In such embodiments, the posterior surface extending across the optical region adjacent the eye may or may not comprise a refractive shape so as to mitigate the astigmatism and/or high-order aberration. Selection of a desired ophthalmic lens is performed so that the peripheral portion of the ophthalmic lens has a suitable shape to maintain a lenticular volume between the posterior surface of the ophthalmic device and the surface of the eye such as the epithelium. Before, during, and/or following positioning of the ophthalmic device on the eye, the lenticular volume fills with tear fluid such that the anterior shape of the ophthalmic lens corrects the refractive error. Accordingly, in certain methods, selecting an ophthalmic lens is performed so that the peripheral portion has a suitable shape such that tear fluid will fill a lenticular volume between the posterior surface and the refractive shape of the eye so as to mitigate the astigmatism and/or high-order aberration. Where tear fluid is disposed between the contact lens and the eye, and where the lens has a refractive index sufficiently close to that of the tear fluid, the refraction of the eye may be largely independent of the shape the posterior surface and/or lenticular volume, at least when the posterior surface initially contacts the lens and/or the contact lens remains disposed on the eye. In certain methods, identifying an ophthalmic lens is independent of as least one member of the group a power of the astigmatism; and orientation of the astigmatism about an optical axis of the eye, and/or as strength of the high-order aberration and/or a type of high-order aberration. As a consequence of the lenticular volume as defined by posterior surface of the eye and the refractive shape being filled with tear fluid, it is not necessary to orient an axis or position of the ophthalmic device with the eye.

Ophthalmic lens provided by the present disclosure may also be used for treating presbyopia. Methods for treating presbyopia comprise, for example, positioning an ophthalmic lens on an eye so that an inner portion of the ophthalmic lens is disposed over the optical region of the cornea of the eye, and supporting the inner portion of the ophthalmic lens by engagement between a peripheral portion of the ophthalmic lens and a tissue of the eye outside the optical region. The inner portion of the ophthalmic lens and the peripheral portion of the ophthalmic lens can be deformable such that the inner portion has a modulus and rigidity that is greater than the modulus and rigidity of the peripheral portion. To correct for presbyopia, the inner portion comprises a presbyopia-mitigating refractive shape. In certain embodiments, a presbyopia-mitigating shape is selected from an add region, a multifocal shape, an aspherical shape, and a combination of any of the foregoing. In certain embodiments, the peripheral portion comprises one or more radius of curvature configured to engage a tissue of the eye such as the epithelium so as to prevent or minimize motion of the inner portion with respect to the optical region of the cornea. The anterior portion of ophthalmic lens and the posterior surface of the eye define a lenticular volume that is configured to fill with tear fluid. To facilitate filling and/or flow of the tear fluid a plurality of fenestrations extending through the thickness of the peripheral region may be disposed in the peripheral region. The fenestrations are disposed so as to facilitate, in conjunction with motion of the ophthalmic lens, transfer of tear fluid through the lenticular volume. Such methods of treating presbyopia using an ophthalmic lens provided by the present disclosure may not require precise alignment of the ophthalmic lens with respect to the eye.

Similarly, methods for correcting a refractive error of an eye, such as astigmatism and/or spherical aberration, where the eye has a cornea with an epithelium providing a refractive shape extending a cross an optical region of the eye are also provided. Methods for correcting a refractive error comprising positioning an ophthalmic lens on the eye so that an inner portion of the ophthalmic lens is disposed over the optical region of the cornea, wherein a posterior surface of the positioned ophthalmic lens extends adjacent the eye and has shape diverging from the refractive shape of the epithelium so that a lenticular volume is disposed between the posterior surface and the epithelium. A peripheral portion of the ophthalmic lens may comprise a plurality of fenestrations extending through the thickness of the peripheral portion and allowing passage of tear fluid between the lenticular volume and the posterior (outer) surface of the ophthalmic lens. In such embodiments, the inner portion of the positioned ophthalmic lens is supported by engagement of a peripheral portion of the ophthalmic lens and a tissue of the eye such as the epithelium outside the optical region. The peripheral portion is configured to support the inner portion of the ophthalmic lens, to prevent or minimize motion of the inner portion with respect to the optical region of the eye, and to facilitate filling of the lenticular volume with tear fluid.

The fenestrations may be disposed outside the optical region of the ophthalmic lens and inward of a region of engagement between the peripheral portion of the ophthalmic lens and a tissue of the eye. The inner portion and the peripheral portion of the ophthalmic lens are deformable, for example, deformable upon motion of an eyelid and/or over locally protruding epithelial regions so as to inhibit pain, such that the inner portion has a modulus and rigidity that is higher than the modulus and rigidity of the peripheral portion. In certain embodiments, the deformability of the inner portion and the outer portion of the ophthalmic lens are configured so that blinking of the eye induces flow of tear fluid through the fenestrations into and out of the lenticular volume, and that when the eye is not blinking the inner portion retains a shape that corrects the refractive error of the eye.

In certain embodiments, the peripheral portion comprises one or more radius of curvature configured to engage a surface of the eye and thereby resist motion of the inner portion with respect to the optical region of the eye. For example, in certain embodiments, a peripheral portion comprises a plurality of radii of curvature wherein the radii of curvature become smaller from the center of the ophthalmic lens toward the periphery. In certain embodiments, the engagement between the peripheral portion and the tissue surface of the eye along the engagement region inhibits lateral movement of the inner portion relative to the cornea during blinking.

In certain embodiments, methods of correcting refractive error provided by the present disclosure can, for example, mitigate the refractive error, when viewing with the eye through the anterior surface, substantially independent of a shape of the lenticular volume throughout a range of astigmatic errors of at least about 0.5 D, at least about 1.0 D, and in certain embodiments, at least bout 1.5 D, and is independent of a rotational orientation of the ophthalmic lens about a viewing axis of the eye.

Methods provided by the present disclosure further comprise methods of remodeling the shape of the epithelium of an eye. In certain embodiments, methods for optically remodeling the relative shape of the epithelium comprise positioning an ophthalmic lens on the eye so that an inner portion of the ophthalmic lens is disposed over the optical region of the cornea, wherein a posterior surface of the positioned ophthalmic lens extends adjacent the eye and has a shape diverging from the refractive shape of the epithelium so that a lenticular volume is disposed therebetween; and supporting the inner portion of the ophthalmic lens by engagement between a peripheral portion of the ophthalmic lens and the eye outside the optical region so that fluid fills the lenticular volume and viewing with the eye through an anterior surface of the ophthalmic lens mitigates the refractive error. In methods of remodeling the shape of the epithelium to correct refractive error of the eye, the ophthalmic lens often (though not always) does not comprise fenestrations. The posterior surface of the ophthalmic lens defines a refractive shape for correcting spherical power and when positioned on the eye defines a lenticular volume with the surface of the eye. Over time, the epithelium and/or underlying tissue of the eye may fill or otherwise occupy some, most, or all of the lenticular volume disposed over the optical region. As with other embodiments an ophthalmic lens for use in remodeling the shape of the epithelium comprises a deformable inner portion and a deformable peripheral portion such that the inner portion has a higher modulus and rigidity than that of the peripheral portion and the peripheral portion is configured to engage a tissue surface of the eye and to inhibit lateral movement of the inner portion with respect to the optical region of the cornea.

In certain embodiments, methods of remodeling the refractive shape of the epithelium mitigate the refractive error when viewing with the eye through the anterior surface, substantially independent of a shape of the lenticular volume throughout a range of astigmatic errors of at least about 0.5 D, at least about 1.0 D, and in certain embodiments, at least bout 1.5 D, and is independent of a rotational orientation of the ophthalmic lens about a viewing axis of the eye.

Furthermore, when the ophthalmic lens is removed from the eye the optical remodeling of the epithelium mitigates the refractive error of the eye by at least about 1½ at least about 8 hours, at least about 24 hours, and in certain embodiments, at least about 48 hours, after removal of the ophthalmic lens from the eye.

Certain embodiments provided by the present disclosure comprise sets of alternatively selectable ophthalmic lenses for correcting refractive errors of eyes of a population of patients. Such sets of ophthalmic lenses may be used in the methods disclosed herein. The plurality alternative ophthalmic lenses have differing spherical powers representing different refractive corrections. Each of the plurality of alternative ophthalmic lenses comprises an anterior surface corresponding to an associated desired spherical power, the anterior surface extending along an inner portion of the ophthalmic lens, wherein the inner portion of the ophthalmic lens is deformable; and a peripheral portion of the ophthalmic lens extending radially outwardly from the inner portion, the peripheral portion having a rigidity lower than that of the inner portion and configured for engaging tissue outside the optical region so as to support the inner portion in alignment with an optical region.

In certain embodiments, ophthalmic lenses suitable for use in methods provided by the present disclosure comprise an inner portion configured to be disposed over the optical region of the cornea of an eye, and a peripheral portion configured to support the inner portion of the ophthalmic lens by engagement between the peripheral portion of a tissue of an eye such as an epithelium disposed outside the optical region. The inner portion and the peripheral portion are deformable such that the modulus and rigidity of the inner portion is higher than that of the peripheral portion. In certain embodiments, the peripheral portion comprises one or more radii of curvature whereby the peripheral portion engages a surface tissue of an eye to prevent or mitigate motion of the inner portion with respect to the optical region of the cornea during blinking.

For treatment of presbyopia, the inner portion of the ophthalmic lens comprises a surface extending along the inner portion comprising a presbyopia-mitigating refractive shape.

For treatment of spherical refractive error the surface extending along the inner portion of the ophthalmic lens comprises a shape configure to correct spherical refractive error.

In certain embodiments, the inner portion may be configured to correct non-spherical refractive errors such as astigmatic error, multifocal error, higher order aberrations, and custom optically corrective functions such as pin holes.

Certain embodiments provided by the present disclosure include coverings comprising an optical component and a coupling component, the optical component comprising a first material having a first modulus, and the coupling component comprising a second material having a second modulus, wherein the first modulus is greater than the second modulus. FIG. 5 shows covering 500, comprising optical component 501 and coupling component 502.

In certain embodiments, covering 500 has a diameter 510 from about 9 mm to about 16 mm, in certain embodiments, from about 10 mm to about 15 mm, and in certain embodiments, from about 12 mm to about 14 mm.

In certain embodiments, optical component 501 comprises a center thickness from about 150 µm to about 500 µm, from about 200 µm to about 400 µm, and in certain embodiments, from about 250 µm to about 350 µm.

In certain embodiments, optical component 501 comprises a first material having a first thickness 505 and a second material having a second thickness 503. In such embodiments, the second material may be disposed on the inner surface of optical component 501, e.g., the surface facing the cornea, and may be the same material as the material forming coupling component 502. The second material may have a thickness 503 from about 5 µm to about 60 µm, from about 10 µm to about 50 µm, and in certain embodiments, from about 20 µm to about 40 µm. In such embodiments, where optical component 501 comprises two materials, the total thickness of the optical component may be from about 100 µm to about 550 µm, from about 200 µm to about 450 µm, and in certain embodiments, from about 250 µm to about 350 µm.

In certain embodiments, optical component 501 comprises an optically clear material having a modulus from about 10 MPa to about 70 MPa, from about 20 MPa to about 60 MPa, from about 20 MPa to about 50 MPa, and in certain embodiments from about 30 MPa to about 40 MPa.

Optical component 501 may be configured to correct vision or may not be configured to correct vision.

In certain embodiments, optical component 501 comprises a material selected from silicone, silicone hydrogel, and a combination thereof. In certain embodiments, optical component 501 comprises silicone, in certain embodiments, silicone hydrogel, and in certain embodiments a combination of silicone and silicone hydrogel.

In certain embodiments, optical component 501 comprises a center thickness from about 150 µm to about 500 µm, a diameter from about 3 mm to about 9 mm, a radius of curvature from about 7 mm to about 12 mm, and a modulus from about 20 MPa to about 50 MPa.

In certain embodiments, coupling component 502 extends from optical component 501 to an outer periphery 504, where the thickness at the juncture with optical component 501 is the same as or similar to that of optical component 502, and gradually tapers toward outer periphery 504, wherein the thickness of the coupling component at the periphery us from about 5 µm to about 60 µm, from about 10 µm to about 50 µm, and in certain embodiments, from about 20 µm to about 40 µm.

In certain embodiments, coupling component 502 comprises at least one radius of curvature 512. For example, in certain embodiments, coupling component 502 comprises a single radius of curvature, and in certain embodiments, coupling component 502 comprises more than one radius of curvature such as two, three, four, five, six, or more than six radii of curvature. The at least one radius of curvature can be, for example, from about 5 mm to about 15 mm, from about 6 mm to about 13 mm, from about 7 mm to about 12 mm, and in certain embodiments, from about 6 mm to about 10 mm. The one or more radius of curvature 512 characterizing coupling component 502 are less than the radius of curvature of optical component 501.

In certain embodiments, coupling component 502 comprises a material having a modulus from about 0.05 MPa to about 4 MPa, from about 0.1 MPa to about 3 MPa, from about 0.1 MPa to about 2 MPa, and in certain embodiment from about 0.2 MPa to about 1.5 MPa.

In certain embodiments, coupling component 502 comprises a material selected from silicone, silicone hydrogel, and a combination thereof. In certain embodiments, coupling component comprises silicone, in certain embodiments, silicone hydrogel, and in certain embodiments a combination of silicone and silicone hydrogel.

In certain embodiments, coupling component 502 comprises a plurality of fenestrations 509 extending through the thickness of the coupling component. Coupling component 502 may comprise, for example, from 1 to about 30 fenestrations, from 1 to about 20 fenestrations, and in certain embodiments, from about 1 to about 10 fenestrations. Fenestrations 509 may have any suitable shape to provide egress of tear fluid. Suitable shapes include, for example, circular, elliptical, oval, rectangular, square, slot, or combination of any of the foregoing. Each of the plurality of fenestrations 509 may have the same shape or at least some of the fenestrations may have different shapes. In certain embodiments, the fenestrations have a maximum dimension (hole size) from about 50 µm to about 700 µm, from about 100 µm to about 500 µm, and in certain embodiments, from about 200 µm to about 400 µm. Each of the fenestrations may have the same maximum dimension or at least one of the fenestrations may have a different dimension.

In certain embodiments, coupling component 502 does not include fenestrations.

In certain embodiments, coupling component 502 comprises a thickness tapering from the thickness of optical component 501 to a thickness of about 30 µm at the periphery 504 of the coupling component; a plurality or radius of curvature from about 7 mm to about 12 mm; and comprises a material having a modulus from about 0.1 MPa to about 2 MPa. In embodiments in which coupling component 502 comprises a plurality of radii of curvatures 512, the radius of curvature decreases from the optical component toward the periphery.

The covering, including optical component 501 and coupling component 502, is configured to provide a seal to a tissue of an eye such as an epithelium to thereby resist movement of the optical component on an eye.

Figure 6C:
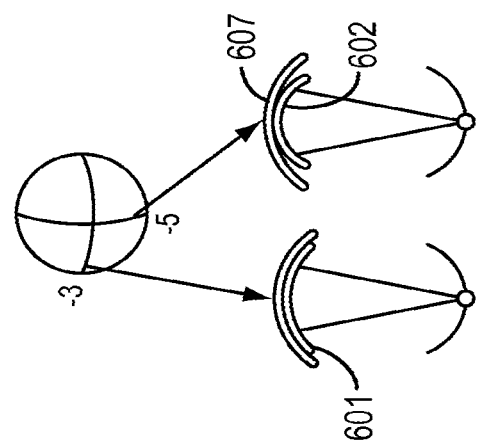
FIG. 6C shows views of radials for an example of a covering according to certain embodiments of the present invention positioned on an astigmatic eye.
Figure 6B:
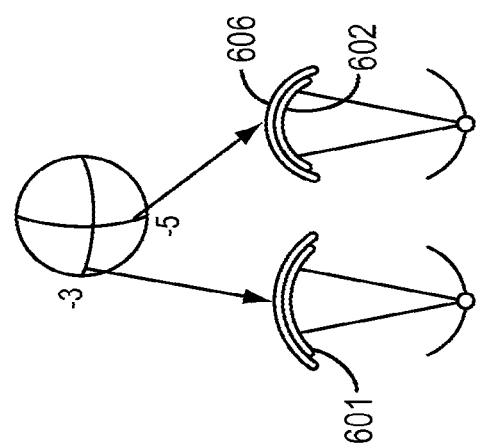
FIG. 6B shows views of radials for an example of a soft lens positioned on an astigmatic eye.
Figure 6A:
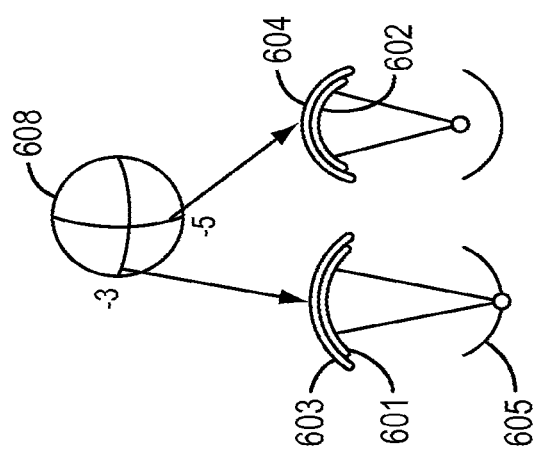
FIG. 6A shows views of radials for an example of a hard lens positioned on an astigmatic eye.

FIGS. 6A-6C show various lenses positioned on an astigmatic eye. For each of FIGS. 6A-6C, the left image shows the configuration of the first radial and the right image shows the configuration of the second radial corresponding to the aspheric projection 608. In FIG. 6A, the configuration corresponding to the first radial includes the optical surface of the eye 601 and soft refractive lens 603, which provides a focus on retina 605. In the right image of FIG. 6A, the second radial direction corresponds to a different refractive shape 602 that does not focus on the retina. Soft, conformable ophthalmic lens 604 conforms to shape 602 and thereby fails to correct the non-spherical aberration. FIG. 6B shows aspheric correction using a hard, non-conformable ophthalmic lens 606. Again, the first radial and the second radial correspond to different optical shapes 601 and 602, respectively. Although hard ophthalmic lens 606 corrects vision, the lens must be oriented to correct the asymmetric profile of the eye. FIG. 6C schematically shows correction of non-spherical aberration using ophthalmic lenses and methods provided by the present disclosure (with the peripheral portion of the eye and lens outside the optical region omitted for simplicity). Ophthalmic lenses provided by the present disclosure have a modulus and rigidity that is configured to provide a lenticular volume between the optical surface of the eye 602 and the ophthalmic lens 607. For correction of presbyopia, the ophthalmic lens is configured such that the lenticular volume fills with tear fluid. As can be appreciated, it is not necessary to orient ophthalmic lens 607 to correct non-spherical optical aberrations.

Coverings provided by the present disclosure may be used as platforms in a number of ophthalmic applications including, for example, epithelium healing, spherical correction of astigmatism, presbyopic solutions, epithelial reshaping, and dry eye.

In certain embodiments, coverings may be used to facilitate epithelial healing. Epithelial defects can occur, for example, as the result of PRK, filamentary keratitis, evaporative dry eye, or physical injury to the eye. In these and other applications, including applications in which vision is corrected, When positioned on the eye of a patient, the inner surface of the covering and the outer surface of the eye, which may include, for example, the cornea, Bowman's membrane, and/or epithelium, can define a chamber to facilitate healing and/or growth of the epithelium. In such applications it is desirable that a covering control moisture content and exhibit a high Dk to facilitate extended wear. Using coverings and methods provided by the present disclosure, complete epithelial regrowth following PRK surgery can occur within about 48 hours, about 72 hours, 96 hours, and in for certain patients, within about 1 week following PRK.

When used for spherical correction of corneal astigmatism, coverings and methods provided by the present disclosure exhibit the advantages of improved comfort compared to gas permeable lenses, enhanced vision compared to soft contact lenses, and reduced fitting time compared to toric and GP lenses. Coverings and methods can, in certain embodiments, correct greater than 95% of astigmatic errors, irregular astigmatism such as induced by trauma or RK, and early kerotoconus.

In certain embodiments, a covering comprises an optical component that corrects vision. Thus, in addition to spherical correction, the optical component can be configured to support multifocal, higher order aberration or custom optical designs such as pin holes.

In epithelial reshaping applications, coverings and methods provided by the present disclosure can be used to reshape the epithelial during wear, and correct vision for a period of time after the covering is removed from the eye. For example, to correct myopia, a covering can be used to guide the epithelium toward the periphery of the eye and to create a flatter center curve. To correct hyperopia, a covering may be used to guide the epithelium toward the center of the eye and to create a steeper center curve. In certain embodiments, a covering can be used to induce mulitfocality for vision correction by guiding the epithelium toward a desired location or locations on a cornea by molding with an aspheric optic. The induction of mulitfocality through epithelial resphaping can be useful to correct vision in presbyopia and myopia.

Coverings and methods provided by the present disclosure can also be used to address dry eye. In such applications, the covering material comprises a material such as silicone that has a low water content and low water absorption, water evaporation from the eye can be controlled and a tear or lubricant reservoir maintained.

EXAMPLES

Embodiments provided by the present disclosure are further illustrated by reference to the following examples, which describe the use of certain ophthalmic lenses provided by the present disclosure. It will be apparent to those skilled in the art that many modifications, both to materials, and methods, may be practiced without departing from the scope of the disclosure.

Example 1

A subject requiring an optical correction of −2.63 Diopters (OD) and −2.13 Diopters (OS) characteristic for a subject having myopia wore ophthalmic lenses on both eyes for (very roughly) about 40 hours. The inner and peripheral radii of curvature for the ophthalmic devices are provided in Table 1. After about 40 hours, the ophthalmic lenses were removed and the amount of optical correction (Diopters) need to correct vision was determined at various times. The amount of optical correction (Diopters) needed after the ophthalmic lens was removed from the subjects is presented in Table 1.

TABLE 1

Amount of optical correction (Diopters) needed after wearing an ophthalmic lens.

| | Amount of correction needed (prior to shield wear) | Radii of curvature for ophthalmic lens | | Time following ophthalmic lens removal | | | | | | |
|---|---|---|---|---|---|---|---|---|---|---|
| | | Inner Curve (degrees) | Peripheral Curve (degrees) | 5 min | 2 hr | 4 hr | 8 hr | 24 hr | 30 hr | 48 hr |
| Subject #1 OD | −2.63 | 39.5 | 43.0 | −0.63 | +0.13 | +0.13 | NM | −0.50 | −0.75 | −1.25 |
| Subject #1 OS | −2.13 | 39.5 | 41.5 | −0.63 | −0.13 | NM | NM | 0.00 | 0.00 | −2.38 |

*NM = No Measurement

Example 2

A subject requiring an optical correction of +0.13 Diopters (OD) and +0.25 Diopters (OS) characteristic for a subject having hyperopia wore ophthalmic lenses on the right eye for (very roughly) about 35 hours, and on the left eye for (very roughly) about 17. The inner and peripheral radii of curvature for the ophthalmic devices are provided in Table 2. After about the specified number of hours, the ophthalmic lenses were removed and the amount of optical correction (Diopters) need to correct vision was determined at various times. The amount of optical correction (Diopters) needed after the ophthalmic lens was removed from the subjects is presented in Table 2.

TABLE 2

Amount of optical correction (Diopters) needed after wearing an ophthalmic lens.

| | Amount of correction needed (prior to shield wear) | Radii of curvature for ophthalmic lens | | Time following ophthalmic lens removal | | | | | | |
|---|---|---|---|---|---|---|---|---|---|---|
| | | Inner Curve (degrees) | Peripheral Curve (degrees) | 5 min | 2 hr | 4 hr | 8 hr | 24 hr | 30 hr | 48 hr |
| Subject #2 OD | +0.13 | 39.5 | 43.0 | −2.38 | −3.13 | −3.37 | −2.00 | NM | NM | NM |
| Subject #2OS | +0.25 | 39.5 | 41.5 | −1.00 | −1.25 | NM | NM | 0.00 | NM | NM |

*NM = No Measurement

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

APPENDIX 1

TABLE B1

| 14 mm multicurve designs | R1 center BC (D) | R1B1 5-7 mm K (D) | R1B2 7-9 mm K (D) | R1B3 9-11 mm K (D) | R1 C2 13.5-14 mm K (D) | SAG mm | DIA |
|---|---|---|---|---|---|---|---|
| Steep K | 36.5 | 43.50 | 42.25 | 39.50 | <12 mm BC (140 micron thick) | 3.1-3.4 | 13.8-14.1 mm |
| Medium | 36.5 | 42.00 | 40.75 | 38.25 | <12 mm BC (140 micron thick) | 3.1-3.4 | 13.8-14.1 mm |
| Flat K | 36.5 | 40.50 | 39.25 | 36.75 | <12 mm BC (140 micron thick) | 3.1-3.4 | 13.8-14.1 mm |
| Steep K | 38.5 | 44.25 | 43.00 | 40.25 | <12 mm BC (140 micron thick) | 3.1-3.4 | 13.8-14.1 mm |
| Medium | 38.5 | 42.75 | 41.50 | 39.00 | <12 mm BC (140 micron thick) | 3.1-3.4 | 13.8-14.1 mm |
| Flat K | 38.5 | 41.25 | 40.00 | 37.50 | <12 mm BC (140 micron thick) | 3.1-3.4 | 13.8-14.1 mm |
| Steep K | 40.5 | 45.00 | 43.75 | 41.00 | <12 mm BC (140 micron thick) | 3.1-3.4 | 13.8-14.1 mm |
| Medium | 40.5 | 43.50 | 42.25 | 39.75 | <12 mm BC (140 micron thick) | 3.1-3.4 | 13.8-14.1 mm |
| Flat K | 40.5 | 42.00 | 40.75 | 38.25 | <12 mm BC (140 micron thick) | 3.1-3.4 | 13.8-14.1 mm |

TABLE B2

Flatter periphery design

| 14 mm multicurve designs | R1 Center BC (D) | R1B1 5-7 mm K (D) | R1B2 7-9 mm K (D) | R1B3 9-11 mm K (D) | R1 C2 13.5-14 mm K (D) | SAG (mm) | DIA |
|---|---|---|---|---|---|---|---|
| Steep K | 36.5 | 43.50 | 42.25 | 38.50 | <12 mm BC (140 micron thick) | 3.1-3.4 | 13.8-14.1 mm |
| Medium | 36.5 | 42.00 | 40.75 | 37.25 | <12 mm BC (140 micron thick) | 3.1-3.4 | 13.8-14.1 mm |
| Flat K | 36.5 | 40.50 | 39.25 | 35.75 | <12 mm BC (140 micron thick) | 3.1-3.4 | 13.8-14.1 mm |
| Steep K | 38.5 | 44.25 | 43.00 | 39.25 | <12 mm BC (140 micron thick) | 3.1-3.4 | 13.8-14.1 mm |
| Medium | 38.5 | 42.75 | 41.50 | 38.00 | <12 mm BC (140 micron thick) | 3.1-3.4 | 13.8-14.1 mm |
| Flat K | 38.5 | 41.25 | 40.00 | 36.50 | <12 mm BC (140 micron thick) | 3.1-3.4 | 13.8-14.1 mm |
| Steep K | 40.5 | 45.00 | 43.75 | 40.00 | <12 mm BC (140 micron thick) | 3.1-3.4 | 13.8-14.1 mm |
| Medium | 40.5 | 43.50 | 42.25 | 38.75 | <12 mm BC (140 micron thick) | 3.1-3.4 | 13.8-14.1 mm |
| Flat K | 40.5 | 42.00 | 40.75 | 37.25 | <12 mm BC (140 micron thick) | 3.1-3.4 | 13.8-14.1 mm |

TABLE B3

| Large shield (16 mm) multicurve designs | R1 center BC | R1B1 5-7 mm K (D) | R1B2 7-9 mm K (D) | R1B3 9-10.5 mm K (D) | 10.5-13 mm K (D) | 13-16 mm* | SAG (mm) | DIA |
|---|---|---|---|---|---|---|---|---|
| Steep K | 36.5 | 43.50 | 42.25 | 39.50 | <10.0 mm/33.75D | <14.5 mm/23D | ≤3.6 | 15.6-16.1 mm |
| Medium | 36.5 | 42.00 | 40.75 | 38.25 | <10.0 mm/33.75D | <14.5 mm/23D | ≤3.6 | 15.6-16.1 mm |
| Flat K | 36.5 | 40.50 | 39.25 | 36.75 | <10.0 mm/33.75D | <14.5 mm/23D | ≤3.6 | 15.6-16.1 mm |
| Steep K | 38.5 | 44.25 | 43.00 | 40.25 | <10.0 mm/33.75D | <14.5 mm/23D | ≤3.6 | 15.6-16.1 mm |
| Medium | 38.5 | 42.75 | 41.50 | 39.00 | <10.0 mm/33.75D | <14.5 mm/23D | ≤3.6 | 15.6-16.1 mm |
| Flat K | 38.5 | 41.25 | 40.00 | 37.50 | <10.0 mm/33.75D | <14.5 mm/23D | ≤3.6 | 15.6-16.1 mm |
| Steep K | 40.5 | 45.00 | 43.75 | 41.00 | <10.0 mm/33.75D | <14.5 mm/23D | ≤3.6 | 15.6-16.1 mm |
| Medium | 40.5 | 43.50 | 42.25 | 39.75 | <10.0 mm/33.75D | <14.5 mm/23D | ≤3.6 | 15.6-16.1 mm |
| Flat K | 40.5 | 42.00 | 40.75 | 38.25 | <10.0 mm/33.75D | <14.5 mm/23D | ≤3.6 | 15.6-16.1 mm |

*may not tangent with previous curve (may insert an outer curve to help it flare)

TABLE B4

| Multicurve CL designs | | R1 center BC (D) | R1B1 5-7 mm K (D) | R1B2 7-9 mm K (D) | R1B3 9-11 mm K (D) | R1C 13.5-14 mm K (D) | SAG (mm) | DIA |
|---|---|---|---|---|---|---|---|---|
| CL central curve 1 | Steep K | 40 | 41.75 | 39.00 | 39.00 | <12 mm BC (140 micron thick) | 3.1-3.4 | 13.8-14.1 mm |
| | Medium | 40.00 | 39.75 | 37.25 | 37.25 | <12 mm BC (140 micron thick) | 3.1-3.4 | 13.8-14.1 mm |
| | Flat K | 40.00 | 37.75 | 35.25 | 35.25 | <12 mm BC (140 micron thick) | 3.1-3.4 | 13.8-14.1 mm |
| CL central curve 2 | Steep K | 42.00 | 43.75 | 41.00 | 41.00 | <12 mm BC (140 micron thick) | 3.1-3.4 | 13.8-14.1 mm |
| | Medium | 42.00 | 41.75 | 39.25 | 39.25 | <12 mm BC (140 micron thick) | 3.1-3.4 | 13.8-14.1 mm |
| | Flat K | 42.00 | 39.75 | 37.25 | 37.25 | <12 mm BC (140 micron thick) | 3.1-3.4 | 13.8-14.1 mm |
| CL central curve 3 | Steep K | 44.000 | 44.75 | 42.00 | 42.00 | <12 mm BC (140 micron thick) | 3.1-3.4 | 13.8-14.1 mm |
| | Medium | 44.00 | 43.25 | 40.75 | 40.75 | <12 mm BC (140 micron thick) | 3.1-3.4 | 13.8-14.1 mm |
| | Flat K | 44.00 | 41.75 | 39.25 | 39.25 | <12 mm BC (140 micron thick) | 3.1-3.4 | 13.8-14.1 mm |
| CL central curve 4 | Steep K | 46.00 | 46.75 | 44.00 | 44.00 | <12 mm BC (140 micron thick) | 3.1-3.4 | 13.8-14.1 mm |
| | Medium | 46.00 | 45.25 | 42.75 | 42.75 | <12 mm BC (140 micron thick) | 3.1-3.4 | 13.8-14.1 mm |
| | Flat K | 46.00 | 43.75 | 41.25 | 41.25 | <12 mm BC (140 micron thick) | 3.1-3.4 | 13.8-14.1 mm |

What is claimed is:

1. A method of correcting vision of an eye of a patient, the eye having tear liquid, a pupil, a cornea having a refractive shape, and a conjunctiva, the method comprising:

providing a lens comprising an optical component and a coupling component to an eye of a patient, wherein, the optical component is configured to correct vision of the eye, the optical component comprising a first rigidity sufficient to resist deformation when placed on the eye so that a posterior surface extending along the optical component has a shape diverging from the refractive shape of the cornea and defines a chamber having a volume between the posterior surface and the cornea;

the coupling component is configured to contact the cornea and the conjunctiva and to support the optical component in relation to the pupil, the coupling component comprising an outer portion sized to contact the conjunctiva, an inner portion to couple to the optical component, and an intermediate portion extending between the inner portion and the outer portion;

one or more of the optical component and the coupling component comprising a plurality of fenestrations coupled to the chamber to pump the tear liquid through the plurality of fenestrations when the eye blinks, wherein the optical component is configured to move toward the cornea when the eye blinks; and wherein the volume of the chamber decreases when the eye blinks;

wherein the eye comprises eyelids and the coupling component comprises an inner portion to couple to the optical component, an outer portion and an intermediate portion extending between the inner portion and the outer portion, wherein the inner portion corresponds to an inner portion of the cornea and the intermediate portion corresponds to an outer location of the cornea and wherein the intermediate portion comprises a resistance to deflection sufficient to form the chamber having a volume when the covering is placed on the eye with the eyelids separated and wherein the intermediate portion of the covering to deflects toward the cornea to decrease the volume of the chamber and pump the tear liquid when one or more of the eyelids contacts the intermediate portion of the coupling component; and wherein the inner portion of the coupling component comprises a lower surface having a curvature corresponding to a curvature of an upper surface of the inner portion of the cornea and wherein the intermediate portion of the coupling component comprises a lower surface having a curvature less than an upper surface of the outer portion of the cornea such that the intermediate portion of the coupling component extends away from the outer portion of the cornea with a gap extending between the intermediate portion of the coupling component and the outer portion of the cornea and wherein the lower surface of the inner portion of the lens contacts upper surface of the inner portion of the cornea and the outer portion of the coupling component extends to the conjunctiva so as to define the chamber when the lens is placed on the eye.

2. The method of claim 1 wherein the coupling component inhibits sliding movement of the optical component relative to the pupil when the eye blinks and pumps the tear liquid.

3. The method of claim 2 wherein the lens comprises one or more inferior fenestrations located inferior to the pupil and wherein the eye rolls superiorly and the upper lid moves inferiorly such that the upper lid covers inferior fenestrations when the eye blinks.

4. The method of claim 3 wherein the eye comprises a rivulet comprising tear liquid supported with a lower lid and wherein the upper lid contacts the rivulet and draws tear liquid of the lower rivulet across the one or more lower fenestrations and upper fenestrations such that the tear liquid of the rivulet is drawn through the fenestrations.

5. The method of claim 1 wherein the volume of the chamber increases and the coupling component contacts the conjunctiva when lids of the eye open so as to inhibit flow of tear liquid between the conjunctiva and the coupling component such that the tear liquid flows into the chamber through the fenestrations.

6. The method of claim 1 wherein the volume of the chamber decreases when the lids of the eye close such that tear liquid is pumped from the chamber through the fenestrations and in between the conjunctiva and an outer portion coupling component.

7. The method of claim 1 wherein the eye comprises a limbus and wherein the outer portion of the coupling component comprises a second resistance to deflection sufficient to form the chamber with the gap extending between at least a portion of the limbus and the outer portion of the lens when the lens is placed on the eye.

8. The method of claim 1 wherein the lens is placed on the eye.

9. The method of claim 8 wherein the coupling component comprises an outer elastic portion having a lower curved surface to contact the conjunctiva and wherein a curvature of the lower curved surface corresponds to a radius of curvature less than a radius of curvature of the conjunctiva such that the lower curved surface stretches elastically when the eye blinks and a eyelid urges the optical component downward toward the cornea.

10. The method of claim 8 wherein the tear liquid is drawn through the fenestrations toward the cornea when the eyelid moves away from the lens and wherein the tear liquid flows away from the cornea when the eyelid moves toward the lens.

11. The method of claim 10 wherein an amount of medicament is drawn through the fenestrations toward the cornea when the eyelid moves away from the lens and wherein a portion of the amount of the medicament flows away from the cornea when the eyelid moves toward the lens.

12. The method of claim 1 wherein the coupling component supports the optical component in a substantially fixed relation to the pupil.

13. The method of claim 1 wherein the coupling component comprises an outer portion sized to contact the conjunctiva, an inner portion to couple to the optical component, and an intermediate portion extending between the inner portion and the outer portion.

14. The method of claim 1 wherein the coupling component comprises a deflectable material that inhibits passage of the tear liquid through the material such that the tear liquid passes through the fenestrations when the eye blinks and an eyelid exerts pressure on the optical component.

15. The method of claim 14 wherein the coupling component comprises a first configuration when the eyelid is away from the optical component and a second configuration when the eyelid exerts pressure on the optical component and wherein the deflectable material of the coupling component comprises an elastically deformable material that conforms elastically to at least a portion of the eye when the eye blinks and wherein the coupling component returns to the first configuration when the eyelid has moved away from the optical component.

16. The method of claim 15 wherein a sealing surface of the coupling component is separated from the conjunctiva with a gap when the coupling component comprises the first configuration with the eyelid away from the optical component and wherein the sealing surface of the coupling component contacts the conjunctiva when the eyelid exerts pressure on the first coupling component to form a seal with the conjunctiva.

17. The method of claim 14 wherein the optical component comprises a first rigidity and the coupling component comprises a second rigidity less than the first rigidity and wherein the optical component comprises a substantial surface area such that pressure of an eyelid on a portion of the optical component provides volumetric pumping of the tear liquid through the fenestrations when the eye blinks and deflects the coupling component.

18. The method of claim 17 wherein the deflectable material of the coupling component defines a chamber with the cornea and the conjunctiva and allows the optical component to move downward on the cornea with pressure of the eyelid so as to decrease a volume of the chamber and displace tear liquid with flow outwardly through the fenestrations when the outer portion contacts the conjunctiva.

19. The method of claim 18 wherein the deflectable material of the coupling component allows the optical component to move away from the cornea with decreased pressure of the eyelid so as to increase the volume of the chamber and draw tear liquid with inward flow through the fenestrations and into the chamber when the outer portion contacts the conjunctiva.

20. The method of claim 19 wherein the deflectable material of the coupling component contacts the conjunctiva to inhibit tear flow along the conjunctiva when the volume of the chamber increases and draws the tear liquid into the chamber through the fenestrations.

21. The method of claim 20 wherein one or more eyelids cover the fenestrations and move one or more of the optical component or the coupling component with pressure of the one or more eyelids so as to decrease a volume of the chamber and displace tear fluid from the chamber with outward flow between the conjunctiva and the coupling component.

22. The method of claim 17 wherein the outer portion comprises a third rigidity less than the first rigidity and the second rigidity such that the third portion contacts the conjunctiva and stretches elastically to move the optical component toward the cornea and pump tear liquid outwardly through the fenestrations when the eye blinks and an eye lid exerts downward pressure on the optical component and wherein the elastically stretched outer portion moves the optical component away from the cornea and pumps tear liquid inwardly through the fenestrations with flow when the eye blinks and exerts downward pressure on the optical component.

23. The method of claim 17 wherein the optical component comprises a maximum dimension across of at least about 5 mm corresponding to the substantial surface area, the substantial surface area comprising at least about 15 mm$^2$.

24. The method of claim 17 wherein the first rigidity comprises a relative rigidity within a range from about 3.5E-5 Pa-m$^3$ to about 6E-4 Pa-m$^3$ and the second rigidity comprises a relative rigidity within a range from about 2.5E-6 Pa-m$^3$ to about 3E-4 Pa-m$^3$.

25. The method of claim 1 wherein the inner portion, the intermediate portion and the outer portion are sized and curved such that the peripheral portion couples to the conjunctiva to inhibit sliding movement of the optical component along the cornea and to inhibit tear flow at locations where the inner portion couples the conjunctiva when the eye blinks.

26. The method of claim 25 wherein the outer portion comprises an elastic material and a lower surface to contact the conjunctiva, the lower surface corresponding to a radius of curvature no more than a radius of curvature of the conjunctiva such that the outer portion stretches so as to conform to the conjunctiva and form a seal with the conjunctiva when the eye blinks.

27. The method of claim 26 wherein a lower surface of the intermediate portion comprises a first slope angle and a first curvature where the intermediate portion meets the outer portion and wherein the lower surface of the outer portion comprises a second slope angle and a second curvature where the outer portion meets the intermediate portion, the first curvature greater than the second curvature, and wherein the second slope angle is aligned with the first slope angle to inhibit ridge formation along a boundary where the outer portion meets the intermediate portion.

28. The method of claim 26 wherein the lower surface comprises a first non-stretched radius of curvature of no more than about 12 mm such that the radius of curvature of the lower surface increases from the first non-stretched curvature to a second stretched curvature corresponding to the radius of curvature of the conjunctiva when the lower surface of the outer portion contacts the conjunctiva.

29. The method of claim 1 wherein the lens comprises a contact lens and wherein the optical component comprises a lower surface and an upper surface, the lower surface having first curvature corresponding to a curvature of the cornea, the upper surface comprising a surface elevation profile corresponding to an optical correction of the eye and wherein the optical component is attached to the coupling component.

30. The method of claim 29 wherein the surface elevation profile and the optical correction correspond to correction of one or more of spherical refractive error, astigmatic refractive error, spherical aberration correction, wavefront aberration correction, or presbyopia correction.

31. The method of claim 30 wherein the intermediate portion comprises a lower surface having a plurality of curvatures.

32. The method of claim 31 wherein the plurality of curvatures comprises a first curvature having a first radius of curvature and a second curvature having a second radius of curvature.

33. The method of claim 32 wherein the intermediate portion comprises an inner intermediate portion having the first radius of curvature and a second intermediate portion having the second radius of curvature, the first radius of curvature less than the second radius of curvature, wherein the first intermediate portion comprises a first slope angle proximate to the second intermediate portion and the second intermediate portion comprises a second slop angle proximate to the first intermediate portion and wherein the first slope angle is aligned with the second slope angle to inhibit ridge formation along a boundary where the first intermediate portion meets the second intermediate portion.

34. The method of claim 31 wherein the plurality of curvatures of the intermediate portion corresponds to curvatures of an aspheric surface having a conic constant and wherein the conic constant corresponds to a first radius of curvature at a first radial location away from a center of the optical component and a second radius of curvature at a second radial location away from the center of the optical component.

35. The method of claim 1 wherein the optical component comprises a first polymeric material, the first polymeric material having covalent bonds similar to the second material such that the optical component is bonded to the coupling component with covalent bonds.

36. The method of claim 1 wherein the optical component comprises silicone having first siloxane bonds, the coupling component comprises silicone having second siloxane bonds, and the third component comprises silicone having third siloxane bonds such that each of the optical component, the coupling component and the third component are bound to each other with the first covalent siloxane bonds, the second covalent siloxane bonds and the third covalent siloxane bonds.

37. The method of claim 1 wherein at least an upper surface of the lens is coated with one or more of a plasma coating, a chemical vapor deposition, or a luminous chemical vapor deposition.

38. The method of claim 1 wherein the plurality of fenestrations is located away from the optical component to pump tear liquid under the optical component.

39. The method of claim 1 wherein the plurality of fenestrations is located away from the optical component to inhibit optical effects of the plurality of fenestrations.

40. The method of claim 39 wherein each of the plurality of fenestrations comprises a diameter within a range from about 0.05 mm to about 0.5 mm.

41. The method of claim 39 wherein the optical component comprises a first center and the coupling component comprises a second center and wherein the first center is located away from the second center to align the optical component with the pupil when the coupling component is coupled to the conjunctiva and aligned with an axis of the eye.

42. The method of claim 1 wherein the lens comprises an extended wear lens capable of being safely worn continuously on the eye without removal for at least about seven days.

43. The method of claim 1, wherein the outer portion comprises a second rigidity, wherein the second rigidity is less than the first rigidity.

* * * * *